US011904615B2

(12) United States Patent
Ando et al.

(10) Patent No.: US 11,904,615 B2
(45) Date of Patent: *Feb. 20, 2024

(54) RECORDING METHOD AND INK JET RECORDING APPARATUS

(71) Applicant: Seiko Epson Corporation, Toyko (JP)

(72) Inventors: Keigo Ando, Matsumoto (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 255 days.

This patent is subject to a terminal disclaimer.

(21) Appl. No.: 17/177,639

(22) Filed: Feb. 17, 2021

(65) Prior Publication Data
US 2021/0252873 A1  Aug. 19, 2021

(30) Foreign Application Priority Data

Feb. 18, 2020 (JP) ................................. 2020-025096
Feb. 26, 2020 (JP) ................................. 2020-030179

(51) Int. Cl.
B41J 2/21 (2006.01)
C09D 11/54 (2014.01)
(Continued)

(52) U.S. Cl.
CPC ............... B41J 2/2117 (2013.01); B41J 2/01 (2013.01); B41M 5/0011 (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2001/0020964 A1* 9/2001 Irihara ................... B41J 2/2114
347/43
2008/0182083 A1* 7/2008 Oyanagi .............. C09D 11/322
524/588
(Continued)

FOREIGN PATENT DOCUMENTS

CN  110194005 A  9/2019
CN  110949030 A  4/2020
(Continued)

Primary Examiner — Manish S Shah
(74) Attorney, Agent, or Firm — Harness, Dickey & Pierce, P.L.C.

(57) ABSTRACT

A recording method for recording on a recording medium, which is a non-white recording medium, includes a white ink adhering step of adhering a white ink containing a white coloring material to the recording medium, and a non-white ink adhering step of adhering a non-white ink containing a non-white coloring material to the recording medium, in which the white ink adhering step and the non-white ink adhering step are performed by causing a recording head to scan the recording medium, the white ink adhering step and the non-white ink adhering step are performed on a region of the recording medium by a scan, and the white ink adhering step and the non-white ink adhering step are performed such that, in the region where the white ink and the non-white ink are adhered, the mass ratio (A/B) of an adhesion amount A of the white coloring material to an adhesion amount B of the non-white coloring material per unit area is 0.03 or more and 0.99 or less.

12 Claims, 6 Drawing Sheets

(51) Int. Cl.
  *C09D 11/322* (2014.01)
  *B41M 5/00* (2006.01)
  *C09D 11/38* (2014.01)
  *C09D 11/40* (2014.01)
  *B41J 2/01* (2006.01)

(52) U.S. Cl.
  CPC ............ *C09D 11/322* (2013.01); *C09D 11/38* (2013.01); *C09D 11/40* (2013.01); *C09D 11/54* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 2008/0213518 A1* | 9/2008 | Oyanagi | B41J 2/01 428/209 |
| 2009/0308279 A1 | 12/2009 | Koganehira et al. | |
| 2010/0143593 A1 | 6/2010 | Sano | |
| 2013/0088539 A1* | 4/2013 | Usuda | B41J 2/2117 347/12 |
| 2013/0108842 A1* | 5/2013 | Shiono | C09D 11/322 347/102 |
| 2014/0078218 A1* | 3/2014 | Ozawa | B41J 2/2114 347/21 |
| 2015/0115202 A1* | 4/2015 | Kagata | C09D 11/322 252/301.36 |
| 2016/0083603 A1 | 3/2016 | Okuda | |
| 2019/0264056 A1 | 8/2019 | Okuda et al. | |
| 2019/0283464 A1 | 9/2019 | Matsuzaki | |
| 2019/0366714 A1 | 12/2019 | Tsukahara et al. | |
| 2019/0366717 A1 | 12/2019 | Tsukahara et al. | |
| 2020/0101758 A1 | 4/2020 | Okuda et al. | |

FOREIGN PATENT DOCUMENTS

| | | |
|---|---|---|
| JP | 2005-153314 A | 6/2005 |
| JP | 2009-286998 A | 12/2009 |
| JP | 2010-158884 A | 7/2010 |
| JP | 2016-060168 A | 4/2016 |
| JP | 2016-175988 A | 10/2016 |
| JP | 2018-103601 A | 7/2018 |
| JP | 2018-111233 A | 7/2018 |
| JP | 2019-15695 A | 9/2019 |

* cited by examiner

RECORDING METHOD AND INK JET RECORDING APPARATUS

The present application is based on, and claims priority from JP Application Serial Number 2020-025096, filed Feb. 18, 2020 and JP Application Serial Number 2020-030179, filed Feb. 26, 2020, the disclosures of which are hereby incorporated by reference herein in their entirety.

BACKGROUND

1. Technical Field

The present disclosure relates to a recording method and an ink jet recording apparatus.

2. Related Art

In industrial and commercial applications, various types of printing are performed on colored or transparent media. The media includes a material for soft packaging, a label, a sign, corrugated cardboard, and the like, and an image is required to have excellent visibility.

For example, JP-A-2010-158884 discloses an ink jet recording method in which a color ink is adhered to a white ink after the white ink is adhered. The document describes that the method enables recording in which a white image serves as a background image and a color image has high visibility.

Further, the ink jet recording method enables recording of images with high-definition by using a relatively simple apparatus, and has been developed in various fields. For example, in label printing, an ink jet recording method has been studied which enables recording of an image not only on an ink-absorptive recording medium (hereinafter, also referred to as "absorptive recording medium") such as wood-free paper but also on an ink-low-absorptive or non-absorptive recording medium (hereinafter, "low or non-absorptive recording medium") such as a film.

Specifically, there is disclosed a recording method in which, using an ink containing 1,2-hexanediol and propylene glycol (1,2-propanediol) as a solvent, recorded matter having a stable optical density (OD value) can be obtained regardless of the properties of the recording medium (see, for example, JP-A-2016-60168).

However, for im example, when recording is performed on a non-white recording medium, an age formed with color ink shows insufficient visibility. Further, filling with color ink in the image is insufficient.

Further, in a low or non-absorptive recording medium, by using an ink having excellent wet spreadability, it is easy to obtain an image quality having a high OD value and excellent color development, but in an absorptive recording medium, the ink easily penetrates, so that it is difficult to increase the OD value, and it is difficult to obtain an image quality having excellent color development. Further, when the moisturizing performance of the solvent contained in the ink is inferior, the ejection stability may be impaired due to the drying of the ink at the nozzle or the like. As described above, it cannot be said that it is sufficient in terms of improving the image quality on both the low or non-absorptive recording medium and the absorptive recording medium and ensuring the ink ejection stability at the same time.

SUMMARY

The first disclosure may include the following aspects.
According to an aspect of the present disclosure, there is provided
a recording method for recording on a recording medium, the recording medium being a non-white recording medium, the method including:
a white ink adhering step of adhering a white ink containing a white coloring material to the recording medium, and
a non-white ink adhering step of adhering a non-white ink containing a non-white coloring material to the recording medium, in which
the white ink adhering step and the non-white ink adhering step are performed by causing a recording head to scan the recording medium,
the white ink adhering step and the non-white ink adhering step are performed on a region of the recording medium by a scan, and
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or less.

According to an aspect of the present disclosure, there is provided an ink jet recording apparatus including:
a transport section that transports a recording medium,
a recording head that ejects a white ink containing a white coloring material and a non-white ink containing a non-white coloring material to adhere the white ink and the non-white ink to the recording medium,
a scanning section that causes the recording head to scan the recording medium, and
a controller that controls the transport section, the recording head, and the scanning section, in which
the controller causes
the white ink and the non-white ink to adhere to
a region of the recording medium by a scan by the scanning section such that
in the region, a mass ratio (A/B) of an adhesion amount A of the white coloring material to an adhesion amount B of the non-white coloring material per unit area is 0.03 or more and 0.99 or less.

The second disclosure may include the following aspects.
According to an aspect of the present disclosure, there is provided
an ink jet recording method performed on a recording medium using an aqueous ink composition, the method including:
an ink adhering step of ejecting the aqueous ink composition from an ink jet head and adhering the aqueous ink composition to the recording medium, in which
the aqueous ink composition contains an organic solvent A which is a 1,2-alkanediol having a surface tension of 30 mN/m or less at 25° C. and an organic solvent B which is a both-end-type alkanediol having a normal boiling point of 250° C. or lower and having 3 or more carbon atoms, and
the ink jet head includes a circulation mechanism for circulating the aqueous ink composition.

According to an aspect of the present disclosure, there is provided an aqueous ink jet composition,
the aqueous ink jet composition being used for the ink jet recording method.

According to an aspect of the present disclosure, there is provided an ink jet recording apparatus including:
an ink adhering section that ejects an aqueous ink composition from an ink jet head and adhering the aqueous ink composition to a recording medium, in which the aqueous ink composition contains an organic solvent A which is a 1,2-alkanediol having a surface tension of 30 mN/m or less at 25° C. and an organic solvent B which is a both-end-type alkanediol having a normal boiling point of 250° C. or lower and having 3 or more carbon atoms, and the ink jet head includes a circulation mechanism for circulating the aqueous ink composition.

DESCRIPTION OF EXEMPLARY EMBODIMENTS

Figure 1:
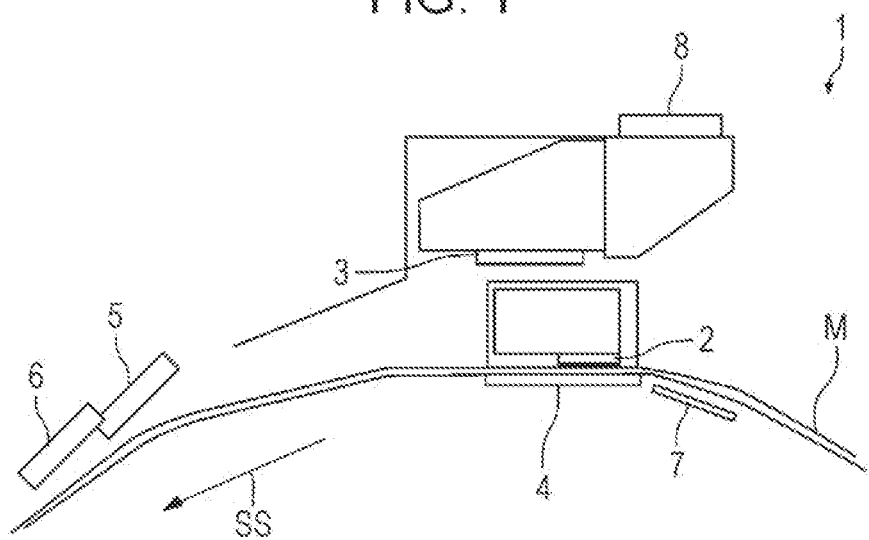
FIG. 1 is a schematic view of an example of an ink jet recording apparatus that may be used in a recording method of an embodiment.

Regarding the first disclosure, embodiments of the present disclosure will be described below. The embodiments described below describe examples of the present disclosure. The present disclosure is not limited to the following embodiments, and includes various modifications that are carried out without changing the gist of the present disclosure. Note that not all of the configurations described below are essential configurations of the present disclosure.

1. Recording Method

In a recording method according to the present embodiment, recording is performed on a non-white recording medium. Further, the recording method according to the present embodiment includes a white ink adhering step of adhering a white ink containing a white coloring material to a recording medium and a non-white ink adhering step of adhering a non-white ink containing a non-white coloring material to a recording medium.

According to the present embodiment, it is possible to provide a recording method having excellent filling and excellent visibility or the like. Furthermore, the printing speed, the reduction of density unevenness, and the reduction of image quality difference can be made excellent, which is preferable.

It should be noted that excellent filling means that in an image recorded with the non-white ink, the ink can sufficiently fill the base, and the base is difficult to be seen. Further, excellent visibility means that the image recorded with the non-white ink is an image in which sufficient color development is obtained and easy to confirm.

1.1. White Ink Adhering Step

The white ink adhering step is a step of adhering the white ink to the recording medium. The white ink will be described below. The method of adhesion to the recording medium will be described later.

The white ink and the non-white ink may be any ink except that they each contain a coloring material. Examples of the ink include inks containing a solvent component that can evaporate. In this case, recording is done by drying and evaporating the solvent component from the ink adhering to the recording medium and leaving the component such as the coloring material on the recording medium. Further, in this case, the ink of the present embodiment is preferable in that the color development and the filling are more excellent. Examples of such an ink include an aqueous ink containing at least water as a solvent component, and a solvent-based ink containing an organic solvent as a solvent component and having a water content of 2% by mass or less in the ink. In such an ink, the solvent component is preferably 10% by mass or more, and preferably 99% by mass or less in the ink. Alternatively, the ink may be a photocurable ink in which the components contained are cured for recording by irradiation with light such as ultraviolet rays.

1.1.1. White Coloring Material

The white ink contains a white coloring material. Examples of the white coloring material include metal compounds such as metal oxides, barium sulfate, and calcium carbonate. Examples of the metal oxide include titanium dioxide, zinc oxide, silica, alumina, and magnesium oxide. Further, particles having a hollow structure may be used for the white coloring material, and known particles can be used as the particles having a hollow structure. The material of the white coloring material is preferably different from inorganic fine particles described later.

As the white coloring material, titanium dioxide is preferably used from the viewpoint of good whiteness and abrasion resistance among the above-exemplified materials. The white coloring material may be used alone or in combination of two or more.

The average particle size (D50) of the white coloring material on a volume basis (also referred to as "volume-average particle size") is set to be larger than the volume-average particle size of the inorganic fine particles described later. The volume-average particle size of the white coloring material is preferably 30.0 nm or more and 600.0 nm or less, more preferably 100.0 nm or more and 500.0 nm or less, and still more preferably 150.0 nm or more and 400.0 nm or less. When the volume-average particle size of the white coloring material is within the above range, the particles are less likely to settle, the dispersion stability can be improved, and the nozzle is less likely to be clogged when applied to an ink jet recording apparatus. Further, when the volume-average particle size of the white coloring material is within the above range, it can sufficiently contribute to the improvement of the visibility of the image.

The volume-average particle size of the white coloring material can be measured by a particle size distribution analyzer. Examples of the particle size distribution analyzer include a particle size distribution meter (for example, "Nanotrack Series" manufactured by MicrotracBEL Corp.) using a dynamic light scattering method as a measuring principle. The volume-average particle size is the D50 value.

In the present specification, the term "white" in reference to the white ink, the white coloring material, and the like does not only refer to perfect white, but also includes colors in chromatic colors or achromatic colors, and colors having a luster, as long as they are visible as white. In addition, the term "white" include inks and pigments which are called and sold with names indicating that they are white inks or white pigments.

More quantitatively, "white" includes, in the recorded matter, not only a color in which L* is 100, but also a color in which L* is 60 to 100 and a* and b* each are ±10 or less, in CIELAB, for example.

More specifically, for example, the white ink preferably falls within the above range when the lightness (L*) and chromaticity (a*, b*) of the recorded portion of the recorded matter are measured using a spectrophotometer according to the CIELAB color system in a case in which the recording medium surface of the recording medium made of a transparent film is sufficiently covered with the ink in recording. The recorded matter recorded in a sufficiently covered amount has, for example, an adhesion amount of 15 mg/inch$^2$. More preferably, the color in the recorded matter satisfies $80 \leq L^* \leq 100$, $-4.5 \leq a^* \leq 2$, and $-10 \leq b^* \leq 2.5$. Examples of the recording medium made of a transparent film include LAG Jet E-1000ZC (manufactured by LINTEC Corporation). Examples of the spectrophotometer according to the CIELAB color system include Spectrolino (trade name, manufactured by GretagMacbeth), where the measurement conditions are set as D50 light source, 2° observation field, DIN NB density, Abs white standard, No filter, and Reflectance measurement mode.

The content (solid content) of the white coloring material in the white ink is preferably 0.5% by mass or more and 20.0% by mass or less, more preferably 1.0% by mass or more and 20.0% by mass or less, still more preferably 3.0% by mass or more and 15.0% by mass or less, and further preferably 7.0% by mass or more and 10.0% by mass or less, with respect to the total mass of the white ink. When the content of the white coloring material is within the above range, an image with sufficient visibility can be obtained.

In the recording method of the present embodiment, the white coloring material is used not for the purpose of concealing the background of the image, but for the purpose of enhancing the visibility of the obtained image itself. Therefore, the content of the white coloring material in the white ink can be made smaller than that for the purpose of background concealment. As a result, sufficient visibility of the image can be obtained, and the dispersion stability of the white coloring material can be easily improved and settlement of the white coloring material can be less likely to occur. Further, filling and reduction of image quality difference are also more excellent, which is preferable. From this viewpoint, the upper limit of the content of the white coloring material in the white ink is preferably 10.0% by mass or less, more preferably 8.0% by mass or less, still more preferably 7.0% by mass or less, and particularly preferably 5.0% by mass or less.

It is preferable that the white coloring material can be stably dispersed in the dispersion medium, and therefore, a dispersant may be used to disperse the white coloring material. Examples of the dispersant include a resin dispersant, and the dispersant is selected from those capable of improving the dispersion stability of the white coloring material in the white ink containing the above white coloring material. The white coloring material may be used as a self-dispersing pigment by oxidizing or sulfonating the surface of the pigment with ozone, hypochlorous acid, fuming sulfuric acid, or the like to modify the surface of the pigment particles.

Examples of resin dispersants include water-soluble resins, such as (meth)acrylic resins and their salts, the resins including poly(meth)acrylic acid, (meth)acrylic acid-acrylonitrile copolymers, (meth)acrylic acid-(meth)acrylate copolymers, vinyl acetate-(meth)acrylate copolymers, vinyl acetate-(meth)acrylic acid copolymers, and vinylnaphthalene-(meth)acrylic acid copolymers; styrene resins and their salts, the resins including styrene-(meth)acrylic acid copolymers, styrene-(meth)acrylic acid-(meth)acrylate copolymers, styrene-α-methylstyrene-(meth)acrylic acid copolymers, styrene-α-methylstyrene-(meth)acrylic acid-(meth)acrylate copolymers, styrene-maleic acid copolymers, and styrene-maleic anhydride copolymers; urethane resins and their salts, the urethane resins being polymeric compounds (resins) that contain urethane linkages resulting from the reaction between isocyanate groups and hydroxyl groups and may be linear and/or branched, with or without a crosslink structure; polyvinyl alcohols; vinylnaphthalene-maleic acid copolymers and their salts; vinyl acetate-maleate copolymers and their salts; and vinyl acetate-crotonic acid copolymers and their salts. Among these, a copolymer of a monomer having a hydrophobic functional group and a monomer having a hydrophilic functional group, and a polymer composed of a monomer having both a hydrophobic functional group and a hydrophilic functional group are preferable. As the form of the copolymer, any form of a random copolymer, a block copolymer, an alternating copolymer, and a graft copolymer can be used.

Examples of commercially available styrene-based resin dispersants include X-200, X-1, X-205, X-220, and X-228 (manufactured by Seiko PMC), SN-DISPERSANT (registered trademark) 6100 and 6110 (manufactured by San Nopco Ltd.), JONCRYL 67, 586, 611, 678, 680, 682, and 819 (manufactured by BASF), DISPERBYK-190 (manufactured by BYK Japan K.K.), and N-EA137, N-EA157, N-EA167, N-EA177, N-EA197D, N-EA207D, and E-EN10 (manufactured by DKS Co., Ltd.).

Examples of commercially available acrylic resin dispersants include BYK-187, BYK-190, BYK-191, BYK-194N, and BYK-199 (manufactured by BYK) and Aron A-210, A6114, AS-1100, AS-1800, A-30SL, A-7250, and CL-2 (manufactured by Toagosei Co., Ltd.).

Examples of commercially available urethane resin dispersants include BYK-182, BYK-183, BYK-184, and BYK-185 (manufactured by BYK), TECO Disperse 710 (manufactured by Evonik Tego Chemie), Borchi (registered trademark) Gen 1350 (manufactured by OMG Borchers).

The dispersant may be used alone or in combination of two or more. The total content of the dispersant is preferably 0.1 parts by mass or more and 30 parts by mass or less, more preferably 0.5 parts by mass or more and 25 parts by mass or less, still more preferably 1 part by mass or more and 20 parts by mass or less, further preferably 1.5 parts by mass or more and 15 parts by mass or less, with respect to 50 parts by mass of the white coloring material. When the content of the dispersant is 0.1 parts by mass or more with respect to 50 parts by mass of the white coloring material, the dispersion stability of the white coloring material can be further improved. Further, when the content of the dispersant is 30 parts by mass or less with respect to 50 parts by mass of the white coloring material, the viscosity of the obtained dispersion can be suppressed to a small value.

Among the dispersants exemplified above, it is more preferable that the dispersant is at least one selected from an acrylic resin, a styrene resin, and a urethane resin. In this case, the weight-average molecular weight of the dispersant is more preferably 500 or more. By using such a resin dispersant as the dispersant, the odor is small and the dispersion stability of the white coloring material can be further improved.

Typical examples of white coloring material include titanium dioxide, such as TIPAQUE CR-50-2, CR-57, CR-58-2, CR-60-2, CR-60-3, CR-Super-70, CR-90-2, CR-95, CR 953, PC-3, PF-690, PF-691, PF-699, PF-711, PF-728, PF-736, PF-737, PF-739, PF-740, PF-742, R-980, and UT-771 (all manufactured by ISHIHARA SANGYO KAISHA, Ltd.).

1.1.2. Other Components

The white ink may contain components such as resin particles, organic solvents, surfactants, water, waxes, additives, resin dispersants, preservatives, antifungal agents, rust inhibitors, chelating agents, viscosity modifiers, and antioxidants, in addition to the white coloring material. The following will be described in order.

Resin Particles

The white ink may contain resin particles. The resin particles can further improve the adhesion of the image due to the white ink adhered to the recording medium. Examples of the resin particles include resin particles formed of urethane resins, acrylic resins (including styrene-acrylic resin), fluorene resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. Of these, urethane resins, acrylic resins, polyofrefin resins, and polyester resins are preferable. These resin particles are often handled in the form of an emulsion, but may be in the form of powder. Further, the resin particles can be used alone or in combination of two or more.

Urethane resin is a generic term for resins that have the urethane linkage. A urethane resin used may be, for example, a polyether urethane resin, which contains, besides the urethane linkage, the ether linkage in its backbone, a polyester urethane resin, which contains the ester linkage in its backbone, or a polycarbonate urethane resin, which contains the carbonate linkage in its backbone. The urethane resin may be a commercially available one. For example, the urethane resin to be used may be any of SUPERFLEX 460, 460s, 840, and E-4000 (trade names, manufactured by DKS Co., Ltd.), RESAMINE D-1060, D-2020, D-4080, D-4200, D-6300, and D-6455 (trade names, manufactured by Dainichiseika Color & Chemicals Mfg.), Takelac WS-6021, and W-512-A-6 (trade names, manufactured by Mitsui Chemicals Polyurethanes), Sancure 2710 (trade name, manufactured by LUBRIZOL), and PERMARIN UA-150 (trade name, manufactured by Sanyo Chemical Industries).

Acrylic resin is a generic term for polymers obtained by polymerizing at least an acrylic monomer such as (meth)acrylic acid and (meth)acrylate as a component, and is, for example, from an acrylic monomer. Examples thereof include the obtained resin and a copolymer of an acrylic monomer and a monomer other than the acrylic monomer. Examples thereof include an acrylic-vinyl resin which is a copolymer of an acrylic monomer and a vinyl monomer. Further, examples of the vinyl monomer include styrene.

Acrylamide, acrylonitrile and the like may also be used as the acrylic monomer. For example, the resin emulsion obtained using acrylic resin as a raw material may be selected from commercially available resin emulsions including FK-854 (trade name, manufactured by CHIRIKA. Co., ltd), Mowinyl 952B and 718A (trade names, manufactured by Nippon Synthetic Chemical Industry), and Nipol LX852 and LX874 (trade names, manufactured by Zeon).

In the present specification, the acrylic resin may be a styrene/acrylic resin described later. Further, in the present specification, the term "(meth)acrylic" means at least one of acrylic and methacrylic.

A styrene-acrylic resin is a copolymer of a styrene monomer and a (meth)acrylic monomer. Examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. The styrene-acrylic resin may be a commercially available one. Examples thereof include JONCRYL 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF), Mowinyl 966A and 975N (trade names, manufactured by Nippon Synthetic Chemical Industry), and VINYBLAN 2586 (manufactured by Nissin Chemical Industry products).

A polyolefin resin is a resin that has an olefin, such as ethylene, propylene, or butylene, as its structural backbone and can be a suitable one selected from known polyolefin resins. The olefin resin may be a commercially available one. For example, the olefin resin may be selected from commercially available olefin resins including ARROWBASE CB-1200 and CD-1200 (trade names, manufactured by UNITIKA Ltd.).

The resin particles, moreover, may be supplied in emulsion form. Examples of a commercially available collection of such resin emulsions include MICROGEL E-1002 and E-5002 (trade names of Nippon Paint products, styrene-acrylic resin emulsions), VONCOAT 4001 (trade name of a product manufactured by DIC Corporation, an acrylic resin emulsion), VONCOAT 5454 (trade name of a product manufactured by DIC Corporation, a styrene-acrylic resin emulsion), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names of a product manufactured by Showa Denko products), POLYSOL SAE1014 (trade name, a styrene-acrylic resin emulsion, ZEON), SAIVINOL SK-200 (trade name, an acrylic resin emulsion, Saiden Chemical Industry), AE-120A (trade name of a product manufactured by JSR, an acrylic resin emulsion), AE373D (trade name of a product manufactured by Emulsion Technology, a carboxy-modified styrene-acrylic resin emulsion), SEIKADYNE 1900 W (trade name of a product manufactured by Dainichiseika Color & Chemicals Mfg., an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names of products manufactured by Nissin Chemical Industry products), elitel KA-5071S, KT-8803, KT-9204, KT-8701, KT-8904, and KT-0507 (trade names of products manufactured by Unitika, polyester resin emulsions), Hytec SN-2002 (trade name of a product manufactured by Toho Chemical, a polyester resin emulsion), Takelac W-6020, W-635, W-6061, W-605, W-635, and W-6021 (trade names of products manufactured by Mitsui Chemicals Polyurethanes, urethane resin emulsions), SUPERFLEX 870, 800, 150, 420, 460, 470, 610, and 700 (trade names of products manufactured by DKS Co., Ltd., urethane resin emulsions), PERMARIN UA-150 (manufactured by Sanyo Chemical Industries, a urethane resin emulsion), Sancure 2710 (manufactured by Lubrizol Japan, a urethane resin emulsion), NeoRez R-9660, R-9637, and R-940 (manufactured by Kusumoto Chemicals Ltd., urethane resin emulsions), ADEKA BONTIGHTER HUX-380 and 290K (manufactured by ADEKA Corporation, urethane resin emulsions), Mowinyl 966A and Mowinyl 7320 (manufactured by Nippon Synthetic Chemical Industry), JONCRYL 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all manufactured by BASF), NK Binder R-5HN (manufactured by Shin-Nakamura Chemical Co., Ltd.), HYDRAN WLS-210 (non-crosslinked polyurethane, manufactured by DIC Corporation), and JONCRYL 7610 (manufactured by BASF).

The glass transition temperature (Tg) of the resin particles is preferably −50° C. or higher and 200° C. or lower, more preferably 0° C. or higher and 150° C. or lower, and further preferably 50° C. or higher and 100° C. or lower. Further, 50° C. or higher and 80° C. or lower is particularly preferable. When the glass transition temperature (Tg) of the resin particles is within the above range, the durability and clogging resistance tend to be more excellent. The glass transition temperature is measured, for example, by using a differential scanning calorimeter "DSC7000" manufactured by Hitachi High-Tech Science Co., Ltd., according to JIS K7121 (a method for measuring the transition temperature of plastics).

The volume-average particle size of the resin particles is preferably 10 nm or more and 300 nm or less, more preferably 30 nm or more and 300 nm or less, still more preferably 30 nm or more and 250 nm or less, and particularly preferably 40 nm or more and 220 nm or less. The volume-average particle size can be measured by the method described above.

The content of the resin particles in the white ink is 0.1% by mass or more and 20% by mass or less, preferably 1% by mass or more and 15% by mass or less, more preferably 2% by mass or more and 10% by mass or less as a solid content with respect to the total mass of the white ink.

Organic Solvent

The white ink used in the recording method according to the present embodiment may contain an organic solvent. The organic solvent is preferably water-soluble. One of the functions of the organic solvent is to improve the wettability of the white ink with respect to the recording medium and to improve the moisturizing property of the white ink. The organic solvent can also function as a penetrant.

Examples of the organic solvent include esters, alkylene glycol ethers, cyclic esters, nitrogen-containing solvents, and polyhydric alcohols. Examples of the nitrogen-containing solvent include cyclic amides and acyclic amides. Examples of the acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Further, as the above-mentioned alkylene glycol, diether is more preferable than monoether because it tends to dissolve or swell the resin particles in the ink more easily and improves the abrasion resistance of the formed image.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds resulting from the substitution of hydrogen(s) of the methylene group next to the carbonyl group of these lactones with an alkyl group having 1 to 4 carbon atoms.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are more preferable from the viewpoint of the solubility of the flocculant and promoting film formation with the resin particles described later, and 2-pyrrolidone is particularly preferable.

Further, it is also preferable to use a compound represented by the general formula (1) as an alkoxyalkylamide.

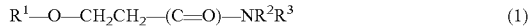

$$R^1-O-CH_2CH_2-(C=O)-NR^2R^3 \qquad (1)$$

In the formula (1), $R^1$ represents an alkyl group having 1 or more carbon atoms and 4 or less carbon atoms, and $R^2$ and $R^3$ each independently represent a methyl group or an ethyl group. It is possible for the "alkyl group having 1 or more carbon atoms and 4 or less" to be a linear or branched alkyl group, and examples thereof include a methyl group, an ethyl group, an n-propyl group, an iso-propyl group, an n-butyl group, a sec-butyl group, an iso-butyl group, and a tert-butyl group. The compound represented by Formula (1) may be used alone or in a combination of two or more thereof.

The function of the compound represented by the formula (1) is, for example, to improve the surface dryness and fixability of the white ink adhered to the low-absorptive recording medium. In particular, the compound represented by the formula (1) is excellent in the action of appropriately softening and dissolving the vinyl chloride resin. Therefore, the compound represented by the formula (1) can soften and dissolve the surface to be recorded containing the vinyl chloride resin, and allow the white ink to penetrate into the low-absorptive recording medium. By allowing the white ink to penetrate into the low-absorptive recording medium in this way, the white ink is firmly fixed and the surface of the white ink is easily dried. Therefore, the obtained image tends to be excellent in surface dryness and fixability.

Further, in the formula (1), $R^1$ is more preferably a methyl group having 1 carbon atom. In the formula (1), the normal boiling point of the compound in which $R^1$ is a methyl group is lower than the normal boiling point of the compound in which $R^1$ is an alkyl group having 2 or more and 4 or less carbon atoms. Therefore, when a compound in which $R^1$ is a methyl group in the formula (1) is used, the surface dryness of the adhered region (particularly the surface dryness of the image when recorded in a high temperature and high humidity environment) may be further improved.

The content of the compound represented by the formula (1) with respect to the total mass of the white ink is not particularly limited, and is about 5% by mass or more and 50% by mass or less, and preferably 8% by mass or more and 48% by mass or less. When the content of the compound represented by the formula (1) falls within the above range, the fixability and surface dryness (surface dryness, especially when recorded in a high temperature and high humidity environment) of the image may be further improved.

Examples of polyhydric alcohols includes 1,2-alkanediols (for example, alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyhydric alcohols other than 1,2-alkanediols (polyols) (for example, diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin).

Polyhydric alcohols can be divided into alkanediols and polyols. Alkanediols are diols of alkanes having 5 or more carbon atoms. The number of carbon atoms in the alkane is preferably 5 to 15, more preferably 6 to 10, and still more preferably 6 to 8. 1,2-alkanediol is preferable.

Polyols are polyols of alkanes having 4 or less carbon atoms or intermolecular condensates of hydroxyl groups of polyols of alkanes having 4 or less carbon atoms. The number of carbon atoms in the alkane is preferably 2 to 3. The number of hydroxyl groups in the molecule of the polyols is 2 or more, preferably 5 or less, and more preferably 3 or less. When the polyols are the above-mentioned intermolecular condensates, the number of intermolecular condensations is 2 or more, preferably 4 or less, and more preferably 3 or less. The polyhydric alcohols may be used alone or in combination of two or more.

It is possible for alkanediols and polyols to mainly function as penetrating solvents and/or moisturizing solvents. However, alkanediols tend to have strong properties as a penetrating solvent, and polyols tend to have strong properties as a moisturizing solvent.

When the white ink contains an organic solvent, one type of organic solvent may be used alone or in combination of two or more. The total content of the organic solvent is, for example, 5% by mass or more and 50% by mass or less, preferably 10% by mass or more and 45% by mass or less, more preferably 15% by mass or more and 40% by mass or less, and still more preferably 20% by mass or more and 40% by mass or less, with respect to the total mass of the white ink. When the content of the organic solvent is within the above range, the balance between wet spreadability and dryness is further improved, and it is easy to form a high-quality image.

Further, the white ink more preferably contains an organic solvent having a normal boiling point of 150.0° C. or higher and 280.0° C. or lower among the above-exemplified organic solvents. By doing so, it is possible to perform recording in which the formed image is dried and fixed faster.

Furthermore, it is more preferable that the white ink does not contain more than 1.0% by mass of an organic solvent of polyols having a normal boiling point of higher than 280.0° C. The content of the organic solvent of the polyols having a normal boiling point of higher than 280° C. in the white ink is preferably 5% by mass or less, more preferably 3% by mass or less, still more preferably 1% by mass or less, particularly preferably 0.5% by mass or less, and more particularly preferably 0.1% by mass or less, with respect to the total mass of the white ink. The lower limit of the content of the organic solvent of polyols having a normal boiling point of higher than 280° C. may be 0% by mass.

By doing so, the formed image is dried well, recording can be performed faster, and the adhesion to the recording medium can be improved. Furthermore, it is more preferable that the white ink has an organic solvent (not limited to polyols) contains a normal boiling point of higher than 280.0° C. within the above range. Examples of the organic solvent having a normal boiling point of higher than 280° C. include glycerin and polyethylene glycol monomethyl ether.

Surfactant

The white ink may contain a surfactant. The surfactant has a function of lowering the surface tension of the white ink and improving the wettability with the recording medium. Among the surfactants, for example, acetylene glycol surfactants, silicone surfactants, and fluorosurfactants can be preferably used.

An acetylene glycol surfactant can be of any kind, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; manufactured by Air Products and Chemicals), OLFINE B, Y, P, A, STG, SPC, E1010, PD-001, PD-002W, PD-003, PD-004, EXP. 4001, EXP. 4036, EXP. 4051, AF-103, AF-104, AK-02, SK-14, and AE-3 (all trade names; manufactured by Nissin Chemical Industry), and ACETYLENOL E00, E00P, E40, and E100 (all are trade names; manufactured by Kawaken Fine Chemicals).

The silicone surfactant is not particularly limited, but a polysiloxane compound is preferably mentioned. The polysiloxane compound is not particularly limited, and examples thereof include polyether-modified organosiloxane. Examples of commercially available polyether-modified organosiloxanes include BYK-306, BYK-307, BYK-333, BYK-341, BYK-345, BYK-346, and BYK-348 (all trade names; manufactured by BYK Japan) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names; manufactured by Shin-Etsu Chemical), and SILFACE SAG002, 005, 503A, 008 (all trade names; manufactured by Nissin Chemical Industry Co., Ltd.).

A fluorosurfactant is preferably a fluorine-modified polymer. Specific examples thereof include BYK-3440 (manufactured by BYK Japan), SURFLON S-241, S-242, and S-243 (all trade names; manufactured by AGC Seimi Chemical), and FTERGENT 215M (manufactured by NEOS).

When a white ink contains a surfactant, a plurality of surfactants may be contained. When the surfactant is contained in the white ink, the content may be 0.1% by mass or more and 2% by mass or less, preferably 0.4% by mass or more and 1.5% by mass or less, and more preferably 0.5% by mass or more and 1.0% by mass or less, with respect to the total mass of the white ink.

Water

The white ink used in the recording method according to the present embodiment may contain water. The white ink is preferably an aqueous white ink. The aqueous means that it is a composition containing water as one of the main solvent components. By doing so, it is possible to perform recording with less environmental load and less odor.

Water may be contained as a main solvent component of the white ink, and is a component that evaporates and scatters upon drying. The water is preferably water from which ionic impurities are removed as much as possible, such as pure water or ultrapure water such as ion-exchanged water, ultra-filtered water, reverse osmosis water, and distilled water. Further, it is preferable to use water sterilized by ultraviolet ray irradiation, addition of hydrogen peroxide, or the like since the generation of mold and bacteria can be suppressed when the ink is stored for a long period of time. The water content is preferably 45% by mass or more, more preferably 50% by mass or more and 98% by mass or less, and further preferably 55% by mass or more and 95% by mass or less with respect to the total amount of the white ink.

Wax

The white ink may contain wax. Since the wax has a function of imparting smoothness to the image with the white ink, it is possible to reduce peeling of the image due to the white ink.

The wax can be, for example, a vegetable/animal wax, such as carnauba wax, candelilla wax, beeswax, rice bran wax, or lanolin; a petroleum wax, such as paraffin wax, microcrystalline wax, polyethylene wax, oxidized polyethylene wax, or petrolatum; a mineral wax, such as montan wax or ozokerite; or a synthetic wax, such as carbon wax, hoechst wax, a polyolefin wax, or a stearic acid amide, a natural/synthetic wax emulsion, such as an α-olefin-maleic anhydride copolymer, or a compound wax or a mixture of two or more such waxes. Of these, it is particularly preferable to use a polyolefin wax (in particular, polyethylene wax or polypropylene wax) and paraffin wax from the viewpoint of being more excellent in the effect of enhancing the fixability to the soft packaging film to be described later.

It is also possible to use a commercially available wax as it is. Examples thereof include NOPCOTE PEM-17 (trade name, manufactured by San Nopco Ltd.), CHEMIPEARL W4005 (trade name, manufactured by Mitsui Chemicals, Inc.), and AQUACER 515, 539, and 593 (trade names, manufactured by BYK Japan K.K.).

Further, from the viewpoint of suppressing a decrease in performance due to excessive melting of wax when the recording method includes a heating step, it is preferable that the melting point of the wax used is preferably 50° C. or higher and 200° C. or lower, more preferably 70° C. or higher and 180° C. or lower, still more preferably 90° C. or higher and 150° C. or lower.

The wax may be supplied in the form of an emulsion or suspension. The content of the wax is 0.1% by mass or more and 10% by mass or less in terms of solid content, more preferably 0.5% by mass or more and 5% by mass or less, still more preferably 0.5% by mass or more and 2% by mass or less, with respect to the total mass of the white ink. When the content of the wax is within the above range, the function of the wax can be satisfactorily exhibited. If one or both of the white ink and the non-white ink described later contains wax, the function of imparting smoothness to the image can be sufficiently obtained.

Additives

The white ink may contain ureas, amines, saccharides and the like as additives. Examples of ureas include urea, ethyleneurea, tetramethylurea, thiourea, 1,3-dimethyl-2-imidazolidinone, and the like, and betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like).

Examples of amines include diethanolamine, triethanolamine, and triisopropanolamine. Ureas and amines may function as pH adjuster.

Examples of saccharides include glucose, mannose, fructose, ribose, xylose, arabinose, galactose, aldonic acid, glucitol (sorbitol), maltose, cellobiose, lactose, sucrose, trehalose, and maltotriose.

Others

The white ink used in the recording method according to the present embodiment may further contain components such as preservatives, antifungal agents, rust inhibitors, chelating agents, viscosity modifiers, antioxidants, and antifungal agent.

1.1.3. Physical Properties of White Ink and Method of Adhering to Recording Medium The white ink adhering step may be performed by any method as long as the white ink is adhered while the recording head is scanning the recording medium. For example, it is preferable to use the recording head as an ink jet head and eject the white ink from the ink jet head. In this way, it is possible to efficiently perform printing of a small amount of various kinds by a small apparatus.

When the white ink is adhered to the recording medium by an ink jet method, the viscosity of the white ink at 20° C. is preferably 1.5 mPa·s or more and 15 mPa·s or less, more preferably 1.5 mPa·s or more and 7 mPa·s or less, and more preferably 1.5 mPa·s or more and 5.5 mPa·s or less. When the white ink is adhered to the recording medium by the ink jet method, it is easy to efficiently form a predetermined image on the recording medium.

The surface tension of the white ink at 25° C. is 40 mN/m or less, preferably 38 mN/m or less, more preferably 35 mN/m or less, and still more preferably 30 mN/m or less from the viewpoint of ensuring appropriate wet spreadability to the recording medium. The surface tension is measured by checking the surface tension when the platinum plate is wetted with the composition in an environment of 25° C. using an automatic surface tension meter CBVP-Z (manufactured by Kyowa Interface Science Co., Ltd.).

1.2. Non-White Ink Adhering Step

The non-white ink adhering step is a step of adhering the non-white ink to the recording medium. The non-white ink will be described below. The method of adhering to the recording medium will be described later.

1.2.1. Non-White Coloring Material

The non-white ink contains a white coloring material. The non-white coloring material contained in the non-white ink refers to a coloring material other than the above-mentioned white coloring material. Examples of the non-white coloring material include dyes and pigments. The non-white coloring material is preferably a coloring material such as cyan, yellow, magenta, and black.

The non-white coloring material may be either a dye or a pigment, or may be a mixture. However, among dyes and pigments, it is more preferable to include pigments. The pigment is excellent in storage stability such as light resistance, weather resistance, and gas resistance, and is preferably an organic pigment from that viewpoint.

Specific examples of the pigment used include an insoluble azo pigment, an azo pigment such as a condensed azo pigment, an azo lake or a chelate azo pigment, a polycyclic pigment such as a phthalocyanine pigment, a perylene and perinone pigment, an anthraquinone pigment, a quinacridone pigment, a dioxane pigment, a thioindigo pigment, an isoindolinone pigment, and a quinophthalone pigment, a dye chelate, a dyeing lake, a nitro pigment, a nitroso pigment, an aniline black, a daylight fluorescent pigment, and a carbon black. The above pigments can be used alone or in combination of two or more. Further, a bright pigment may also be used as the non-white coloring material.

Specific examples of the pigment are not particularly limited, but examples thereof include the following.

Examples of the black pigment include No. 2300, No. 900, MCF 88, No. 33, No. 40, No. 45, No. 52, MA 7, MA 8, MA 100, No. 2200 B, and the like (all manufactured by Mitsubishi Chemical Corporation), Raven 5750, Raven 5250, Raven 5000, Raven 3500, Raven 1255, Raven 700, and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW 1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa).

Examples of the yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180.

Examples of the magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, 50.

Examples of the cyan pigment include C.I. Pigment Blue 1, 2, 3, 15, 15:1, 15:2, 15:3, 15:34, 15:4, 16, 18, 22, 25, 60, 65, 66, C.I. Bat Blue 4, 60.

Further, pigments other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, 63.

The pearl pigment is not particularly limited, and examples thereof include pigments having pearl luster and interference luster such as titanium dioxide-coated mica, fish scale foil, and acidified bismuth.

The metallic pigment is not particularly limited, and examples thereof include particles formed of simple substances of any of aluminum, silver, gold, platinum, nickel, chromium, tin, zinc, indium, titanium, copper, and the like, or alloys thereof.

Further, various dyes usually used for ink jet recording can be used such as direct dyes, acidic dyes, edible dyes, basic dyes, reactive dyes, disperse dyes, vat dyes, soluble vat dyes, and reactive disperse dyes.

It is preferable that the non-white coloring material can be stably dispersed or dissolved in the dispersion medium, and if necessary, a dispersant may be used to disperse the non-white coloring material. Examples of the dispersant include the same dispersants used for improving the dispersibility of the white coloring material of the white ink described above.

The content of the non-white coloring material is preferably 0.3% by mass or more and 20% by mass or less, and more preferably 0.5% by mass or more and 15% by mass or less with respect to the total mass of the non-white ink. The content thereof is preferably 1 to 10% by mass, and more preferably 2 to 7% by mass.

When a pigment is used for the non-white coloring material, the volume-average particle size of the pigment particles is preferably 10 nm or more and 300 nm or less, more preferably 30 nm or more and 250 nm or less, still more preferably 50 nm or more and 250 nm or less, and particularly preferably 70 nm or more and 200 nm or less. The content thereof is preferably 80 to 150 nm. The volume-average particle size of the non-white coloring material is measured as an initial state by the above-mentioned volume-average particle size confirmation method. When the volume-average particle size is in the above range, it is preferable in that a desired coloring material can be easily obtained and that the characteristics of the coloring material can be easily adjusted.

1.2.2. Other Components

The non-white ink may contain components such as resin particles, organic solvents, surfactants, water, waxes, additives, resin dispersants, preservatives, antifungal agents, rust inhibitors, chelating agents, viscosity modifiers, antioxidants, and antifungal agent, in addition to the non-white coloring material.

The components of the non-white ink other than the coloring material are the same as those of the white ink, and can be made independent of the white ink. Any of these components may be the same as that in the white ink described above, and detailed description thereof will be omitted by replacing "white ink" with "non-white ink".

The non-white ink is more preferably an aqueous ink, like the white ink. By doing so, it is possible to perform recording with less environmental load and less odor.

Further, the non-white ink preferably contains an organic solvent having a normal boiling point of 150.0° C. or higher and 280.0° C. or lower, similarly to the white ink. As a result, it is possible to perform recording in which the image is fixed faster.

Furthermore, it is preferable that the non-white ink does not contain more than 1.0% by mass of an organic solvent having a normal boiling point of higher than 280.0. As a result, it is possible to performing recording in which the image dries faster, and the adhesion of the image can also be expected to be improved.

1.2.3. Physical Properties of Non-White Ink and Method of Adhering to Recording Medium The non-white ink adhering step may be performed by any method as long as the non-white ink is adhered while the recording head is scanning the recording medium, but it is more preferable to use the recording head as an ink jet head and eject the non-white ink from the ink jet head. In this way, it is possible to efficiently perform printing of a small amount of various kinds by a small apparatus. Since the viscosity, surface tension, and the like of the non-white ink are the same as those of the white ink, the description thereof will be omitted.

1.3. Recording Medium

The recording medium for forming an image by the recording method according to the present embodiment is a non-white recording medium. The recording medium may or may not have a recording surface that absorbs ink. Therefore, the recording medium is not particularly limited and includes, for example, a non-white liquid absorptive recording medium such as paper, film, and cloth, a liquid low-absorptive recording medium such as printed paper, and a non-white liquid non-absorptive recording medium such as metal, glass, and polymer. The excellent effect of the recording method of the present embodiment becomes more remarkable when the image is recorded on a liquid low-absorptive or liquid non-absorptive non-white recording medium. When the recording medium is a low-absorptive or non-absorptive recording medium, for example, an image with good filling can be formed more easily.

The liquid low-absorptive or liquid non-absorptive recording medium refers to a recording medium having a property of not absorptive ink at all or hardly absorptive ink. Quantitatively, liquid non-absorptive or liquid low-absorptive recording medium means "a recording medium in which the amount of water absorbed from the start of contact to 30 msec$^{1/2}$ by the Bristow method is 10 mL/m$^2$ or less". The Bristow method is the most widely used method for measuring the amount of liquid absorbed in a short time, and is also adopted by Japan Technical Association of Pulp and Paper Industry (JAPAN TAPPI). Details of the test method are given in "JAPAN TAPPI Paper and Pulp Test Method 2000 Edition", Standard No. 51 "Paper and paperboard— Liquid absorption test method—Bristow method". On the other hand, the liquid-absorptive recording medium means a recording medium that does not correspond to those liquid non-absorptive and liquid low-absorptive. In addition, in this specification, liquid low-absorptive and liquid non-absorptive may be simply referred to as low-absorptive and non-absorptive.

Examples of the liquid non-absorptive recording medium include those in which plastic is coated on a base material such as paper, those in which a plastic film is adhered on a base material such as paper, and plastic films not having an absorption layer (receiving layer). Examples of the plastic here include polyvinyl chloride, polyethylene terephthalate, polycarbonate, polystyrene, polyurethane, and polyethylene and polypropylene.

Further, examples of the liquid low-absorptive recording medium include a recording medium provided with a liquid low-absorptive coating layer on the surface. For example, it is called coated paper. Examples thereof include those having a paper as the base material such as printing paper such as art paper, coated paper, and matte paper, and those having a plastic film as the base material in which a polymer or the like is coated on the surface of polyvinyl chloride, polyethylene terephthalate, polycarbonate, polystyrene, polyurethane, polyethylene, polypropylene or the like, and those in which particles of silica, titanium or the like are coated together with a binder.

As the recording medium, a liquid-absorptive recording medium can also be used. The liquid-absorptive recording medium refers to the above-mentioned "recording medium in which the amount of water absorbed from the start of contact to 30 msec$^{1/2}$ is more than 10 mL/m$^2$ in the Bristow method".

Examples of the liquid-absorptive recording medium include those that are liquid-absorptive recording media obtained by providing a receiving layer that absorbs liquid on the surface of the recording medium. For example, an ink jet paper (a paper for exclusive use of an ink jet) can be mentioned. Examples of the receiving layer that absorbs liquid include a layer composed of a liquid-absorptive resin, and liquid-absorptive inorganic fine particles.

Examples of the liquid-absorptive recording medium include a recording medium in which the base material of the recording medium itself is liquid-absorptive. Examples thereof cloth made of fibers and paper containing pulp as a component. Examples of paper include plain paper, thick paper, and liner paper. Examples of liner paper include those composed of paper such as kraft pulp and used paper.

The recording method of the present embodiment is performed on a non-white recording medium. Examples of non-white recording medium include transparent recording medium (transparent recording medium). The transparent recording medium may be colorless and transparent, and may be colored (colored) transparent. In addition, transparency also includes translucency. These are recording media having visual translucency. They are also visible light translucent recording media. In such a case, the image formed on one side of the recording medium can be satisfactorily visually recognized from both sides by the recording method of the present embodiment.

And/or, examples of the non-white recording medium include a non-white colored recording medium (non-white colored recording medium). Examples thereof include a non-white colored opaque recording medium and a non-white colored transparent recording medium. Also in this case, the recording method of the present embodiment can easily form an image having good image quality such as visibility, filling, and reduction of image quality difference. The non-white colored recording medium may be the above-mentioned transparent recording medium or a non-transparent recording medium. What is not a transparent recording medium is a recording medium that does not have visual translucency. It is also a visible light opaque recording medium. Here, the non-white color is a color other than white.

1.4. Relationship Between White Ink Adhering Step and Non-White Ink Adhering Step In the recording method of the present embodiment, the white ink adhering step and the non-white ink adhering step are performed by scanning the recording head with respect to the recording medium. These steps can be easily performed using an ink jet recording apparatus described later.

Scanning is an operation of adhering the ink composition to the recording medium while moving the recording head, which adheres the ink to the recording medium, at a position relatively different from that of the recording medium. The scanning causes the ink to adhere to the recording medium. The scanning may be performed while moving the recording head with respect to the recording medium, or may be performed while moving the recording medium with respect to the recording medium. Both are scans of the recording head against the recording medium. Scanning is also called main scanning.

The recording head may be any one capable of adhering ink to the recording medium, and is not limited, and examples thereof include a dot impact head and a thermal transfer head in addition to the ink jet head.

The white ink adhering step and the non-white ink adhering step are performed on the same region of the recording medium by the same scanning. Here, the same scanning means one scan of the recording head in the main scanning direction in the case of a serial-type ink jet recording apparatus as described later, for example, the same region of the recording medium in the main scanning direction. When the recording head reciprocates and scans a plurality of times, it refers to one of the outward path and the return path (one scan). Therefore, the expression that the white ink adhering step and the non-white ink adhering step are performed in the same scanning means that both steps are performed during one scan of the recording head.

Figure 4:
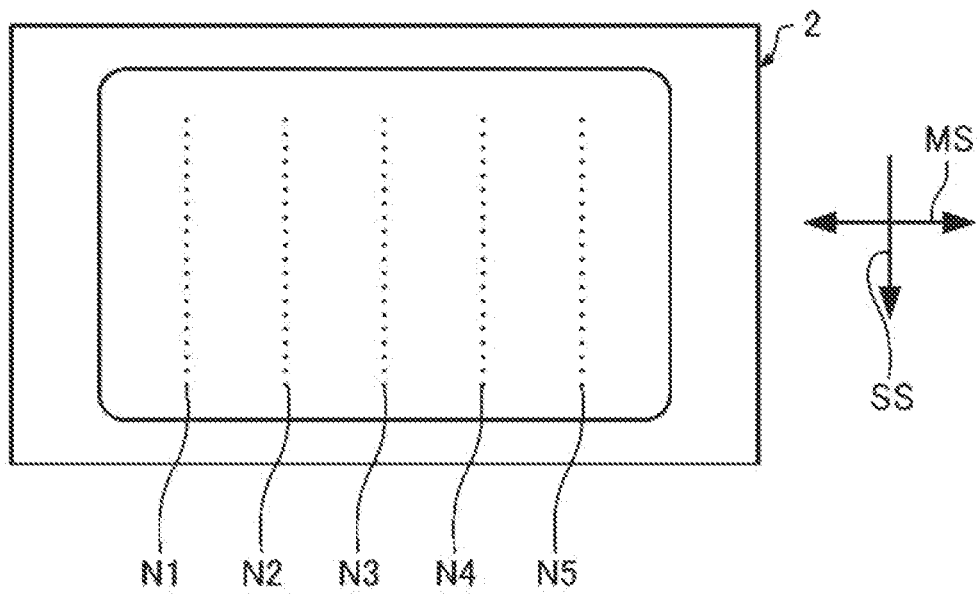
FIG. 4 is a schematic view showing a configuration of a nozzle row of a recording head according to Examples.

For example, when a white ink is ejected from the nozzle row N1 and a non-white ink is ejected from the nozzle row N2 for scanning by using an ink jet head as shown in FIG. 4 described later, the nozzle row N1 and the nozzle row N2 have an overlapping portion in the sub-scanning direction SS when projected onto the main scanning direction MS. In this case, the white ink and the non-white ink are adhered to the same region of the recording medium by one scan of the ink jet head. In the case of the above example, the same region is a portion where the nozzle row N1 for ejecting white ink and the nozzle row N2 for ejecting non-white ink overlap each other in the sub-scanning direction SS when projected in the main scanning direction MS.

In the recording method of the present embodiment, a region to which both the white ink and the non-white ink are adhered is formed on the recording medium by the white ink adhering step and the non-white ink adhering step. Then, in the region, the mass ratio (A/B) of the adhesion amount A of the white coloring material and the adhesion amount B of the non-white coloring material per unit area is 0.03 or more and 0.99 or less. The adhesion amount is the mass per unit area, and the mass ratio (A/B) is the mass ratio of the adhesion amount.

The recording method of the present embodiment may include at least a region having a mass ratio (A/B) of 0.03 or more and 0.99 or less in the region to which the white ink and the non-white ink of the recording medium are adhered.

In particular, in the region of the recording medium to which the white ink and the non-white ink are adhered, in a region where the adhesion amount B of the non-white coloring material per unit area is largest (the region where the adhesion amount B has the maximum value), the mass ratio (A/B) may be 0.03 or more and 0.99 or less, which is preferable. In this case, it is preferable that an image having excellent visibility can be obtained in a region where the adhesion amount B is large and visibility is particularly required.

In this case, for example, in the region of the recording medium to which the white ink and the non-white ink are adhered, in the region where the adhesion amount B is not the largest in recording, the mass ratio (A/B) may not necessarily be from 0.03 to 0.99, but may preferably be from 0.03 or more and 0.99 or less or more than 0.99. In particular, it is preferably more than 0.99. In this case, in a region where the adhesion amount B is not the maximum value, that is, in a region where the adhesion amount B is less than the maximum value, the mixture of the white ink and the non-white ink becomes better, and even in such a region, an image with good visibility can be formed, and in a region where the adhesion amount B is less than the maximum value, the filling is more preferable since the mass ratio (A/B) is more than 0.99.

Furthermore, in the region where the white ink and the non-white ink are adhered, the mass ratio (A/B) is more preferably 0.03 or more and 0.99 or less over a region where the adhesion amount B is 40 to 100% by mass of the maximum value of the adhesion amount B.

Further, in the region where the white ink and the non-white ink are adhered, the mass ratio (A/B) is preferably 0.03 or more and 0.99 or less or more than 0.99 over the region where the adhesion amount B is less than 40% by mass of the maximum value of the adhesion amount B.

1.5. Adhesion Amount

In the region of the recording medium on which the white coloring material and the non-white coloring material are adhered, the adhesion amount A of the white coloring material is preferably 0.1 mg/inch$^2$ or less, more preferably 0.05 mg/inch$^2$ or less, still more preferably 0.04 mg/inch$^2$ or less, and further preferably 0.03 mg/inch$^2$ or less. The adhesion amount is preferably from 0.005 mg/inch$^2$ or more, more preferably 0.01 mg/inch$^2$ or more, and still more preferably 0.02 mg/inch$^2$ or more. In particular, in the region where the white coloring material and the non-white coloring material are adhered at a mass ratio (A/B) of 0.03 or more and 0.99 or less, the adhesion amount A is preferably in the above range.

In the region where the white coloring material and the non-white coloring material are adhered to the recording medium, the adhesion amount of the white ink adhered to the recording medium is preferably 0.1 mg/inch$^2$ or more, more preferably 0.3 mg/inch$^2$ or more, and still more preferably 0.5 mg/inch$^2$ or more. The adhesion amount is preferably 15.0 mg/inch$^2$ or less, and more preferably 10.0 mg/inch$^2$ or less. In particular, in the region where the white coloring material and the non-white coloring material are adhered at a mass ratio (A/B) of 0.03 or more and 0.99 or less, the adhesion amount is preferably in the above range.

By forming such a region, the image quality of the obtained image can be further improved. In the recording method of the present embodiment, the adhesion amount A of the white coloring material and the adhesion amount of the white ink composition need only to have at least a region in which these adhesion amounts are in the above range. Preferably, in the region where the amount of non-white ink adhered is maximum or in the region where the amount of non-white coloring material B adhered is maximum, these adhesion amounts are more preferably in the above range.

The adhesion amount of non-white ink in the region where the amount of non-white ink adhered is maximum is preferably 3 mg/inch$^2$ or more, and more preferably 5 mg/inch$^2$ or more. Further, 20 mg/inch$^2$ or less is preferable, 15 mg/inch$^2$ or less is more preferable, and 12 mg/inch$^2$ or more is still more preferable.

Further, the adhesion amount B of the non-white coloring material in the region where the adhesion amount of the non-white coloring material is maximum is preferably 0.1 mg/inch$^2$ or more, and more preferably 0.2 mg/inch$^2$ or more. Further, 1 mg/inch$^2$ or less is preferable, 0.5 mg/inch$^2$ or less is more preferable, and 0.4 mg/inch$^2$ or more is still more preferable.

Further, in the region where the white coloring material and the non-white coloring material are adhered, the adhesion amount of the white ink adhered to the recording medium may be kept constant or may vary depending on the location. In particular, it may vary depending on the place depending on the amount of non-white ink adhered, and may vary depending on the place according to the amount of non-white ink adhered so as to be within a preferable range of the ratio of the adhesion amount of the white coloring material described above.

The maximum mass of ink droplets of the white ink ejected from the recording head in the white ink adhering step and the non-white ink adhering step is preferably 2 times or less, more preferably 1 time or less, and still more preferably less than 1 time (shrunk) as compared with the maximum ink droplet mass of the non-white ink ejected. Furthermore, 0.8 times or less is preferable, and 0.5 times or less is more preferable. The lower limit is preferably 0.1 times or more, and more preferably 0.3 times or more.

By doing so, the efficiency of mixing the white ink and the non-white ink can be further improved, and the in-place image quality difference in the obtained image can be further improved.

Here, the ink droplet mass is the mass of one ink droplet ejected from the recording head. It is also called the dot mass of ink.

The difference between the maximum ink droplet mass of the white ink and the maximum ink droplet mass of the non-white ink (maximum ink droplet mass of white ink−maximum ink droplet mass of non-white ink) is preferably 10 ng or less, more preferably 5 ng or less, still more preferably 0 ng or less, further more preferably less than 0 ng, and particularly preferably −5 ng or less. Further, although not limited, −30 ng or more is preferable, −20 ng or more is preferable, and −10 ng or more is preferable.

The maximum ink droplet mass of white ink and the maximum ink droplet mass of non-white ink in recording are independently preferably 30 ng or less, more preferably 25 ng or less, further preferably 20 ng or less, still more preferably 15 ng or less, and particularly preferably 10 ng or less. Further, the maximum ink droplet mass is independently preferably 3 ng or more, more preferably 5 ng or more, further preferably 10 ng or more, and particularly preferably 15 ng or more, and may be 20 ng or more.

As described above, the white ink adhering step and the non-white ink adhering step are performed in one scan, but the timing at which the white ink and the non-white ink land on the same place in the same region in one scan may be different, but the time difference is very small. However, the order in which the white ink and the non-white ink land on the same place in the same region in one scan is not particularly limited.

In the case of performing the recording method of the present embodiment, as in an ink jet recording apparatus described later, the recording may be performed by repeatedly performing the scanning of the recording head (main scanning) and the sub-scanning in which the relative position of the recording head and the recording medium is changed in the direction intersecting the scanning direction. Recording may be performed by repeating the step alternately. Further, in the sub-scanning after the main scanning, a length shorter than the length of the nozzle row of the recording head may be moved in the sub-scanning direction, and the region scanned in the previous main scanning may be scanned in the next main scanning. In this case, the region where the ink is adhered by the nozzle row of the recording head in one scan is further adhered with the ink in another scan. That is, the nozzle rows of the recording heads are further opposed to the region of the recording medium on which the nozzle rows of the recording heads are opposed to each other in one scan.

The sub-scanning may be performed by moving the recording medium with respect to the recording head, or by moving the recording head with respect to the recording medium.

As described above, in recording, there may be a region of the recording medium to which the ink adheres in another scan with respect to the scan region to which the ink adheres in one scan of the recording head. That is, there may be a region in which the same region is scanned two or more times. The number of times scanning is performed on the same region is referred to as the number of scanning times (number of scans, number of passes).

The number obtained by dividing the length of the recording head in the sub-scanning direction by the distance of one sub-scanning in the sub-scanning direction of the recording medium corresponds to the number of scans. The number of scans is the number per ink. The number of scans is 1 or more, preferably 2 or more, and more preferably 4 or more. Further, although not limited, 20 or less is preferable, 15 or less is more preferable, and 10 or less is still more preferable. When the number of scans is equal to or greater than the above range, reduction of density unevenness and reduction of image quality difference are more excellent and preferable. When the number of scans is equal to or less than the above range, the printing speed is more excellent and preferable.

In the recording method of the present embodiment, in the case of scanning as described above, by appropriately arranging nozzles for ejecting white ink and nozzles for ejecting non-white ink of the recording head and controlling ejection, it is possible to form an area where white ink has landed first and an area where non-white ink has landed first in the recording area of the recording medium in the main scanning of 1.

By doing so, the mixture of the white ink and the non-white ink in the image may be further improved, and the difference in visibility between the front and back of the image can be reduced (see the description of the embodiment for details).

In the related art, when a non-white ink layer and a white ink layer are overlaid on a transparent recording medium by separate scanning and recorded at the same place, when the background concealment property of the white ink layer is enhanced in order to improve the visibility of the non-white ink layer, the visibility of the image of the non-white ink from the white ink layer side may become worse, whereas the recording method of the present embodiment has excellent visibility of the image even when viewed from either side of the recording medium.

1.6. Other Steps

The recording method of the present embodiment includes steps of adhering white ink and non-white ink to the recording medium, respectively. However, if necessary, it may further include a step of adhering one or more of other white inks and other non-white inks to the recording medium. In this case, the order and number of these steps are not limited, and can be appropriately performed as needed. Further, the recording method of the present embodiment may include a step of heating the recording medium (post-heating step).

2. Ink Jet Recording Apparatus

The ink jet recording apparatus of the present embodiment includes: a transport section that transports a recording medium; a recording head that ejects a white ink containing a white coloring material and a non-white ink containing a non-white coloring material to adhere the white ink and the non-white ink to the recording medium; a scanning section that causes the recording head to scan the recording medium; and a controller that controls the transport section, the recording head and the scanning section.

Hereinafter, an example of an ink jet recording apparatus capable of carrying out the recording method according to the present embodiment will be described with reference to the drawings.

Figure 2:
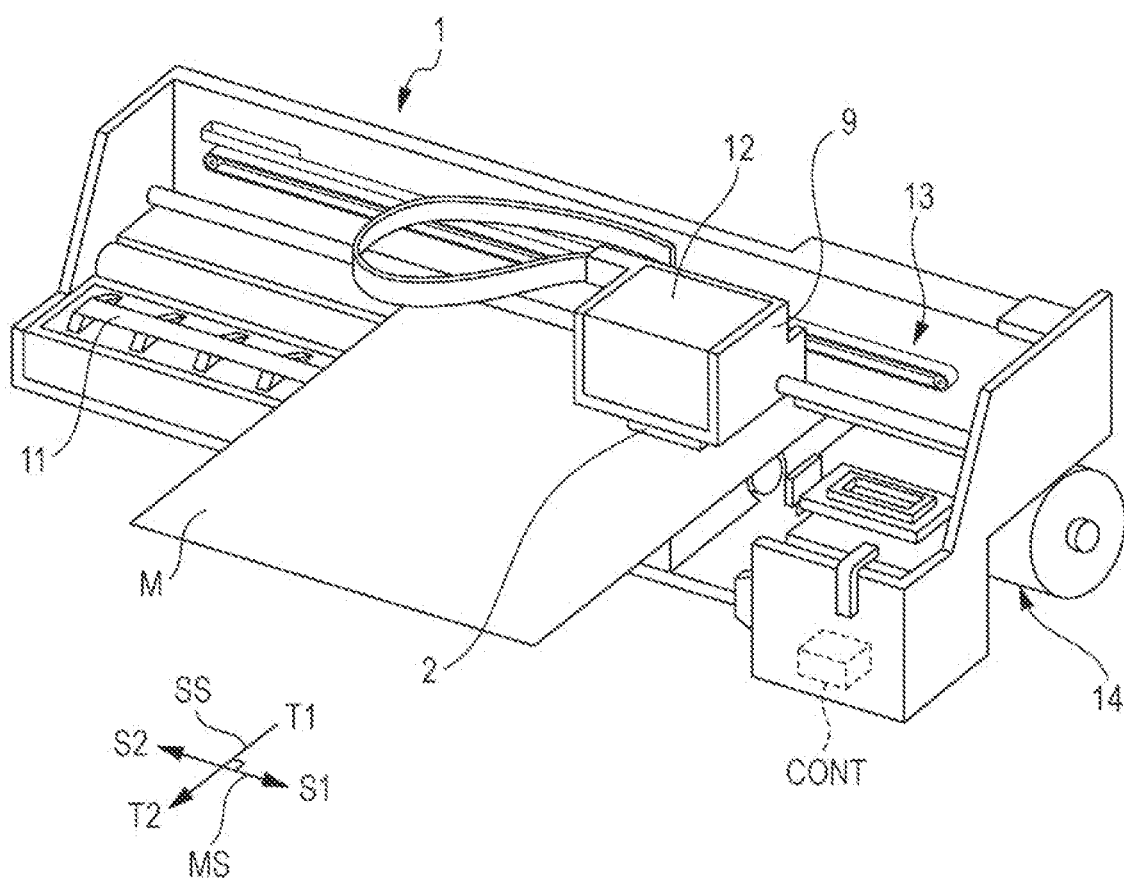
FIG. 2 is a schematic view around a carriage of the example of the ink jet recording apparatus that may be used in the recording method of the embodiment.

FIG. 1 is a schematic sectional view schematically showing an ink jet recording apparatus. FIG. 2 is a perspective view showing an example of a configuration around a carriage of the ink jet recording apparatus of FIG. 1. As shown in FIGS. 1 and 2, the ink jet recording apparatus 1 includes a recording head 2, an IR heater 3, a platen heater 4, a heating heater 5, a cooling fan 6, a preheater 7, a blower fan 8, a carriage 9, a platen 11, a carriage moving mechanism 13, a transport section 14, and a controller CONT. In the ink jet recording apparatus 1, the operation of the entire ink jet recording apparatus 1 is controlled by the controller CONT shown in FIG. 2.

The recording head 2 has a configuration in which white ink and non-white ink are ejected from a nozzle of the recording head 2 and adhered to the recording medium M for recording. In the present embodiment, the recording head 2 is a serial type recording head, and scans the recording medium M a plurality of times in the main scanning direction to adhere white ink and non-white ink to the recording medium M. The recording head 2 is mounted on the carriage 9 shown in FIG. 2. The recording head 2 is scanned a plurality of times in the main scanning direction relative to the recording medium M by the operation of the carriage moving mechanism 13 that moves the carriage 9 in the medium width direction of the recording medium M. The medium width direction is the main scanning direction of the recording head 2. Scanning in the main scanning direction is also referred to as main scanning.

Further, here, the main scanning direction is the moving direction of the carriage 9 on which the recording head 2 is mounted. In FIG. 1, the direction intersects the sub-scanning direction, which is the transport direction of the recording medium M indicated by the arrow SS. In FIG. 2, the width direction of the recording medium M, that is, the direction represented by S1-S2 is the main scanning direction MS, and the direction represented by T1→T2 is the sub-scanning direction SS. In addition, scanning is performed in the main scanning direction, that is, in either the arrow S1 or the arrow S2 in one scan. Then, the main scanning of the recording head 2 and the sub-scanning, which is the transport of the recording medium M, are repeated a plurality of times to record on the recording medium M.

The cartridge 12 that supplies white ink or non-white ink to the recording head 2 includes a plurality of independent cartridges. The cartridge 12 is detachably adhered to the carriage 9 on which the recording head 2 is mounted. Each of the plurality of cartridges is filled with non-white ink or white ink, and the cartridge 12 supplies white ink or non-white ink to each nozzle. In the present embodiment, the cartridge 12 is mounted on the carriage 9, but not limited thereto, and may be provided at a position other than the carriage 9 and supplied to each nozzle by a supply pipe (Not shown). Further, the nozzle for ejecting white ink and the nozzle for ejecting non-white ink can be appropriately designed together with the arrangement of the cartridge 12.

A method known in the related art can be used for ejection from the recording head 2. In the present embodiment, a method of ejecting droplets by utilizing the vibration of the piezoelectric element, that is, an ejection method of forming ink droplets by mechanical deformation of the electrolytic distortion element is used.

The ink jet recording apparatus 1 includes an IR heater 3 and a platen heater 4 that heats the recording medium M when ejecting ink or non-white ink from the recording head 2. In the present embodiment, when the recording medium M is dried in the drying step, a drying mechanism such as an IR heater 3, a blower fan 8, a platen heater 4, and a preheater 7 can be used. The drying step performed on the ink adhering to the recording medium when the ink adheres is also referred to as a primary drying step.

When the IR heater 3 is used, the recording medium M can be heated by radiation of infrared rays from the recording head 2 side. As a result, the recording head 2 is likely to be heated at the same time, but the temperature can be raised without being affected by the thickness of the recording medium M as compared with the case where the recording head 2 is heated from the back surface of the recording medium M such as the platen heater 4. Further, various fans (for example, a blower fan 8) may be provided which blows warm air or air having the same temperature as the environment to the recording medium M to dry the ink or non-white ink on the recording medium M.

The platen heater 4 heats the recording medium M at a position facing the recording head 2 through the platen 11 so that the non-white ink or the white ink ejected by the recording head 2 can be dried early from the time when the ink adheres to the recording medium M. The platen heater 4 can heat the recording medium M in a conductive manner, and as described above, in the recording method of the present embodiment, the platen heater 4 is used as needed, and when used, it is preferable to control the surface temperature of the recording medium M to be 40.0° C. or lower.

In the ink adhering step, the drying step of drying the ink adhered to the recording medium by the drying mechanism may not be provided, or the drying step may be performed at a relatively low temperature. In this case, filling is more preferable because the speed of drying of the ink adhering to the recording medium is suppressed.

When the recording medium M is dried or not dried by the drying mechanism during the ink adhering step, the upper limit of the surface temperature of the recording medium M is preferably 45.0° C. or lower, more preferably 40.0° C. or lower, still more preferably 38.0° C. or lower, and particularly preferably 35.0° C. or lower. Further, 30° C. or lower is preferable, 28° C. or lower is preferable, and 25° C. or lower is preferable. Further, the lower limit of the surface temperature of the recording medium M is preferably 20° C. or higher, preferably 25.0° C. or higher, more preferably 28.0° C. or higher, still more preferably 30.0° C. or higher, and particularly preferably 32.0° C. or higher.

Further, the temperature may be set so that the recording medium is not heated by the drying mechanism as described above, which is preferable.

When the temperature is below the above range, drying and composition fluctuation of the white ink and non-white ink in the recording head 2 can be suppressed, and welding of resin particles and the like to the inner wall of the recording head 2 is suppressed. In addition, filling, color development, image quality difference, and the like are more excellent and preferable. Further, when the temperature is equal to or higher than the above range, the white ink or the non-white ink can be fixed on the recording medium M at an early stage, and the image quality can be improved. The above temperature is the maximum temperature at a place facing the recording head on the surface of the recording medium during the ink adhering step.

The heating heater 5 is a heater for drying and solidifying the ink adhering to the recording medium M, that is, for secondary heating or secondary drying. The heating heater 5 can be used in the post-heating step. When the heating heater 5 heats the recording medium M on which the image is recorded, the water content contained in the ink evaporates and scatters more quickly, and the resin contained in the ink forms an ink film. In this way, the ink film is firmly fixed or adhered on the recording medium M to have excellent film-formability, and an excellent high-quality image can be obtained in a short time. The upper limit of the surface temperature of the recording medium M by the heating heater 5 is preferably 120.0° C. or lower, more preferably 100.0° C. or lower, and still more preferably 90.0° C. or lower. The lower limit of the surface temperature of the recording medium M is preferably 60.0° C. or higher, more preferably 70.0° C. or higher, and still more preferably 80.0° C. or higher. When the temperature is in the above range, a high-quality image can be obtained in a short time. The above temperature is the maximum temperature of the portion of the recording medium that receives secondary heating during recording.

The ink jet recording apparatus 1 may have a cooling fan 6. After the ink recorded on the recording medium M is dried, the ink on the recording medium M is cooled by the cooling fan 6, so that an ink coating film can be formed on the recording medium M with good adhesion.

Further, the ink jet recording apparatus 1 may include a preheater 7 that preheats the recording medium M before the ink adheres to the recording medium M.

Below the carriage 9, there are provided the platen 11 that supports the recording medium M, the carriage moving mechanism 13 that moves the carriage 9 relative to the recording medium M, and a roller that is the transport section 14 that transports the recording medium M in the sub-scanning direction. The operations of the carriage moving mechanism 13 and the transport section 14 are controlled by the controller CONT.

Figure 3:
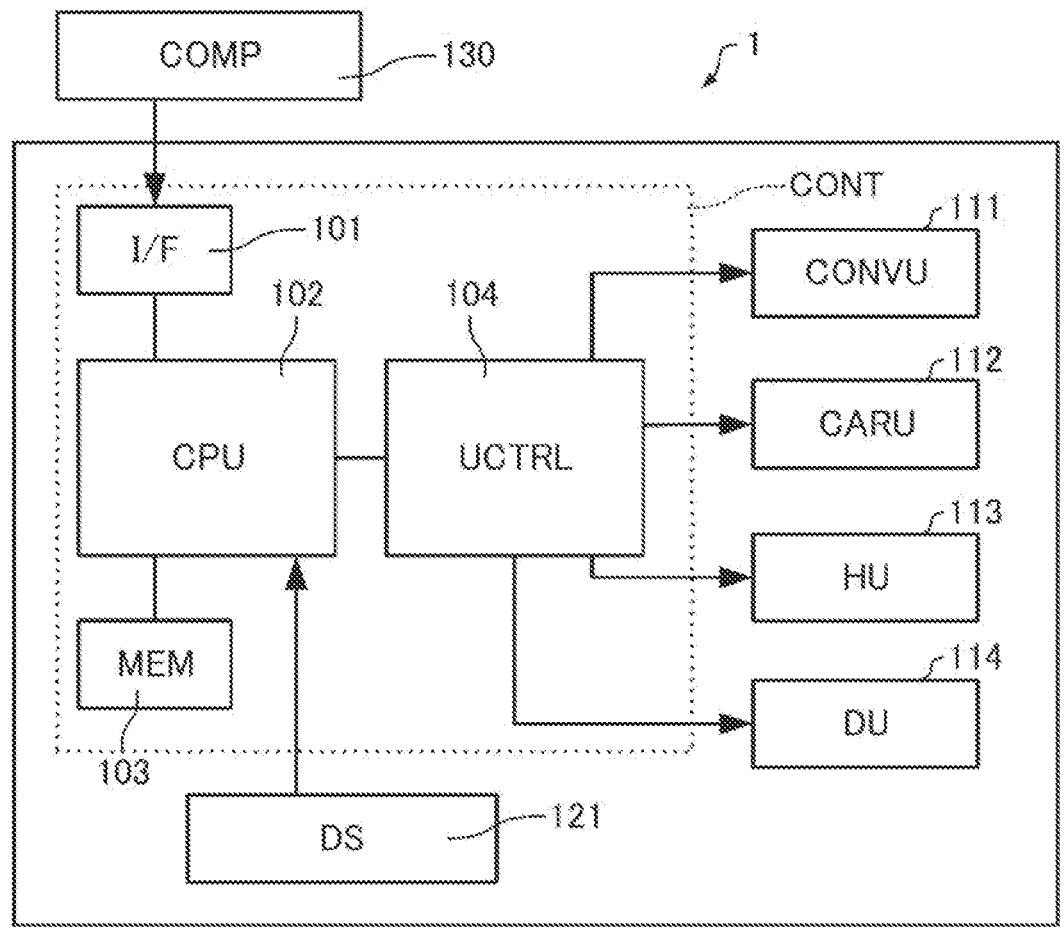
FIG. 3 is a block diagram of the example of the ink jet recording apparatus used for the recording method of the embodiment.

FIG. 3 is a functional block diagram of the ink jet recording apparatus 1. The controller CONT is a control unit for controlling the ink jet recording apparatus 1. An interface unit 101 (I/F) is for transmitting and receiving data between the computer 130 (COMP) and the ink jet recording apparatus 1. CPU 102 is an arithmetic processor for controlling the entire ink jet recording apparatus 1. The memory 103 (MEM) is for securing an area for storing the program of the CPU 102, a work area, and the like. The CPU 102 controls each unit by a unit control circuit 104 (UCTRL). A detector group 121 (DS) monitors the situation in the ink jet recording apparatus 1, and the controller CONT controls each unit based on the detection result.

A transport unit 111 (CONVU) controls the sub-scanning (transport section) of the ink jet recording, and specifically, controls the transport direction and the transport speed of the recording medium M. Specifically, the transport direction and transport speed of the recording medium M are controlled by controlling the rotation direction and rotation speed of the transport roller driven by a motor.

A carriage unit 112 (CARU) controls the main scanning (pass) (scanning section) of the ink jet recording, and specifically, reciprocates the recording head 2 in the main scanning direction. The carriage unit 112 includes the carriage 9 on which the recording head 2 is mounted, and the carriage moving mechanism 13 for reciprocating the carriage 9.

The head unit 113 (HU) controls the amount of white ink or non-white ink ejected from the nozzle of the recording head 2. For example, when the nozzle of the recording head 2 is driven by a piezoelectric element, the operation of the piezoelectric element in each nozzle is controlled. The head unit 113 controls the timing of adhesion of each ink, the dot size of white ink and non-white ink, the mass, and the like. Further, the amount of non-white ink or white ink adhered per scan is controlled by the combination of control of the carriage unit 112 and the head unit 113.

A drying unit 114 (DU) controls the temperatures of various heaters such as the IR heater 3, the preheater 7, the platen heater 4, and the heating heater 5.

The above-mentioned ink jet recording apparatus 1 alternately repeats an operation of moving the carriage 9 on which the recording head 2 is mounted (main scanning) in the main scanning direction and a transport operation (sub-scanning). At this time, when performing each pass, the controller CONT controls the carriage unit 112 to move the recording head 2 in the main scanning direction and controls the head unit 113 to eject droplets of white ink or non-white ink from a predetermined nozzle hole of the recording head 2 and to adhere droplets of white ink or non-white ink to the recording medium M. Further, the controller CONT controls the transport unit 111 to transport the recording medium M in the transport direction with a predetermined transport amount (feed amount) during the transport operation.

In the recording method of the present embodiment, the controller CONT controls so that the white ink and the non-white ink are adhered to the same region of the recording medium M by the same scanning by the scanning section, and in the same region of the recording medium M, the mass ratio (A/B) of the adhesion amount A of the white coloring material to the adhesion amount B of the non-white coloring material per unit area is 0.03 or more and 0.99 or less.

In the ink jet recording apparatus 1, the recording area to which a plurality of droplets (dots) are adhered is gradually transported by repeating the main scanning (pass) and the sub-scanning (transport operation). Then, the heating heater 5 dries the droplets adhering to the recording medium M to complete the image. After that, the completed recording medium may be wound into a roll by a winding mechanism (not shown) or transported by a flatbed mechanism (not shown).

According to such an ink jet recording apparatus, an image can be recorded on a recording medium while mixing white ink and non-white ink. As a result, it is possible to obtain an image with good visibility. Further, the visibility of the obtained image is good both on the front surface and the rear surface, and when, for example, recording is performed on the front surface of the transparent recording medium, the visibility from the rear surface side of the recording medium can also be good. Furthermore, since the white ink and the non-white ink can be adhered by the same scanning, the recording speed can be improved.

The recording apparatus can be a serial type recording apparatus that performs the main scanning and the sub-scanning as in the above example. On the other hand, in FIG. 1, the recording apparatus is a line-type recording apparatus in which the recording head 2 has a length equal to or longer than the recording width of the recording medium and records by one scan performed while transporting the recording medium.

Regarding the second disclosure, some embodiments of the present disclosure will be described below. The embodiments described below describe an example of the present disclosure. The present disclosure is not limited to the following embodiments, and includes various modifications that are carried out without changing the gist of the present disclosure. It should be noted that not all of the configurations described below are essential configurations of the present disclosure. In the description of the second disclosure, FIGS. 5 to 10 are referred to as FIGS. 1 to 6, respectively.

1. Ink Jet Recording Method

An ink jet recording method according to an embodiment of the present disclosure is an ink jet recording method performed on a recording medium using an aqueous ink composition, including an ink adhering step of ejecting the aqueous ink composition from an ink jet head and adhering the aqueous ink composition to the recording medium, in which the aqueous ink composition contains an organic solvent A which is a 1,2-alkanediol having a surface tension of 30 mN/m or less at 25° C. and an organic solvent B which is a both-end-type alkanediol having a normal boiling point of 250° C. or lower and having 3 or more carbon atoms, and the ink jet head includes a circulation mechanism for circulating the aqueous ink composition. In the ink jet recording method according to the present embodiment, one or more aqueous ink compositions are ejected from the ink jet head and adhered to the recording medium, but when there are two or more ink compositions, at least one of them may correspond to the above-described aqueous ink composition, and not all of the ink compositions may correspond to the above-described aqueous ink composition.

Hereinafter, each step of the ink jet recording method according to the present embodiment, a recording medium that can be used, an aqueous ink composition, and an ink jet recording apparatus will be described in this order.

1.1. Steps 1.1.1. Ink Adhering Step

In the ink adhering step, the above-mentioned aqueous ink composition is ejected from an ink jet head provided with a circulation mechanism for internally circulating the aqueous ink composition and adhered to a recording medium. When the ink jet head is provided with a circulation mechanism, the aqueous ink composition in the vicinity of the nozzle can be circulated, the aqueous ink composition that is about to dry can be recovered, and the ejection stability at the nozzle can be improved.

In the ink adhering step, the aqueous ink composition may be adhered to the recording medium in a heated state. Even under such conditions where it is easy to dry, the ejection stability at the nozzle can be improved by providing the ink jet head with a circulation mechanism. Further, by adhering the aqueous ink composition to the recording medium in a preheated state, the drying speed of the aqueous ink composition can be further increased, and the transport speed of the recording medium can be increased.

This step may be performed using a serial-type recording apparatus or a line-type recording apparatus.

1.1.2. Other Steps

The ink jet recording method according to the present embodiment may include a plurality of ink adhering steps. In addition, the ink jet recording method according to the present embodiment may further include a drying step of drying the aqueous ink composition adhering to the recording medium, a step of heating the recording medium, a laminating step, or the like.

1.1.2.1. Drying Step

The ink jet recording method according to the present embodiment may include a drying step. The ink jet recording method according to the present embodiment may include a drying step of drying the recording medium before or during the ink adhering step. The drying step can be performed by a part that performs drying using a drying mechanism, in addition to the part that stops the recording and leaving it to stand.

As the part that dries the recording medium by using the drying mechanism includes a part that blows air at a normal temperature or blowing warm air to the recording medium (blower type), a part that irradiates the recording medium with radiation (infrared rays and the like) to generate heat (radiation type), a member that transmits heat to the recording medium in contact with the recording medium (conduction type), and a combination of 2 or more of these parts. Among the drying steps, those involving heating are also referred to as primary heating steps. The drying step using the drying mechanism immediately promotes the drying of the aqueous ink composition adhering to the recording medium. When the drying step is performed, it is possible to promote the drying of the aqueous ink composition adhering to the recording medium and reduce the deterioration of the image due to the bleeding of the aqueous ink composition. Such a drying step is also referred to as a primary drying step.

On the other hand, it is also preferable not to perform the drying step using a drying mechanism. Since the aqueous ink composition used in the present embodiment contains an organic solvent B having a normal boiling point of 250° C. or lower, the drying speed is high. Therefore, even when the drying step using the drying mechanism is not performed, it is possible to inhibit the aqueous ink composition adhering to the recording medium from bleeding and deteriorating the image. Further, by not performing the drying step using the drying mechanism, the ejection stability at the nozzle may be more excellent, the wet spreadability of the ink may be improved, and the image quality may be further improved.

The surface temperature of the recording medium at the time of adhesion of the aqueous ink composition is preferably 45° C. or lower, more preferably 43° C. or lower, still more preferably 40° C. or lower, further preferably 38° C. or lower, and particularly preferably 35° C. or lower. On the other hand, the lower limit is preferably 20° C. or higher, more preferably 23° C. or higher, still more preferably 25° C. or higher, particularly preferably 28° C. or higher, and further preferably 30.0° C. or higher, and more preferably 32.0° C. or higher. Further, 35.0° C. or higher is preferable, and 37.0° C. or higher is more preferable.

Further, 20° C. or higher and 45° C. or lower is more preferable. Further, it is preferably 27° C. or higher and 45° C. or lower, more preferably 28° C. or higher and 43° C. or lower, still more preferably 30° C. or higher and 40° C. or lower, and particularly preferably 32° C. or higher and 38° C. or lower. The temperature is the surface temperature of the portion of the recording surface of the recording medium that receives the adhesion of the aqueous ink composition in the adhering step, and is the highest temperature of the adhering step in the recording area. The surface temperature of the recording medium at a position facing the ink jet head during recording. When the surface temperature is not more than the above upper limit, it is more preferable in terms of suppressing image deterioration, reducing clogging, and high gloss. When it is at least the above lower limit, it is more preferable in terms of fastness, good ink spread, and excellent image quality.

The surface temperature of the recording medium at the time of adhesion can be relatively high by performing a drying step using a drying mechanism, and relatively low by not performing the drying step.

When the drying step is performed, it can be performed at the same time as one or two or more of the above-mentioned ink adhering steps. Even when the drying step is performed at the same time as the adhering step, the surface temperature of the recording medium in the adhering step can be in the above range, which is preferable. When the drying step is performed in this way, this step may be referred to as a first heating step.

1.1.2.2. Heating Step

The ink jet recording method according to the present embodiment may include a heating step of heating the recording medium after the ink adhering step. The heating step can be performed, for example, by using an appropriate heating part. The heating step after the ink adhering step is performed by, for example, an after-heater (corresponding to the heating heater 5 in the example of the ink jet recording apparatus described later). The heating part is not limited to the heating part provided in the ink jet recording apparatus, and other heating part may be used. The resulting image can be dried and more fully fixed, so that, for example, the recorded matter can be manufactured ready for early use. The heating step is also called a secondary heating step or a post-heating step.

The temperature of the recording medium in this case is not particularly limited, but can be set in consideration of, for example, the Tg of the resin particles contained in the recorded matter. When considering the Tg of the resin particles, it is preferable to set the temperature to 5° C. or higher, preferably 10° C. or higher, than the Tg of the resin particles.

The surface temperature of the recording medium reached by heating in the heating step is preferably 30° C. or higher and 120° C. or lower, particularly preferably 40° C. or higher and 100° C. or lower, more preferably 50° C. or higher and 95° C. or lower, and still more preferably 70° C. or higher and 90° C. or lower. Especially preferably, it is 60° C. or higher. When the temperature of the recording medium is in this range, the resin particles contained in the recorded matter can be filmed and flattened, and the obtained image can be dried and fixed more sufficiently.

Further, in the ink jet recording method according to the present embodiment, since the aqueous ink composition described later is used and the drying speed is high, the image can be dried with less energy.

1.2. Recording Medium

As the recording medium used in the ink jet recording method according to the present embodiment, an absorptive recording medium may be used, or a low or non-absorptive recording medium may be used. The low or non-absorptive recording medium (low-absorptive recording medium and non-absorptive recording medium) refers to a recording medium having a property of hardly absorptive ink, absorptive little ink, or not absorptive ink at all. Quantitatively, the low or non-absorptive recording medium used in the present embodiment means "a recording medium in which the amount of water absorbed from the start of contact to 30 $msec^{1/2}$ by the Bristow method is 10 $mL/m^2$ or less". The Bristow method is the most widely used method for measuring the amount of liquid absorbed in a short time, and is also adopted by Japan Technical Association of Pulp and Paper Industry (JAPAN TAPPI). Details of the test method are given in "JAPAN TAPPI Paper and Pulp Test Method 2000 Edition", Standard No. 51 "Paper and paperboard—Liquid absorption test method—Bristow method". Examples of such a low or non-absorptive recording medium include a recording medium not having an ink receiving layer having ink absorbency on the recording surface and a recording medium having a coat layer having low ink absorbency on the recording surface.

The non-absorptive recording medium is not particularly limited, and examples thereof include a plastic film having no ink absorbing layer, a medium in which plastic or the like is coated or a plastic film is adhered on a base material such as paper. The coating manufactured of plastic or the like is an ink non-absorptive coating. Examples of the plastic here include polyvinyl chloride, polyethylene terephthalate, polycarbonate, polystyrene, polyurethane, and polyolefin. Examples of the polyolefin include polyethylene and polypropylene.

The low-absorptive recording medium is not particularly limited, and examples thereof include coated paper provided with a coating layer on the surface. The coating layer is composed of, for example, a resin or inorganic fine particles, and is a layer having low ink absorbency. The coated paper is not particularly limited, but examples thereof include printing paper such as art paper, coated paper, and matte paper.

The absorptive recording medium refers to the aforementioned "recording medium in which the amount of water absorbed from the start of contact to 30 $msec^{1/2}$ is more than 10 $mL/m^2$ in the Bristow method". Examples of the absorptive recording medium include paper such as plain paper and special paper for ink jet, and cloth.

According to the ink jet recording method according to the present embodiment, since the aqueous ink composition has excellent wet spreadability to a low or non-absorptive recording medium by containing the organic solvent A in particular, it is possible to obtain an image quality having a high OD value and excellent color development. Further, according to the ink jet recording method according to the present embodiment, since the aqueous ink composition ink composition contains the organic solvent B in particular, the penetration of the ink into the absorptive recording medium is suppressed, so that the coloring material remains on the surface, and an image quality having a high OD value and excellent color development can be obtained particularly in the absorptive recording medium.

The recording medium may be in the form of a bag or a sheet. Further, the recording medium may be subjected to surface treatment such as corona treatment or primer treatment in advance, and these surface treatments may improve the peelability of the ink from the recording medium.

The ink jet recording method according to the present embodiment may be a recording method using an ink jet recording apparatus that records on a low or non-absorptive recording medium and records on an absorptive recording medium using an aqueous ink composition. Further, a recording method may be performed using an ink jet recording apparatus on either a low or non-absorptive recording medium or an absorptive recording medium. For example, in an ink jet recording apparatus, recording conditions are set so that recording on a low or non-absorptive recording medium and recording on an absorptive recording medium can be performed using the aqueous ink composition of the present embodiment. From the setting of these recording conditions, recording on a low or non-absorptive recording medium or recording on an absorptive recording medium is selected, and recording is performed using the setting of the selected recording condition. The recording conditions are not limited, but are, for example, the adhesion amount of ink, the recording resolution, the temperature of the drying step, and the like.

1.3. Aqueous Ink Composition

The aqueous ink composition that can be used in the ink jet recording method according to the present embodiment has an organic solvent A that is a 1,2-alkanediol having a surface tension of 30 mN/m or less at 25° C. and a normal boiling point of 250° C. or lower. It contains an organic solvent B, which is a both-end-type alkanediol having 3 or more carbon atoms. By containing the organic solvent A and the organic solvent B, the aqueous ink composition can be used for recording on a low-absorptive recording medium and recording on an absorptive recording medium. Further, the aqueous ink composition is ejected from an ink jet head provided with a circulation mechanism for circulating ink inside and used for recording. Hereinafter, each component contained in the aqueous ink composition will be described.

1.3.1. Organic Solvent A

The aqueous ink composition contains an organic solvent A which is a 1,2-alkanediol having a surface tension of 30 mN/m or less at 25° C. The organic solvent A has an effect of promoting penetration into the absorptive recording medium while enhancing the wet spreadability to the low or non-absorptive recording medium. As a result, the wet spreadability of the ink on the low or non-absorptive recording medium is excellent, so that it is possible to obtain an image quality having a high OD value and excellent color development in the low or non-absorptive recording medium.

The surface tension of the organic solvent A at 25° C. is 30 mN/m or less, preferably 29 mN/m or less, more preferably 28 mN/m or less, and particularly preferably 27 mN/m or less. The surface tension of the organic solvent A at 25° C. is preferably 10 mN/m or more, more preferably 15 mN/m or more, and particularly preferably 20 mN/m or more. The 1,2-alkanediol having a surface tension at 25° C. in the above range is useful as a penetrating solvent and can enhance the wet spreadability of the ink to a low or non-absorptive recording medium. As a method for measuring surface tension, a commonly used surface tension meter (for example, surface tension meter CBVP-Z manufactured by Kyowa Interface Science Co., Ltd.) is used, and the liquid temperature is 25° C. by the Wilhelmy method. The method of measurement can be exemplified.

As such an organic solvent A, 1,2-alkanediol having 5 or more carbon atoms is preferable, and 1,2-alkanediol having 5 to 7 carbon atoms is more preferable. Specific examples of the organic solvent A include 1,2-pentanediol, 1,2-hexanediol, 1,2-heptanediol, and any of 1,2-pentanediol and 1,2-hexanediol. Is preferable, and 1,2-hexanediol is particularly preferable.

The upper limit of the content of the organic solvent A is preferably 10% by mass or less, more preferably 8% by mass or less, and particularly preferably 7% by mass or less, with respect to the total mass of the aqueous ink composition. The lower limit of the content of the organic solvent A is preferably 0.5% by mass or more, more preferably 1% by mass or more, still more preferably 2% by mass or more, particularly preferably 3% by mass or more, with respect to the total mass of the aqueous ink composition. When the content of the organic solvent A is within the above range, the wet spreadability to the low or non-absorptive recording medium can be sufficiently enhanced, so that the low or non-absorptive recording medium can easily obtain an image quality having a high OD value and excellent color development. Further, the organic solvent A has a function of lowering the dynamic surface tension of the ink and may generate mist of the ink, but when the content of the organic solvent A is within the above range, such an adverse effect can be prevented.

1.3.2. Organic Solvent B

The aqueous ink composition contains an organic solvent B which is a both-end-type alkanediol having a normal boiling point of 250° C. or lower and a carbon number of 3 or more. The organic solvent B has a function of suppressing the penetration of the ink into the absorptive recording medium promoted by the organic solvent A. As a result, the penetration of the ink into the absorptive recording medium is suppressed, so that the coloring material remains on the surface, and an image quality having a high OD value and excellent color development can be obtained particularly in the absorptive recording medium.

It is considered that the reason why the organic solvent B has such a function is that the structure having hydroxyl groups at both ends contributes and that these organic solvents B tend to have a slightly high viscosity. However, the reason is not limited to this.

The normal boiling point of the organic solvent B is 250° C. or lower, preferably 245° C. or lower, and particularly preferably 240° C. or lower. When the normal boiling point of the organic solvent B is within the above range, the organic solvent B can be quickly volatilized when the ink is adhered to the low or non-absorptive recording medium to form an image, so that the organic solvent B is suitable for an ink jet recording method using the low or non-absorptive recording medium. In addition, dryness and image quality are more excellent and preferable.

On the other hand, the normal boiling point of the organic solvent B is preferably 160° C. or higher, more preferably 180° C. or higher, further preferably 200° C. or higher, particularly preferably 210° C. or higher, further preferably 220° C. or higher, and particularly preferably 230° C. or higher. When the normal boiling point is at least the above range, ejection reliability and the like are more excellent and preferable. Further, it is presumed that the organic solvent B, which has a function of suppressing the penetration of ink into the absorptive recording medium promoted by the organic solvent A, tends to have a normal boiling point in the above range. The "normal boiling point" in the present specification means the boiling point at a pressure of 1 atm.

Examples of such an organic solvent B include both-end-type alkanediols having 3 or more carbon atoms, and both-end-type alkanediols having 3 to 7 carbon atoms are preferable. Specific examples of the organic solvent B include 1,3-propanediol (214° C.), 1,4-butanediol (228° C.), 1,5-pentanediol (239° C.), and 1,6-hexanediol (250° C.) and the like, and any one of 1,3-propanediol, 1,5-pentanediol and 1,6-hexanediol is preferable, and 1,5-pentanediol is particularly preferable. The numbers in parentheses represent the normal boiling point.

The upper limit of the content of the organic solvent B is preferably 30.0% by mass or less, more preferably 25.0% by mass or less, and particularly preferably 20.0% by mass or less, with respect to the total mass of the aqueous ink composition. Furthermore, it is preferably 17.0% by mass or less, more preferably 15.0% by mass or less. On the other hand, the lower limit of the content of the organic solvent B is preferably 4.0% by mass or more, more preferably 6.0% by mass or more, and particularly preferably 7.0% by mass or more with respect to the total mass of the aqueous ink composition. Further, 10.0% by mass or more is preferable, and 14.0% by mass or more is more preferable. When the content of the organic solvent B is within the above range, the penetration of the ink into the absorptive recording medium promoted by the organic solvent A can be sufficiently suppressed, so that the low or non-absorptive recording medium can easily obtain an image quality having a high OD value and excellent color development.

The upper limit of the total content of the organic solvent A and the organic solvent B is preferably 30.0% by mass or less, more preferably 25.0% by mass or less, and particularly preferably 20.0% by mass or less with respect to the total mass of the aqueous ink composition. The lower limit of the total content of the organic solvent A and the organic solvent B is slightly preferably 3.0% by mass or more, preferably 5.0% by mass or more, more preferably 7.0% by mass or more, and particularly preferably 10.0% by mass or more with respect to the total mass of the aqueous ink composition. Further, 13.0% by mass or more is preferable. Since both the organic solvent A and the organic solvent B are hydrophilic organic solvents, they are highly soluble in water, but when the total content of the organic solvent A and the organic solvent B is within the above range, deterioration of image quality can be reduced even when ink is adhered to a low or non-absorptive recording medium.

In the aqueous ink composition, the upper limit of the mass ratio ($M_B/M_A$) of the content ($M_B$) of the organic solvent B to the content of the organic solvent A ($M_A$) is slightly preferably 20.0 or less, preferably 16.0 or less, more preferably 10.0 or less, and particularly preferably 6.0 or less. Furthermore, 5.0 or less is preferable. On the other hand, the lower limit of the mass ratio ($M_B/M_A$) is preferably 0.2 or more, more preferably 0.5 or more, and particularly preferably 1 or more. Furthermore, 2.0 or more is preferable, 3.0 or more is more preferable, and 4.0 or more is more preferable. When the mass ratio ($M_B/M_A$) is within the range, the balance between the content of the organic solvent A and the organic solvent B is good, so that it is possible to easily improve the image quality on both the low or non-absorptive recording medium and the absorptive recording medium, and to easily secure the ink ejection stability at the same time.

1.3.3. Water

The aqueous ink composition contains water. In the present specification, the term "aqueous" means that water is contained as one of the main solvent components. Water is contained as a main solvent component, and is a component that evaporates and scatters due to drying. The water is preferably water from which ionic impurities are removed as much as possible, such as pure water or ultrapure water such as ion-exchanged water, ultra-filtered water, reverse osmosis water, and distilled water. Further, it is preferable to use water sterilized by ultraviolet ray irradiation, addition of hydrogen peroxide, or the like since the generation of mold and bacteria can be suppressed when the aqueous ink composition is stored for a long period of time. The content of water is not particularly limited, but is preferably 40.0% by mass or more, more preferably 50.0% by mass or more, more preferably 70.0% by mass or more, still more preferably 75.0% by mass or more, still more preferably 80.0% by mass or more and 98.0% by mass or less, particularly preferably 85.0% by mass or more and 95.0% by mass or less, with respect to the total mass of the aqueous ink composition.

The weighted average value (hereinafter referred to as "solvent composition boiling point") of the normal boiling points of the water and the organic solvents contained in the aqueous ink composition and the respective contents in the aqueous ink composition is preferably 130° C. or lower, more preferably 90 to 120° C., and particularly preferably 95 to 115° C. Each organic solvent is an organic solvent A, B, and other organic solvents, if contained. When the boiling point of the solvent composition is within the above range, especially when the ink is adhered to the low or non-absorptive recording medium, the solvent contained in the ink can be quickly volatilized, so that a viscous image is hardly formed and an image having a high OD value and excellent color development can easily be obtained.

The solvent composition boiling point is the value obtained by multiplying each component of each organic solvent and water by the normal boiling point of the component and the content (% by mass) of the component with respect to the ink (100% by mass of ink), obtaining a total sum for each component, and dividing the total sum by 100. Not only the ratio of the content of each component to the total of each organic solvent and water, but also the ratio of the total content of each organic solvent and water to the total ink is taken into consideration.

1.3.4. Other Components 1.3.4.1. Coloring Material

The aqueous ink composition may contain a coloring material. As the coloring material, either pigments or dyes can be used, and carbon black, inorganic pigments including titanium white, organic pigments, oil-soluble dyes, acidic dyes, direct dyes, reactive dyes, basic dyes, disperse dyes, sublimation dyes, and the like can be used. The aqueous ink composition preferably contains a pigment, and the pigment may be dispersed by a dispersion resin.

As the inorganic pigment, carbon black (C.I. Pigment Black 7) such as furnace black, lamp black, acetylene black, channel black, iron oxide, titanium oxide, zinc oxide, silica, and the like can be used.

Examples of the organic pigment include quinacridone pigment, quinacridone quinone pigment, dioxazine pigment, phthalocyanine pigment, anthrapyrimidine pigment, ansanthrone pigment, indanthron pigment, flavanthrone pigment, perylene pigment, diketopyrrolopyrrole pigment, perinone pigment, quinophthalone pigment, anthraquinone pigment, thioindigo pigment, benimidazolone pigment, isoindolinone pigment, azomethine pigment, or azo pigment.

Specific examples of the organic pigment used in the aqueous ink composition include the followings.

Examples of the cyan pigment include C.I. Pigment Blue 1, 2, 3, 15:3, 15:4, 15:34, 16, 22, 60, and the like; C.I. Bat blue 4, 60, preferably one or a mixture of two or more selected from the group consisting of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, 202; and C.I. Pigment Violet 19, preferably C.I. Pigment Red 122, 202, and 209, preferably one or a mixture of two or more selected from the group consisting of C.I. Pigment Violet 19.

Examples of the yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, preferably one or a mixture of two or more selected from the group consisting of C.I. Pigment Yellow 74, 109, 110, 128, and 138.

Pigments of other colors can also be used. For example, orange pigment, green pigment, and the like can be mentioned.

The pigments exemplified above are examples of suitable pigments, and the present disclosure is not limited thereto. These pigments may be used as one or a mixture of two or more kinds, or may be used in combination with a dye.

Further, the pigment may be dispersed and used by using a dispersant selected from a water-soluble resin, a water-dispersible resin, a surfactant and the like, or the pigment surface may be treated with ozone, hypochlorous acid, fuming sulfuric acid or the like. It may be oxidized or sulfonated and dispersed as a self-dispersing pigment.

In the aqueous ink composition, when the pigment is dispersed by the dispersion resin, the ratio of the pigment to the dispersion resin is preferably 10:1 to 1:10, more preferably 4:1 to 1:3. The volume-average particle size of the pigment when dispersed is preferably less than 500 nm in maximum particle diameter and 300 nm or less in average particle diameter as measured by the dynamic light scattering method, and more preferably 200 nm or less in average particle diameter.

The content of the coloring material can be appropriately adjusted according to the application, but is preferably 0.1% by mass or more and 17.0% by mass or less, more preferably 0.2% by mass or more and 15.0% by mass or less, still more preferably 1.0% by mass or more and 10.0% by mass or less, and particularly preferably 2.0% by mass or more and 5.0% by mass or less, with respect to the total mass of the aqueous ink composition.

When a pigment is used as the coloring material, the volume-average particle size of the pigment particles is preferably 10 to 200 nm or less, more preferably 30 to 200 nm, still more preferably 50 to 150 nm, and particularly preferably 70 to 120 nm.

1.3.4.2. Resin Particles

The aqueous ink composition preferably contains resin particles. When the aqueous ink composition contains resin particles, the water resistance and abrasion resistance of the recorded matter may be improved.

Examples of such resin particles include urethane resins, acrylic resins, fluorene resins, polyolefin resins, rosin-modified resins, terpene resins, polyester resins, polyamide resins, epoxy resins, vinyl chloride resins, and ethylene vinyl acetate resins. These resin particles are often handled in the form of an emulsion, but may be in the form of powder. Further, the resin particles can be used alone or in combination of two or more.

Urethane resin is a generic term for resins that have the urethane linkage. A urethane resin may be, for example, a urethane-acrylic resin, which contains, besides the urethane linkage, the acrylic skeleton in its backbone, a polyether urethane resin, which contains, besides the urethane linkage, the ether linkage in its backbone, a polyester urethane resin, which contains the ester linkage in its backbone, or a polycarbonate urethane resin, which contains the carbonate linkage in its backbone. The urethane resin may be a commercially available one. For example, the urethane resin may be selected from commercially available urethane resins including SUPERFLEX 210, 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg.), Takelac WS-6020, WS-6021, and W-512-A-6 (trade names, Mitsui Chemicals Polyurethanes), Sancure 2710 (trade name, LUBRIZOL), and PERMARIN UA-150 (trade name, Sanyo Chemical Industries).

Acrylic resin is a generic term for polymers obtained by polymerizing at least an acrylic monomer such as (meth)acrylic acid and (meth)acrylate as a component, and is, for example, from an acrylic monomer. Examples thereof include the obtained resin and a copolymer of an acrylic monomer and a monomer other than the acrylic monomer. Examples thereof include an acrylic-vinyl resin which is a copolymer of an acrylic monomer and a vinyl monomer. Further, for example, a copolymer with a vinyl monomer such as styrene can be mentioned. As the acrylic monomer, acrylamide, acrylonitrile and the like can also be used. The urethane-acrylic resin is included in the above urethane resin.

Commercially available emulsions made of acrylic resins may be used, and may be selected from, for example, FK-854, Mobil 952 B, 718 A (trade name: manufactured by Japan Coating Resin Co., Ltd.), NipolLX 852, LX 874 (trade name: manufactured by ZEON), Polisole AT 860 (manufactured by Showa Denko K.K.), Boncoat AN-1190S, YG-651, AC-501, AN-1170, 4001 (trade name, manufactured by DIC Corporation, acrylic resin emulsion), and the like.

In addition, in the present specification, the acrylic resin may be a styrene acrylic resin as described above. Further, in the present specification, the term "(meth)acrylic" means at least one of acrylic and methacrylic.

A styrene-acrylic resin is a copolymer of a styrene monomer and an acrylic monomer. Examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. The styrene-acrylic resin may be a commercially available one. Examples thereof include JONCRYL 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF), and Mowinyl 966A and 975N (trade names, manufactured by Japan Coating Resin).

The vinyl chloride resin may be a vinyl chloride-vinyl acetate copolymer.

A polyolefin resin is a resin that has an olefin, such as ethylene, propylene, or butylene, as its structural backbone and can be a suitable one selected from known polyolefin resins. As the olefin resin, a commercially available product can be used, and for example, arrow base CB-1200, CD-1200 (trade name, manufactured by Unitika Ltd.), and the like may be selected and used.

The resin particles, moreover, may be supplied in emulsion form. Examples of a commercially available collection of such resin emulsions include MICROGEL E-1002 and E-5002 (trade names of Nippon Paint products, styrene-acrylic resin emulsions), VONCOAT AN-1190S, YG-651, AC-501, AN-1170, 4001, 5454 (trade names of products manufactured by DIC Corporation, styrene-acrylic resin emulsion), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names of a product manufactured by Showa Denko products), POLYSOL SAE1014 (trade name, a styrene-acrylic resin emulsion, ZEON), SAIVINOL SK-200 (trade name, an acrylic resin emulsion, Saiden Chemical Industry), AE-120A (trade name of a product manufactured by JSR, an acrylic resin emulsion), AE373D (trade name of a product manufactured by Emulsion Technology, a carboxy-modified styrene-acrylic resin emulsion), SEIKADYNE 1900 W (trade name of a product manufactured by Dainichiseika Color & Chemicals Mfg., an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion), (trade names of products manufactured by Nissin Chemical Industry products), VINYBLAN 700, 2586 (manufactured by Nissin Chemical Industry, elitel KA-5071S, KT-8803, KT-9204, KT-8701, KT-8904, and KT-0507 (trade names of products manufactured by Unitika, polyester resin emulsions), Hytec SN-2002 (trade name of a product manufactured by Toho Chemical, a polyester resin emulsion), Takelac W-6020, W-635, W-6061, W-605, W-635, and W-6021 (trade names of products manufactured by Mitsui Chemicals Polyurethanes, urethane resin emulsions), SUPERFLEX 870, 800, 150, 420, 460, 470, 610, 620, and 700 (trade names of products manufactured by DKS Co., Ltd., urethane resin emulsions), PERMARIN UA-150 (manufactured by Sanyo Chemical Industries, a urethane resin emulsion), Sancure 2710 (manufactured by Lubrizol Japan, a urethane resin emulsion), NeoRez R-9660, R-9637, and R-940 (manufactured by Kusumoto Chemicals Ltd., urethane resin emulsions), ADEKA BONTIGHTER HUX-380 and 290K (manufactured by ADEKA Corporation, urethane resin emulsions), Mowinyl 966A and Mowinyl 7320 (manufactured by Japan Coating Resin), JONCRYL 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all manufactured by BASF), NK Binder R-5HN (manufactured by Shin-Nakamura Chemical Co., Ltd.), HYDRAN WLS-210 (non-crosslinked polyurethane, manufactured by DIC Corporation), and JONCRYL 7610 (manufactured by BASF).

The upper limit of the content of the resin particles is preferably 17.0% by mass or less, more preferably 15.0% by mass or less, and particularly preferably 10.0% by mass or less, as the solid content, with respect to the total mass of the aqueous ink composition. Further, it is preferably 7.0% by mass or less. The lower limit of the content of the resin particles is preferably 0.1% by mass or more, more preferably 0.5% by mass or more, and particularly preferably 1.0% by mass or more as a solid content with respect to the total mass of the aqueous ink composition. Further, 3.0% by mass or more is preferable, and 5.0% by mass or more is more preferable. When the content of the resin particles is in the above range, it may be better in terms of ink ejection stability. Further, the recorded matter has more excellent water resistance and abrasion resistance, which is preferable.

The total content of the coloring material and the resin particles is preferably 3.0% by mass or more as a solid content with respect to the total mass of the aqueous ink composition. On the other hand, it is preferably 20.0 mass or less. It is more preferably 3.0% by mass or more and 20.0% by mass or less, and particularly preferably 4.0% by mass or more and 15.0% by mass or less. When the total content of the coloring material and the resin particles is within the above range, the solid content concentration is appropriate, so that the characteristic that the viscosity of the ink rapidly increases when the solvent component in the ink volatilizes can be obtained. As a result, the penetration of the ink into the absorptive recording medium is suppressed, so that the coloring material remains on the surface, and an image quality having a high OD value and excellent color development can be obtained particularly in the absorptive recording medium.

Among these resin particles, any of acrylic resin, urethane resin, and polyester resin is preferable because it is easily formed into a film on a recording medium and has more excellent water resistance and abrasion resistance.

The glass transition temperature of the resin of the resin particles is preferably 70° C. or lower because it is easy to form a film on a recording medium and the abrasion resistance is more excellent. On the other hand, −50° C. or higher is preferable because it has hardness and is more excellent in abrasion resistance and blocking show-through resistance. Further, −20° C. or higher is preferable, −10° C. or higher is more preferable, 0° C. or higher is further preferable, 10° C. or higher is particularly preferable, and 20° C. or higher is particularly preferable. On the other hand, 50° C. or lower is preferable, 45° C. or lower is more preferable, 40° C. or lower is further preferable, and 30° C. or lower is particularly preferable.

Further, −20° C. or higher and 60° C. or lower is preferable, −30° C. or higher and 50° C. or lower is more preferable, 20° C. or higher and 50° C. or lower is still more preferable, 25° C. or higher and 45° C. or lower is more preferable, and 30° C. or higher and 40° C. or lower is more preferable. The glass transition temperature (Tg) of the resin constituting the resin particles can be confirmed by a fixed method using differential scanning calorimetry (DSC) or the like.

1.3.4.3. Other Organic Solvents

The aqueous ink composition may contain an organic solvent other than the organic solvent A and the organic solvent B. Examples of such an organic solvent include esters, alkylene glycol ethers, cyclic esters, nitrogen-containing solvents, polyhydric alcohols, and the like.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether is preferably a monoether or diether of an alkylene glycol, more preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds resulting from the substitution of hydrogen(s) of the methylene group next to the carbonyl group of these lactones with an alkyl group having 1 to 4 carbon atoms.

Examples of the nitrogen-containing solvent include cyclic amides and acyclic amides. Examples of the acyclic amides include alkoxyalkylamides. Examples of the cyclic amide include pyrrolidones. Examples of pyrrolidones include 2-pyrrolidone and pyrrolidone having a substituent.

Polyhydric alcohols are organic solvents having two or more hydroxyl groups in the molecule. Polyhydric alcohols have, for example, 1 to 10 carbon atoms in the molecule, more preferably 2 to 6 carbon atoms. The polyhydric alcohols preferably have 1 to 4 hydroxyl groups in the molecule. Further, the polyhydric alcohols may have, for example, an alkyl group or an alkylene group having 1 to 7 carbon atoms in the structure. The number of carbon atoms of the group is preferably 2 to 6, and more preferably 2 to 3. Among polyhydric alcohols, those in which an alkane having 4 or less carbon atoms has two or more hydroxyl groups and those in which diols of alkanes having 4 or less carbon atoms in which hydroxyl groups are condensed between molecules are called polyols. The number of condensations between the molecules is preferably 2 to 4. Polyols (those not organic solvent B) have better moisturizing properties. On the other hand, such polyols do not have the function of suppressing the penetration of ink into the absorptive recording medium as provided by the organic solvent B, and are inferior to the organic solvent B in this respect.

Examples of the polyhydric alcohol include 1,2-alkanediol (for example, alkanediols such as ethylene glycol, propylene glycol, 1,2-butanediol, 1,2-octanediol) and polyhydric alcohol excluding 1,2-alkanediol (for example, diethylene glycol, propylene glycol, dipropylene glycol, 1,3-butanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1, 5-pentanediol, 2-methylpentane-2, 4-diol, and trimethylolpropane, glycerin).

These organic solvents may be used alone or in combination of two or more. By containing such an organic solvent, the wettability of the aqueous ink composition with respect to the recording medium may be improved, and the moisturizing property of the aqueous ink composition may be improved to improve the ejection stability.

The content of the other organic solvent is preferably 10.0% by mass or less, more preferably 8.0% by mass or less, and particularly preferably 5.0% by mass or less, with respect to the total mass of the aqueous ink composition. The other organic solvent is 0% by mass or more, more preferably 1.0% by mass or more.

The aqueous ink composition preferably does not contain more than 4% by mass of an organic solvent of polyols having a normal boiling point of more than 280° C. in the ink, more preferably not more than 1% by mass, and still more preferably not more than 0.5% by mass. Not including more than that means that it may or may not be included if it does not exceed.

Further, the aqueous ink composition preferably has a content of an organic solvent having a normal boiling point of higher than 280° C. in the above range. Here, the organic solvent is the above-mentioned organic solvents A and B and other organic solvents. Here, the pH adjuster described later is not included in the organic solvent. Organic solvents having a normal boiling point of higher than 280° C., especially polyols, have a large function as a moisturizer, but tend to slow down the drying of the ink after adhering to the recording medium, and thus the above range is more preferable for excellent dryness and image quality.

The organic solvent contained in the aqueous ink composition preferably has a normal boiling point of 160 to 280° C.

1.3.4.4. Surfactant

The aqueous ink composition may contain a surfactant. The surfactant has a function of lowering the surface tension of the aqueous ink composition and improving the wettability with the recording medium and the underlying layer. Among the surfactants, acetylene glycol surfactants, silicon surfactants, and fluorosurfactants can be preferably used.

An acetylene glycol surfactant can be of any kind, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; manufactured by Air Products and Chemicals), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names; manufactured by Nissin Chemical Industry), and ACETYLENOL E00, E00P, E40, and E100 (all are trade names; manufactured by Kawaken Fine Chemicals).

The silicon surfactant is not particularly limited, but a polysiloxane compound is preferably mentioned. The polysiloxane compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (trade names: manufactured by Big Chemie Japan Co., Ltd.). KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (trade name, manufactured by Shin-Etsu Chemical Co., Ltd.) can be mentioned.

A fluorosurfactant is preferably a fluorine-modified polymer. Specific examples thereof include BYK-3440 (manufactured by BYK Japan), SURFLON S-241, S-242, and S-243 (all trade names; manufactured by AGC Seimi Chemical), and FTERGENT 215M (manufactured by NEOS).

When the aqueous ink composition contains a surfactant, a plurality of types may be contained. When the surfactant is contained in the aqueous ink composition, the content is preferably 0.1% by mass or more and 2.0% by mass or less, more preferably 0.2% by mass or more and 1.5% by mass or less, particularly preferably 0.3% by mass or more and 1.0% by mass or less, with respect to the total mass of the aqueous ink composition.

1.3.4.5. pH Adjuster

The aqueous ink composition may contain a pH adjuster. By containing the pH adjuster, for example, the elution of impurities from the member forming the ink flow path can be suppressed or promoted, and the detergency of the aqueous ink composition can be adjusted. Examples of the pH adjuster include amino alcohols such as ureas, amines, morpholines, piperazines, and triethanolamine.

1.3.4.6. Other Components

The aqueous ink composition may contain additives such as wax, chelating agent, rust inhibitor, antifungal agent, antioxidant, and reduction agent, if necessary.

Examples of the wax include polyolefin wax such as polyethylene wax, and paraffin wax.

Examples of the chelating agent include ethylenediaminetetraacetate (EDTA), nitrilotriacetate of ethylenediamine, hexametaphosphate, pyrophosphate, and metaphosphate.

1.3.5. Production Method of Aqueous Ink Composition

The method for producing the aqueous ink composition is not particularly limited, but the aqueous ink composition can be produced, for example, by mixing the above-mentioned ink components in an arbitrary order and filtering or the like as necessary to remove impurities. As the mixing method of each component, a method in which a material is sequentially added to a container equipped with a stirring device such as a mechanical stirrer, and a magnetic stirrer, and stirred and mixed is suitably used.

1.3.6. Physical Properties of Aqueous Ink Composition

From the viewpoint of the balance between image quality and reliability as an ink for ink jet recording, the aqueous ink composition preferably has a surface tension of 20 mN/m or more and 40 mN/m at 25° C., and more preferably 20 mN/m or more and 35 mN/m or less. The surface tension may be measured by checking the surface tension when the platinum plate is wetted with the ink in an environment of 20° C. using, for example, an automatic surface tension meter CBVP-Z (trade name, manufactured by Kyowa Interface Science Co., Ltd.).

The viscosity of the aqueous ink composition at 25° C. is preferably 4.5 mPa·s or more. On the other hand, it is preferably 10.0 mPa·s or less. Further, it is more preferably 5.0 mPa·s or more and 10.0 mPa·s or less. When the viscosity of the aqueous ink composition at 25° C. is within the above range, penetration of the ink into the absorptive recording medium is easily suppressed, so that the coloring material remains on the surface, and an image quality having a high OD value and excellent color development can be obtained particularly in the absorptive recording medium. The viscosity can be measured by using, for example, a viscoelasticity tester MCR-300 (trade name, manufactured by Pysica) in an environment of 25° C.

1.3.7. Characteristics of Aqueous Ink Composition

According to the ink jet recording method according to the present embodiment, by using an aqueous ink composition containing an organic solvent A and an organic solvent B, it is possible to obtain an image quality having a high OD value and excellent color development regardless of the recording medium, whether it is a low-absorptive recording medium or an absorptive recording medium. The mechanism is presumed as follows. That is, the organic solvent A has an effect of promoting penetration into the absorptive recording medium while enhancing the wet spreadability and spreading property into the low or non-absorptive recording medium. As a result, the wet spreadability of the ink on the low or non-absorptive recording medium is excellent, so that it is possible to obtain an image quality having a high OD value and excellent color development in the low or non-absorptive recording medium. On the other hand, the organic solvent B has a function of suppressing the penetration of the ink into the absorptive recording medium promoted by the organic solvent A. As a result, the penetration of the ink into the absorptive recording medium is suppressed, so that the coloring material remains on the surface, and an image quality having a high OD value and excellent color development can be obtained particularly in the absorptive recording medium.

However, neither the organic solvent A nor the organic solvent B contained in the aqueous ink composition may necessarily have excellent moisturizing performance. Therefore, in the ink jet recording method using the aqueous ink composition, the ejection stability may be impaired due to drying of the ink at the nozzle or the like. Therefore, by performing the ink jet recording method according to the present embodiment using an ink jet recording apparatus having an ink jet head having a circulation mechanism for circulating ink in the ink jet recording apparatus, which will be described later, it is possible to improve the image quality on both the low or non-absorptive recording medium and the absorptive recording medium, and to secure the ink ejection stability at the same time. Subsequently, an ink jet recording apparatus used in the ink jet recording method according to the present embodiment will be described.

2. Ink Jet Recording Apparatus

An ink jet recording apparatus according to an embodiment of the present disclosure includes an ink adhering section for ejecting an aqueous ink composition from an ink jet head and adhering the aqueous ink composition to a recording medium, in which the aqueous ink composition contains an organic solvent A of 1,2-alkanediol having a surface tension at 25° C. of 30 mN/m or less and an organic solvent B which is a both-end-type alkanediol having a normal boiling point of 250° C. or lower and a carbon number of 3 or more, and the ink jet head has a circulation mechanism for circulating the aqueous ink composition. The ink adhering section and the aqueous ink composition are the same as described above, and thus the description thereof will be omitted.

The ink jet recording apparatus according to the present embodiment is characterized in that the ink jet head includes a circulation mechanism for circulating the aqueous ink composition. Since the above-mentioned aqueous ink composition contains organic solvent A and organic solvent B, it cannot be said that it is excellent in moisturizing performance, and if the ink dries at or near the nozzle, the ejection stability may be impaired. Therefore, by using an ink jet head provided with a circulation mechanism for circulating the aqueous ink composition, the ink in the vicinity of the nozzle is circulated to recover the ink that is about to dry, and the ink ejection stability is improved. Hereinafter, the outline of the ink jet recording apparatus according to the present embodiment will be described.

2.1. Overview of Ink Jet Recording Apparatus

An example of an ink jet recording apparatus suitable for the above-mentioned aqueous ink composition will be described with reference to the drawings. In each drawing used in the following description, the scale and relative dimensions of each member are appropriately changed in order to make each member a recognizable size.

FIG. 1 is a schematic sectional view schematically showing an ink jet recording apparatus 1. FIG. 2 is a perspective view showing an example of a configuration around a carriage of the ink jet recording apparatus of FIG. 1. As shown in FIGS. 1 and 2, the ink jet recording apparatus 1 includes an ink jet head 2, an IR heater 3, a platen heater 4, a heating heater 5, a cooling fan 6, a preheater 7, a ventilation fan 8, and the like. It includes a carriage 9, a platen 11, a cartridge 12, a carriage moving mechanism 13, a transport section 14, and a controller CONT. In the ink jet recording apparatus 1, the operation of the entire ink jet recording apparatus 1 is controlled by the controller CONT shown in FIG. 2.

The ink jet head 2 has a configuration in which an aqueous ink composition is ejected from a nozzle of the ink jet head 2 and adhered to the recording medium M for recording. In this example, the ink jet head 2 is a serial type recording head, and scans the recording medium M a plurality of times in the main scanning direction to adhere the aqueous ink composition to the recording medium M. The ink jet head 2 is mounted on the carriage 9 shown in FIG. 2. The ink jet head 2 is scanned a plurality of times in the main scanning direction relative to the recording medium M by the operation of the carriage moving mechanism 13 that moves the carriage 9 in the medium width direction of the recording medium M. The medium width direction is the main scanning direction of the ink jet head 2. Scanning in the main scanning direction is also referred to as main scanning.

Here, the main scanning direction is the moving direction of the carriage 9 on which the ink jet head 2 is mounted. In FIG. 1, the direction intersects the sub-scanning direction, which is the transport direction of the recording medium M indicated by the arrow SS. In FIG. 2, the width direction of the recording medium M, that is, the direction represented by S1-S2 is the main scanning direction MS, and the direction represented by T1→T2 is the sub-scanning direction SS. In addition, scanning is performed in the main scanning direction, that is, in either the arrow S1 or the arrow S2 in one scan. Then, the main scanning of the ink jet head 2 and the sub-scan, which is the transport of the recording medium M, are repeated a plurality of times to record on the recording medium M. That is, the ink adhering step is performed by a plurality of main scans in which the ink jet head 2 moves in the main scanning direction and a plurality of sub-scans in which the recording medium M moves in the sub-scanning direction intersecting the main scanning direction.

The cartridge 12 that supplies the aqueous ink composition to the ink jet head 2 includes a plurality of independent cartridges. The cartridge 12 is detachably adhered to the carriage 9 on which the ink jet head 2 is mounted. Each of the plurality of cartridges is filled with different types of aqueous ink compositions and other compositions, and the cartridge 12 supplies the aqueous ink composition and other compositions to each nozzle. The cartridge 12 is mounted on the carriage 9, but the present disclosure is not limited thereto, and may be provided at a place other than the carriage 9 and supplied to each nozzle by a supply pipe (not shown).

A method in the related art can be used for ejection of the ink jet head 2. Here, a method of ejecting droplets by utilizing the vibration of the piezoelectric element, that is, an ejection method of forming ink droplets by mechanical deformation of the electrolytic distortion element is used.

The ink jet recording apparatus 1 can be provided with a drying mechanism that performs a drying step for drying the recording medium M when the aqueous ink composition from the ink jet head 2 is ejected and adheres to the recording medium M. As the drying, drying by heating or blowing air can be used. As the drying mechanism, a conduction type, a blower type, a radiation type or the like can be used. The conduction type conducts heat from a member in contact with the recording medium to the recording medium. For example, a platen heater can be mentioned. In the blower type, normal temperature air or warm air is sent to the recording medium to dry the ink. For example, a blower fan. In the radiation type, radiation that generates heat is radiated to the recording medium to heat the recording medium. For example, IR radiation. These drying mechanisms may be used alone or in combination.

For example, an IR heater 3 and a platen heater 4 are provided as a drying mechanism. When the recording medium M is dried in the drying step, an IR heater 3, a ventilation fan 8 and the like can be used.

When the IR heater 3 is used, the recording medium M can be heated by radiation of infrared rays from the side of the ink jet head 2. As a result, the ink jet head 2 is likely to be heated at the same time, but the temperature can be raised without being affected by the thickness of the recording medium M as compared with the case where the ink jet head 2 is heated from the back surface of the recording medium M such as the platen heater 4. Further, various fans (for example, a ventilation fan 8) may be provided which blows warm air or air having the same temperature as the environment to the recording medium M to dry the aqueous ink composition on the recording medium M.

The platen heater 4 heats the recording medium M at a position facing the ink jet head 2 through the platen 11 so that the aqueous ink composition ejected by the ink jet head 2 can be dried early from the time when it adheres to the recording medium M. The platen heater 4 can heat the recording medium M in a conductive manner, and is used in the ink jet recording method as necessary, and when used, it is preferable to control the surface temperature of the recording medium M to be 45.0° C. or lower. In the line-type ink jet recording apparatus described later, the platen heater 4 corresponds to an under heater. When the drying step using the drying mechanism is not performed, the drying mechanism may not be provided.

The surface temperature of the recording medium M in the ink adhering step is preferably in the above range. Here again, for example, it is preferably 45.0° C. or lower, more preferably 40.0° C. or lower, still more preferably 38.0° C. or lower, and particularly preferably 35.0° C. or lower. The lower limit of the surface temperature of the recording medium M is preferably 25.0° C. or higher, more preferably 28.0° C. or higher, still more preferably 30.0° C. or higher, and particularly preferably 32.0° C. When the surface temperature of the recording medium M in the ink adhering step is in these ranges, drying and composition fluctuation of the aqueous ink composition in the ink jet head 2 can be suppressed, and welding of the aqueous ink composition and resin to the inner wall of the ink jet head 2 can be suppressed. Further, the aqueous ink composition can be fixed on the recording medium M at an early stage, set-off can be suppressed, and the image quality can be improved.

After the ink adhering step, a post-heating step may be provided in which the recording medium is heated to dry and fix the ink. Post-heating is also called secondary heating.

The heating heater 5 used in the post-heating step is a heater for drying and solidifying the aqueous ink composition adhering to the recording medium M, that is, for secondary heating or secondary drying. The heating heater 5 can be used in the post-heating step. When a heating heater 5 heats a recording medium M on which an image is recorded, moisture or the like contained in the aqueous ink composition evaporates and scatters more quickly, and an ink film is formed of a resin or the like contained in the aqueous ink composition. In this way, the ink film is firmly fixed or adhered on the recording medium M to have excellent film-formability, and an excellent high-quality image can be obtained in a short time.

The surface temperature of the recording medium M in the secondary heating is preferably in the above range. Here again, the upper limit is preferably 120.0° C. or lower, more preferably 100.0° C. or lower, and even more preferably 90.0° C. or lower. The lower limit of the surface temperature of the recording medium M is preferably 60.0° C. or higher, more preferably 70.0° C. or higher, and even more preferably 80.0° C. or higher. When the surface temperature of the recording medium M is within the above range, a high-quality image can be obtained in a short time. In the line-type ink jet recording apparatus described later, the heating heater 5 corresponds to an after-heater and is composed of a carbon heater or the like.

The ink jet recording apparatus 1 may have a cooling fan 6. After the aqueous ink composition recorded on the recording medium M is dried, the ink on the recording medium M is cooled by the cooling fan 6, so that an ink coating film can be formed on the recording medium M with good adhesion.

Further, the ink jet recording apparatus 1 may include a preheater 7 that preheats the recording medium M before the aqueous ink composition adheres to the recording medium M. Further, the ink jet recording apparatus 1 may include a ventilation fan 8 so that the aqueous ink composition adhering to the recording medium M dries more efficiently. The preheater 7 may also be provided in the line-type ink jet recording apparatus described later.

Below the carriage 9, there are a platen 11 that supports the recording medium M, a carriage moving mechanism 13 that moves the carriage 9 relative to the recording medium M, and a roller that transports the recording medium M in the sub-scanning direction. It is provided with a transport section 14. The operations of the carriage moving mechanism 13 and the transport section 14 are controlled by the controller CONT.

FIG. 3 is a functional block diagram of the ink jet recording apparatus 1. The controller CONT is a control unit for controlling the ink jet recording apparatus 1. The interface unit 101 (I/F) is for transmitting and receiving data between the computer 130 (COMP) and the ink jet recording apparatus 1. CPU 102 is an arithmetic processor for controlling the entire ink jet recording apparatus 1. The memory 103 (MEM) is for securing an area for storing the program of the CPU 102, a work area, and the like. The CPU 102 controls each unit by the unit control circuit 104 (UCTRL). The detector group 121 (DS) monitors the situation in the ink jet recording apparatus 1, and the controller CONT controls each unit with respect to the detection result.

The transport unit 111 (CONVU) controls the sub-scanning (transport) of the ink jet recording, and specifically controls the transport direction and transport speed of the recording medium M. Specifically, the transport direction and transport speed of the recording medium M are controlled by controlling the rotation direction and rotation speed of the transport roller driven by a motor.

The carriage unit 112 (CARU) controls the main scanning (pass) of the ink jet recording, and specifically, reciprocates the ink jet head 2 in the main scanning direction. The carriage unit 112 includes a carriage 9 on which the ink jet head 2 is mounted, and a carriage moving mechanism 13 for reciprocating the carriage 9.

The head unit 113 (HU) controls the amount of aqueous ink composition ejected from the nozzle of the ink jet head 2. For example, when the nozzle of the ink jet head 2 is driven by a piezoelectric element, the operation of the piezoelectric element in each nozzle is controlled. The head unit 113 controls the adhesion timing, dot size, and the like of each aqueous ink composition. In addition, the amount of aqueous ink composition adhered per scan is controlled by the combination of control of the carriage unit 112 and the head unit 113.

The drying unit 114 (DU) controls the temperatures of various heaters such as the IR heater 3, the preheater 7, the platen heater 4, and the heating heater 5.

The above-mentioned ink jet recording apparatus 1 alternately repeats an operation of moving the carriage 9 on which the ink jet head 2 is mounted in the main scanning direction and a transport operation (sub-scanning). At this time, when performing each pass, the controller CONT controls the carriage unit 112 to move the ink jet head 2 in the main scanning direction and controls the head unit 113 to eject droplets of aqueous ink composition from a predetermined nozzle hole of the ink jet head 2 and to adhere droplets of aqueous ink composition to the recording medium M. Further, the controller CONT controls the transport unit 111 to transport the recording medium M in the transport direction with a predetermined transport amount (feed amount) during the transport operation.

In the ink jet recording apparatus 1, the recording area to which a plurality of droplets are adhered is gradually transported by repeating the main scanning (pass) and the sub-scanning (transport operation). Then, the heating heater 5 dries the droplets adhering to the recording medium M to complete the image. After that, the completed recorded matter may be wound into a roll by a winding mechanism or transported by a flatbed mechanism.

2.2. Ink Jet Head with Circulation Mechanism

The ink jet recording apparatus according to the present embodiment is ejected by an ink jet head provided with a circulation mechanism for circulating at least an aqueous ink composition. That is, at least the aqueous ink composition is circulated by the circulation mechanism. The circulation mechanism has a path for the aqueous ink composition to pass through the pressure chamber and flow back into the pressure chamber.

In the present embodiment, the ink jet head 2 includes a circulation mechanism for circulating the aqueous ink composition. Due to the circulation mechanism of the aqueous ink composition, when the aqueous ink composition dries, even in case in which the concentration of the solid content of the aqueous ink composition increases, the aqueous ink composition having a high concentration is returned upstream and mixed with the new aqueous ink composition, thereby ensuring good ejection stability.

FIG. 4 is a schematic view of a section of the ink jet head 2 in a section perpendicular to the transport direction (sub-scanning direction SS, see FIG. 2) of the recording medium M in the Y direction. In FIG. 4, a plane parallel to the surface of the recording medium M is referred to as an X-Y plane, and a direction perpendicular to the X-Y plane is hereinafter referred to as a Z direction. The ejection direction of the aqueous ink composition by the ink jet head 2 corresponds to the Z direction.

A plurality of nozzles N of the ink jet head 2 are arranged in the Y direction to form a nozzle row. In the ink jet head 2, a plane that passes through the central axis parallel to the Y direction and is parallel to the Z direction, that is, the Y-Z plane O is referred to as a "center plane" in the following description.

As shown in FIG. 4, the ink jet head 2 has a structure in which elements related to each nozzle N in the first row L1 and elements related to each nozzle N in the second row L2 are arranged symmetrically with respect to the center plane O. That is, the portion of the recording head 2 on the positive side in the X direction (hereinafter, also referred to as "first portion") with the center plane O in between, and the portion on the negative side in the X direction (hereinafter, also referred to as "second portion") have substantially the same structure. The plurality of nozzles N in the first row L1 are formed in the first portion P1, and the plurality of nozzles N in the second row L2 are formed in the second portion P2. The center plane O corresponds to the boundary surface between the first portion P1 and the second portion P2.

Here, each nozzle N in the second row L2 and each nozzle N in the first row L1 in FIG. 4 form a nozzle row (not shown) filled with the above-mentioned aqueous ink composition. Further, although the region of the ink jet head into which the aqueous ink composition is ejected (the nozzle row in which the aqueous ink composition is filled (not shown)) is not described here, the same configuration may be used.

As shown in FIG. 4, the ink jet head 2 includes a flow path forming portion 30. The flow path forming portion 30 is a structure for forming a flow path for supplying the aqueous ink composition to the plurality of nozzles N. In the present embodiment, the flow path forming portion 30 is composed of a laminate of a first flow path substrate 32 and a second flow path substrate 34. Each of the first flow path substrate 32 and the second flow path substrate 34 is a plate-shaped member elongated in the Y direction. The second flow path substrate 34 is provided on the surface Fa on the negative side in the Z direction of the first flow path substrate 32, for example, by using an adhesive.

As shown in FIG. 4, in addition to the second flow path substrate 34, the vibrating portion 42, the piezoelectric element 44, the protective member 46, and the housing portion 48 are provided on the surface Fa of the first flow path substrate 32. On the other hand, the nozzle plate 52 and the vibration absorbing body 54 are provided on the surface Fb on the positive side of the first flow path substrate 32 in the Z direction, that is, on the side opposite to the surface Fa. Each element of the ink jet head 2 is substantially a plate-shaped member elongated in the Y direction like the first flow path substrate 32 and the second flow path substrate 34, and is joined to each other by using, for example, an adhesive. The direction in which the first flow path substrate 32 and the second flow path substrate 34 are laminated, the direction in which the first flow path substrate 32 and the nozzle plate 52 are laminated, or the direction perpendicular to the surface of each plate-shaped element can be grasped as the Z direction.

The nozzle plate 52 is a plate-shaped member on which a plurality of nozzles N are formed, and is provided on the surface Fb of the first flow path substrate 32 by using, for example, an adhesive. Each of the plurality of nozzles N is a circular through hole through which the aqueous ink composition passes. A plurality of nozzles N forming the first row L1 and a plurality of nozzles N forming the second row L2 are formed on the nozzle plate 52. Specifically, a plurality of nozzles N of the first row L1 are formed along the Y direction in a region of the nozzle plate 52 on the positive side in the X direction when viewed from the center plane O, and a plurality of nozzles N of the second row L2 are formed along the Y direction in a region on the negative side in the X direction. The nozzle plate 52 is a single plate-like member that is continuous over a portion of the first row L1 in which a plurality of nozzles N are formed and a portion of the second row L2 in which a plurality of nozzles N are formed. The nozzle plate 52 is manufactured by processing a silicon single crystal substrate using semiconductor manufacturing technology, for example, processing technology such as dry etching or wet etching. However, a known material or manufacturing method can be arbitrarily adopted for manufacturing the nozzle plate 52.

As shown in FIG. 4, on the first flow path substrate 32, a space Ra, a plurality of supply paths 61, and a plurality of communication passages 63 are formed for each of the first portion P1 and the second portion P2. The space Ra is an opening formed in a long shape along the Y direction in plan view, that is, when viewed from the Z direction, and the supply path 61 and the communication passage 63 are through holes formed for each nozzle N. The plurality of communication passages 63 are arranged in the Y direction in a plan view, and the plurality of supply paths 61 are arranged in the Y direction between the arrangement of the plurality of passages 63 and the space Ra. The plurality of supply paths 61 commonly communicate with the space Ra. Further, any one communication passage 63 overlaps the nozzle N corresponding to the communication passage 63 in a plan view. Specifically, any one communication passage 63 of the first portion P1 communicates with one nozzle N corresponding to the communication passage 63 in the first row L1. Similarly, any one communication passage 63 of the second portion P2 communicates with one nozzle N corresponding to the communication passage 63 in the second row L2.

As shown in FIG. 4, the second flow path substrate 34 is a plate-shaped member in which a plurality of pressure chambers C are formed for each of the first portion P1 and the second portion P2. The plurality of pressure chambers C are arranged in the Y direction. Each pressure chamber C is a long space formed for each nozzle N and along the X direction in a plan view. The first flow path substrate 32 and the second flow path substrate 34 are manufactured by processing a single crystal substrate of silicon by using, for example, a semiconductor manufacturing technique, similarly to the nozzle plate 52 described above. However, known materials and manufacturing methods can be arbitrarily adopted for manufacturing the first flow path substrate 32 and the second flow path substrate 34. As described above, the flow path forming portion 30 and the nozzle plate 52 include a substrate manufactured of silicon. Therefore, for example, by using the semiconductor manufacturing technology as described above, there is an advantage that a fine flow path can be formed in the flow path forming portion 30 and the nozzle plate 52 with high accuracy.

As shown in FIG. 4, the vibrating portion 42 is provided on the surface of the second flow path substrate 34 opposite to the first flow path substrate 32. The vibrating portion 42 is a plate-shaped member that can elastically vibrate. It should be noted that it is also possible to form the second flow path substrate 34 and the vibrating portion 42 integrally by selectively removing a portion of the plate-like member having a predetermined thickness in the thickness direction in a region corresponding to the pressure chamber C.

As shown in FIG. 4, the surface Fa of the first flow path substrate 32 and the vibrating portion 42 face each other at a distance inside each pressure chamber C. The pressure chamber C is a space located between the surface Fa of the first flow path substrate 32 and the vibrating portion 42, and causes a pressure change in the aqueous ink composition filled in the space. Each pressure chamber C is, for example, a space whose longitudinal direction is the X direction, and is individually formed for each nozzle N. A plurality of pressure chambers C are arranged in the Y direction for each of the first row L1 and the second row L2.

As shown in FIG. 4, the end portion of the arbitrary 1 pressure chamber C on the side of the center plane O overlaps the communication passage 63 in plan view, and the end portion on the side opposite to the center plane O overlaps the supply path 61 in plan view. Therefore, in each of the first portion P1 and the second portion P2, the pressure chamber C communicates with the nozzle N via the communication passage 63 and also communicates with the space Ra via the supply path 61. It is also possible to add a predetermined flow path resistance by forming a throttle flow path having a narrow flow path width in the pressure chamber C.

As shown in FIG. 4, on the surface of the vibrating portion 42 opposite to the pressure chamber C, for each of the first portion P1 and the second portion P2, a plurality of piezoelectric elements 44 corresponding to different nozzles N are provided. The piezoelectric element 44 is an element that is deformed by supplying a drive signal. The plurality of piezoelectric elements 44 are arranged in the Y direction so as to correspond to each pressure chamber C. The arbitrary one piezoelectric element 44 is, for example, a laminated body in which a piezoelectric layer is interposed between two electrodes facing each other. It is also possible to define the portion deformed by the supply of the drive signal, that is, the active portion that vibrates the vibrating portion 42, as the piezoelectric element 44. In the present embodiment, when the vibrating portion 42 vibrates in conjunction with the deformation of the piezoelectric element 44, the pressure in the pressure chamber C fluctuates, so that the aqueous ink composition filled in the pressure chamber C passes through the communication passage 63 and the nozzle N and is ejected.

The protective member 46 of FIG. 4 is a plate-shaped member for protecting the plurality of piezoelectric elements 44, and is provided on the surface of the vibrating portion 42 or the surface of the second flow path substrate 34. The material and manufacturing method of the protective member 46 are arbitrary, but like the first flow path substrate 32 and the second flow path substrate 34, the protective member 46 can be formed by processing, for example, a silicon single crystal substrate by semiconductor manufacturing technology. A plurality of piezoelectric elements 44 arranged in the Y direction in the figure are housed in a recess formed on the surface of the protective member 46 on the vibrating portion 42 side.

The end portion of the wiring board 28 is joined to the surface of the vibrating portion 42 opposite to the flow path forming portion 30 or the surface of the flow path forming portion 30. The wiring board 28 is a flexible mounting component on which a plurality of wirings (not shown) for electrically coupling the control unit and the ink jet head 2 are formed. Of the wiring board 28, an end portion extending to the outside through the opening formed in the protective member 46 and the opening formed in the housing portion 48 is coupled to the control unit. For example, a flexible wiring board 28 such as an FPC (flexible printed circuit) or an FFC (flexible flat cable) is preferably adopted.

The housing portion 48 is a case for storing the aqueous ink composition supplied to the plurality of pressure chambers C and the plurality of nozzles N. The surface of the housing portion 48 on the positive side in the Z direction is joined to the surface Fa of the first flow path substrate 32 with, for example, an adhesive. A known technique or manufacturing method can be arbitrarily adopted for manufacturing the housing portion 48. For example, the housing portion 48 can be formed by injection molding of a resin material.

As shown in FIG. 4, a space Rb is formed in the housing portion 48 for each of the first portion P1 and the second portion P2. The space Rb of the housing portion 48 and the space Ra of the first flow path substrate 32 communicate with each other. The space composed of the space Ra and the space Rb functions as a liquid storage chamber R for storing the aqueous ink composition supplied to the plurality of pressure chambers C. The liquid storage chamber R is a common liquid chamber shared by a plurality of nozzles N. A liquid storage chamber R is formed in each of the first portion P1 and the second portion P2. The liquid storage chamber R of the first portion P1 is located on the positive side in the X direction with respect to the center plane O, and the liquid storage chamber R of the second portion P2 is located on the negative side in the X direction with respect to the center plane O. An introduction port 482 for introducing the aqueous ink composition supplied from the cartridge 12 into the liquid storage chamber R is formed on the surface of the housing portion 48 opposite to the first flow path substrate 32.

As shown in FIG. 4, a vibration absorbing body 54 is provided on the surface Fb of the first flow path substrate 32 for each of the first portion P1 and the second portion P2. The vibration absorbing body 54 is a flexible film that absorbs pressure fluctuations of the aqueous ink composition in the liquid storage chamber R, that is, a compliance substrate. For example, the vibration absorbing body 54 is provided on the surface Fb of the first flow path substrate 32 so as to block the space Ra of the first flow path substrate 32 and the plurality of supply paths 61, and constitutes a wall surface, specifically a bottom surface, of the liquid storage chamber R.

As shown in FIG. 4, a space (hereinafter, referred to as "circulating fluid chamber") 65 is formed on the surface Fb of the first flow path substrate 32 facing the nozzle plate 52. The circulating fluid chamber 65 is a long bottomed hole extending in the Y direction in a plan view. The opening of the circulating fluid chamber 65 is closed by the nozzle plate 52 joined to the surface Fb of the first flow path substrate 32. The circulating fluid chamber 65 is continuous over a plurality of nozzles N along, for example, the first row L1 and the second row L2. Specifically, the circulating fluid chamber 65 is formed between the arrangement of the plurality of nozzles N in the first row L1 and the arrangement of the plurality of nozzles N in the second row L2. Therefore, the circulating fluid chamber 65 is located between the communication passage 63 of the first portion P1 and the communication passage 63 of the second portion P2. As described above, the flow path forming portion 30 is a structure in which the pressure chamber C and the communication passage 63 in the first portion P1, the pressure chamber C and the communication passage 63 in the second portion P2, and the circulating fluid chamber 65 located between the communication passage 63 in the first portion P1 and the communication passage 63 in the second portion P2 are formed. As shown in FIG. 4, the flow path forming portion 30 includes a wall-shaped portion (hereinafter, referred to as "partition wall portion") 69 that partitions the circulating fluid chamber 65 and each communication passage 63.

As described above, the plurality of pressure chambers C and the plurality of piezoelectric elements 44 are arranged in the Y direction in each of the first portion P1 and the second portion P2. Therefore, it can be paraphrased that the circulating fluid chamber 65 extends in the Y direction so as to be continuous over the plurality of pressure chambers C or the plurality of piezoelectric elements 44 in each of the first portion P1 and the second portion P2. Further, as shown in FIG. 4, it is also possible that the circulating fluid chamber 65 and the liquid storage chamber R extend in the Y direction with a space therebetween, and the pressure chamber C, the communication passage 63 and the nozzle N are positioned within the space therebetween.

Figure 5:
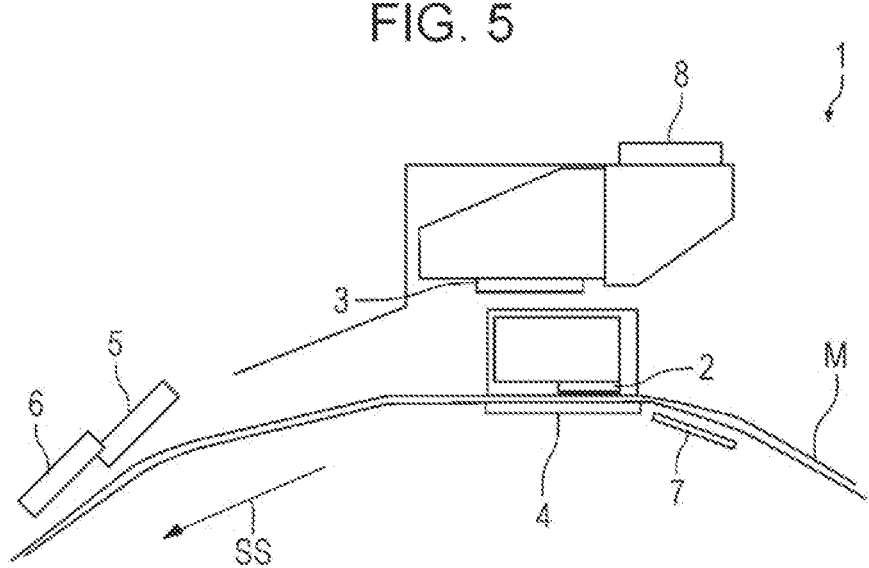
FIG. 5 is a schematic view of an example of an ink jet recording apparatus according to a present embodiment.

FIG. 5 is an enlarged sectional view of a portion of the ink jet head 2 in the vicinity of the circulating fluid chamber 65. As shown in FIG. 5, one nozzle N includes a first section n1 and a second section n2. The first section n1 and the second section n2 are cylindrical spaces that are coaxially formed and communicate with each other. The second section n2 is located on the flow path forming portion 30 side with respect to the first section n1. In the present embodiment, the central axis Qa of each nozzle N is located on the side opposite to the circulating fluid chamber 65 with respect to the central axis Qb of the communication passage 63. The inner diameter d2 of the second section n2 is larger than the inner diameter d1 of the first section n1. According to the configuration in which each nozzle N is formed in a stepped shape as described above, there is an advantage that the flow path resistance of each nozzle N can be easily set to a desired characteristic. In the present embodiment, the central axis Qa of each nozzle N is located on the side opposite to the circulating fluid chamber 65 with respect to the central axis Qb of the communication passage 63.

As shown in FIG. 5, a plurality of discharge passages 72 are formed for each of the first portion P1 and the second portion P2 on the surface of the nozzle plate 52 facing the flow path forming portion 30. The plurality of discharge passages 72 of the first portion P1 correspond one-to-one with the plurality of nozzles N in the first row L1 or the plurality of communication passages 63 corresponding to the first row L1. Further, the plurality of discharge passages 72 of the second portion P2 correspond one-to-one with the plurality of nozzles N in the second row L2 or the plurality of communication passages 63 corresponding to the second row L2.

In the ink jet head, the flow path for supplying ink and the flow path for discharging ink are combined to form a circulation path. The flow path for ejecting the ink is a flow path in which the ink deviates from the path and goes out of the path with respect to the path through which the ink passes until the ink is supplied to the ink jet head and ejected from the nozzle. The flow path for supplying ink is a flow path in which ink that has exited the path by the flow path for discharging ink enters the path again. The flow path for supplying ink may form a part of the flow path. That is, the ink that has gone out of the path may be supplied to the path again.

For example, in the example of FIG. 4, at least the supply path 61 and the discharge passage 72 are combined as the circulation path. A liquid supplied from a supply path 61 to be ejected from a nozzle N is discharged from a liquid path from the supply path 61 to the nozzle N without being ejected from the nozzle N, and is supplied again to the flow path from the supply path 61 to the nozzle N.

Each discharge passage 72 is a groove portion extending in the X direction, that is, a long bottomed hole, and functions as a flow path for circulating the aqueous ink composition. The discharge passage 72 is formed at a position separated from the nozzle N, specifically, on the circulating fluid chamber 65 side when viewed from the nozzle N corresponding to the discharge passage 72. For example, a plurality of nozzles N, particularly a second section n2 and a plurality of discharge passages 72 are collectively formed by a common step by a semiconductor manufacturing technique, for example, a processing technique such as dry etching or wet etching.

As shown in FIG. 5, each discharge passage 72 is formed linearly with a flow path width Wa equivalent to the inner diameter d2 of the second section n2 of the nozzle N. Further, the width of the discharge passage 72 in the Y direction is smaller than the width of the pressure chamber C in the Y direction. Therefore, it is possible to increase the flow path resistance of the discharge passage 72 as compared with the configuration in which the flow path width of the discharge passage 72 is larger than the flow path width of the pressure chamber C. It should be noted that the flow path width may be larger than the flow path width of the pressure chamber C. On the other hand, the depth Da of the discharge passage 72 with respect to the surface of the nozzle plate 52 is constant over the entire length. In this example, each discharge passage 72 is formed to have a depth equivalent to that of the second section n2 of the nozzle N. The discharge passage 72 and the second section n2 may be formed at different depths, but there is an advantage that the discharge passage 72 and the second section n2 can be easily formed by doing so. The "depth" of the flow path means the depth of the flow path in the Z direction, for example, the height difference between the formation surface of the flow path and the bottom surface of the flow path.

Any one discharge passage 72 in the first portion P1 is located on the circulating fluid chamber 65 side of the first row L1 with respect to the nozzle N corresponding to the discharge passage 72. Further, any one discharge passage 72 in the second portion P2 is located on the circulating fluid chamber 65 side of the second row L2 with respect to the nozzle N corresponding to the discharge passage 72. Then, the side of each discharge passage 72 opposite to the center plane O overlaps with one communication passage 63 corresponding to the discharge passage 72 in a plan view. That is, the discharge passage 72 communicates with the communication passage 63. On the other hand, the end of each discharge passage 72 on the center plane O side of the center plane overlaps the circulating fluid chamber 65 in a plan view. That is, the discharge passage 72 communicates with the circulating fluid chamber 65. In this way, each of the plurality of communication passages 63 communicates with the circulating fluid chamber 65 via the discharge passage 72. Therefore, as illustrated by the broken line arrow in FIG. 5, the aqueous ink composition in each communication passage 63 is supplied to the circulating fluid chamber 65 via the discharge passage 72. That is, in the present embodiment, the plurality of communication passages 63 corresponding to the first row L1 and the plurality of communication passages 63 corresponding to the second row L2 communicate with each other in common with one circulating fluid chamber 65.

In FIG. 5, the flow path length La of the portion of any one discharge passage 72 that overlaps the circulating fluid chamber 65 and the flow path length of the portion of the discharge passage 72 that overlaps the communication passage 63, that is, the dimensions in the X direction. Lb and the flow path length of the portion of the discharge passage 72 that overlaps the partition wall portion 69 of the flow path forming portion 30, that is, the dimension Lc in the X direction are shown. The flow path length Lc corresponds to the thickness of the partition wall portion 69. The partition wall portion 69 functions as a throttle portion of the discharge passage 72. Therefore, the longer the flow path length Lc corresponding to the thickness of the partition wall portion 69, the greater the flow path resistance of the discharge passage 72. Although the relative lengths of the flow path length La and the flow path length Lc are arbitrary, in this example, the relation that the flow path length La is longer than the flow path length Lb and the flow path length La is longer than the flow path length Lc holds. Further, in this example, the relationship that the flow path length Lb is longer than the flow path length Lc is established. According to the configuration described above, there is an advantage in that the aqueous ink composition is more likely to flow from the communication passage 63 through the discharge passage 72 into the circulating fluid chamber 65 than in a configuration in which the flow path length La and the flow path length Lb are shorter than the flow path length Lc.

In this way, in the ink jet head 2, the pressure chamber C indirectly communicates with the circulating fluid chamber 65 via the communication passage 63 and the discharge passage 72. That is, the pressure chamber C and the circulating fluid chamber 65 do not directly communicate with each other. In the above configuration, when the pressure in the pressure chamber C fluctuates due to the operation of the piezoelectric element 44, a part of the aqueous ink composition flowing in the communication passage 63 is ejected from the nozzle N to the outside, and the remaining part. Flows into the circulating fluid chamber 65 from the communication passage 63 via the discharge passage 72. Then, among the aqueous ink compositions that flow through the communication passage 63 by driving the piezoelectric element 44 once, the aqueous ink composition that is ejected through the nozzle N is the aqueous ink composition that flows through the communication passage 63. Of these, the inertia of the communication passage 63, the nozzle N, and the discharge passage 72 is selected so as to exceed the circulation amount of the aqueous ink composition flowing into the circulating fluid chamber 65 through the discharge passage 72. Assuming that all the piezoelectric elements 44 are driven at the same time, it is also possible to say that the total circulation amount flowing from the plurality of communication passages 63 into the circulating fluid chamber 65, for example, the flow rate in the circulation fluid chamber 65 within a unit time is larger than the total injection amount by the plurality of nozzles N.

Specifically, the communication passage so that the ratio of the circulation amount of the aqueous ink composition flowing through the communication passage 63 is 70% or more, that is, the ratio of the injection amount of the aqueous ink composition is 30% or less. The flow path resistances of 63, the nozzle, and the discharge passage 72 are determined. According to the above configuration, it is possible to effectively circulate the aqueous ink composition in the vicinity of the nozzle to the circulating fluid chamber 65 while securing the injection amount of the aqueous ink composition. Generally, the larger the flow path resistance of the discharge passage 72, the smaller the circulation amount while increasing the injection amount, and the smaller the flow path resistance of the discharge passage 72, the larger the circulation amount while increasing the injection amount.

For example, the ink jet recording apparatus 1 is configured to include a circulation mechanism. The circulation mechanism is a mechanism for resupplying, that is, circulating, the aqueous ink composition in the circulating fluid chamber 65 to the liquid storage chamber R. The circulation mechanism is a mechanism including at least the discharge passage 72. For example, the entire ink circulation path is a circulation mechanism, which is a mechanism for supplying ink again to the ink jet head through a discharge passage 72, a suction mechanism (for example, a pump.) for discharging ink from the circulating fluid chamber 65 to the outside of the ink jet head and sucking the aqueous ink composition to the outside, a filter mechanism for collecting bubbles and foreign substances mixed in the aqueous ink composition, a heating mechanism for reducing viscosity by drying and heating the aqueous ink composition, and the like, as required. The ink circulated outside and the new ink may be merged and supplied to the ink jet head again.

The aqueous ink composition from which air bubbles and foreign substances are removed by the circulation mechanism and whose thickening is reduced is supplied from the circulation mechanism to the liquid storage chamber R via the introduction port 482. As a result, for example, the aqueous ink composition circulates in the route of liquid storage chamber R→supply path 61→pressure chamber C→communication passage 63→discharge passage 72→circulating fluid chamber 65→outside→liquid storage chamber R. In other words, the circulation mechanism has a path for the aqueous ink composition to pass through the pressure chamber C and flow back into the pressure chamber C. It can be said that the above-mentioned circulation path is a part of the circulation mechanism.

Thus, when the discharge passage 72 for communicating the communication passage 63 with the circulating fluid chamber 65 is formed in the nozzle plate 52, the aqueous ink composition in the vicinity of the nozzle N can be efficiently circulated in the circulating fluid chamber 65. Further, since the communication passage 63 corresponding to the first row L1 and the communication passage 63 corresponding to the second row L2 are commonly communicated with the circulating fluid chamber 65 therebetween, there is also an advantage that the structure of the liquid ejection head is simplified, and that the liquid ejection head is miniaturized, as compared with a structure in which a circulating fluid chamber with which the discharge passages 72 corresponding to the first row L1 communicates and a circulating fluid chamber to which the discharge passages 72 corresponding to the second row L2 communicates are separately provided.

The discharge passage 72 and the nozzle N may not be separated from each other, but the discharge passage 72 and the nozzle N may be continuous with each other. Further, in addition to the circulating fluid chamber 65, a circulating fluid chamber corresponding to each of the first portion P1 and the second portion P2 may be formed.

The flow rate (also known as circulation volume or circulation flow) of the aqueous ink composition circulating through the circulation mechanism may be set to 0.1 times or more and 5.0 times or less, preferably 0.2 times or more and 4.0 times or less, more preferably 0.3 times or more and 3.0 times or less, still more preferably 0.5 times or more and 2.0 times or less, particularly preferably 0.7 times or more and 1.5 times or less, with respect to the maximum ejection amount of the aqueous ink composition ejected from the ink jet head to the recording medium in the recording method.

By doing so, the balance between the ejection amount and the circulation amount of the aqueous ink composition is good, the ink composition can be sufficiently adhered to the recording medium, and the thickening of the aqueous ink composition can be efficiently suppressed.

The maximum ejection amount of the aqueous ink composition is the ejection amount ejected from the ink jet head of the aqueous ink composition when the droplet of the aqueous ink composition per ejection performed in recording is the maximum ejection amount and the ejection frequency of the aqueous ink composition is the maximum ejection frequency of the ejection of the aqueous ink composition performed in recording is provisionally ejected from all the nozzles used for recording in the ink jet head of the aqueous ink composition.

The circulation amount is the total flow rate of the aqueous ink composition provided in the ink jet head and distributed in each discharge passage coupled to each nozzle of the ink jet head. Both the circulation amount and the maximum ejection amount are shown by the mass of ink per unit time.

The unit of circulation amount is expressed in mass/hour, for example, in mass (g)/hour (second). The flow rate is the total discharge amount of the discharge passage as described above.

Both the circulation amount and the maximum ejection amount are values per one ink jet head. The circulation amount is preferably 1.0 (g/min) or more per ink jet head. Further, it is preferably 12.0 (g/min) or less. Further, it is more preferably 2.0 (g/min) or more and 10.0 (g/min) or less, and still more preferably 3.0 (g/min) or more and 7.0 (g/min) or less. Here, the ink jet head refers to a unit in which all the nozzles ejected by the aqueous ink composition introduced from one inlet are combined. The number of one unit of the ink jet head is not limited, but for example, the number of nozzles can be 50 to 1000, 100 to 700, 150 to 500, and 200 to 400 pieces.

Further, the ink jet head 2 is provided with a pressure chamber C for applying pressure to the aqueous ink composition to eject it from the nozzle, and it is preferable that the circulation path circulates the aqueous ink composition which has passed through the pressure chamber C as shown in the example of FIG. 4. That is, it is preferable that the aqueous ink composition that has passed through the pressure chamber C is circulated and supplied to the pressure chamber again. In this case, the discharge passage can be provided at a position downstream of the pressure chamber or the pressure chamber. In this case, the ejection stability is particularly excellent and preferable.

Alternatively, the circulation path may be provided with a discharge passage at a position upstream of the pressure chamber in the ink jet head, and the aqueous ink composition may be discharged and circulated through the discharge passage. Then, it may be circulated so that the aqueous ink composition is supplied to the position again. In this case, the ink is circulated before passing through the pressure chamber. Also in this case, when foreign matter or thickening of the aqueous ink composition reaches the upstream of the pressure chamber, this can be eliminated and the ejection stability can be improved. The position on the upstream includes, for example, the liquid storage chamber R.

The circulation flow path may circulate the aqueous ink composition passing through the discharge passage in the ink jet head and supply the aqueous ink composition to the aqueous ink composition passage again, or may discharge the aqueous ink composition passing through the discharge passage out of the ink jet head 2 and supply the discharged aqueous ink composition to the recording head again, and circulate the aqueous ink composition. Of these, the former is preferable because it is easy to manufacture the circulation path.

By using an ink jet head having a circulation path as described above, it is possible to suppress a decrease in ejection reliability of the aqueous ink composition even when the solid content concentration increases due to drying of the aqueous ink composition.

The serial-type recording apparatus equipped with the serial-type ink jet head and performing the serial-type recording method has been described above. On the other hand, the ink jet head 2 may be a line-type head. Even with a line-type head, by circulating the aqueous ink composition, it is possible to obtain an effect of suppressing a decrease in ejection reliability due to drying and thickening of the aqueous ink composition. The ink jet head of the line-type recording apparatus is a head in which nozzles are arranged at a length equal to or longer than the recording width of the recording medium M, and the aqueous ink composition can be adhered to the recording medium M in one pass.

Figure 6:
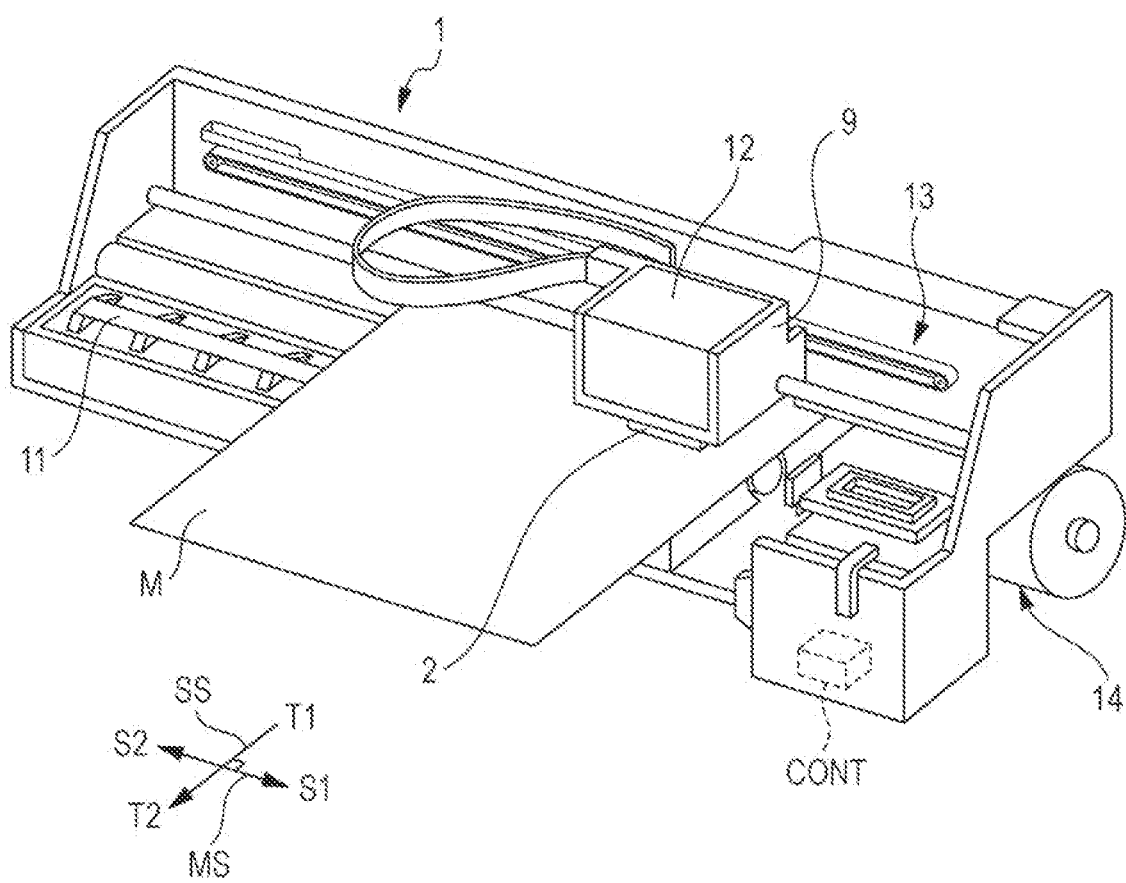
FIG. 6 is a schematic perspective view around a carriage of the example of the ink jet recording apparatus according to the present embodiment.
Figure 7:
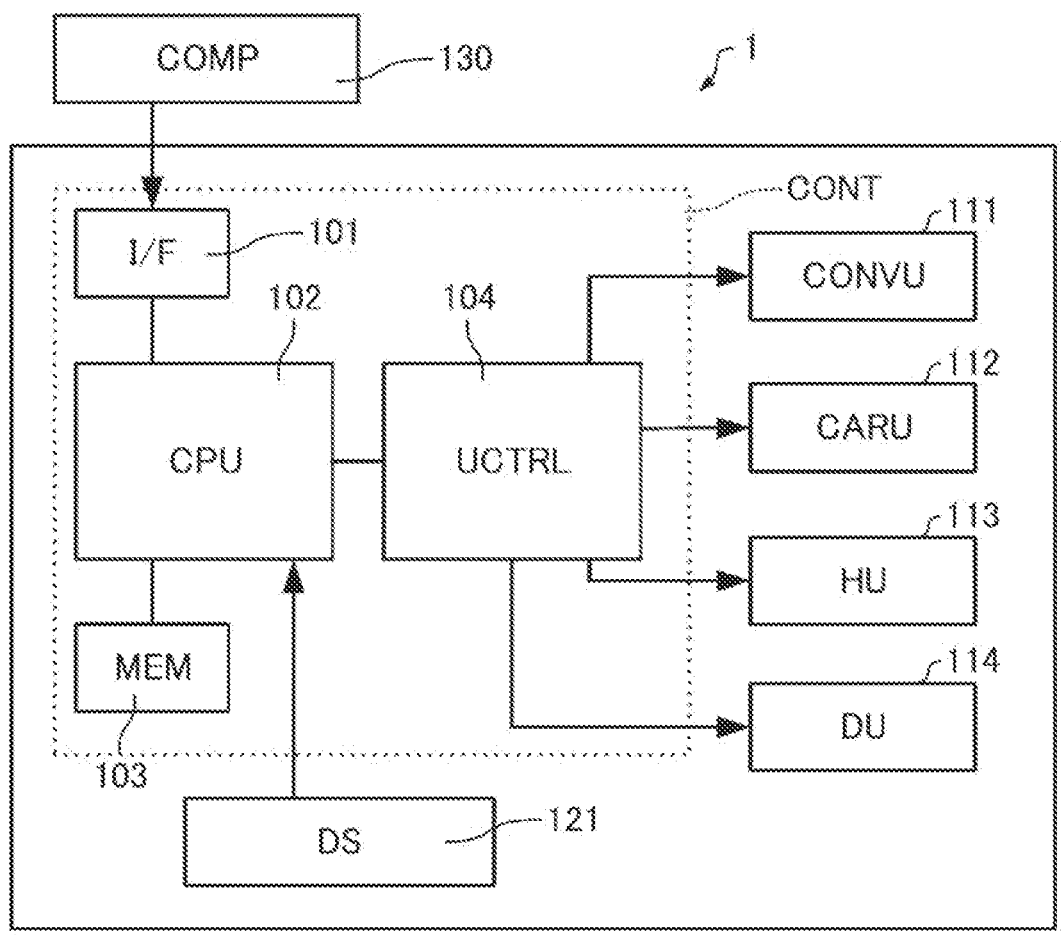
FIG. 7 is a block diagram of the example of the ink jet recording apparatus according to the present embodiment.
Figure 8:
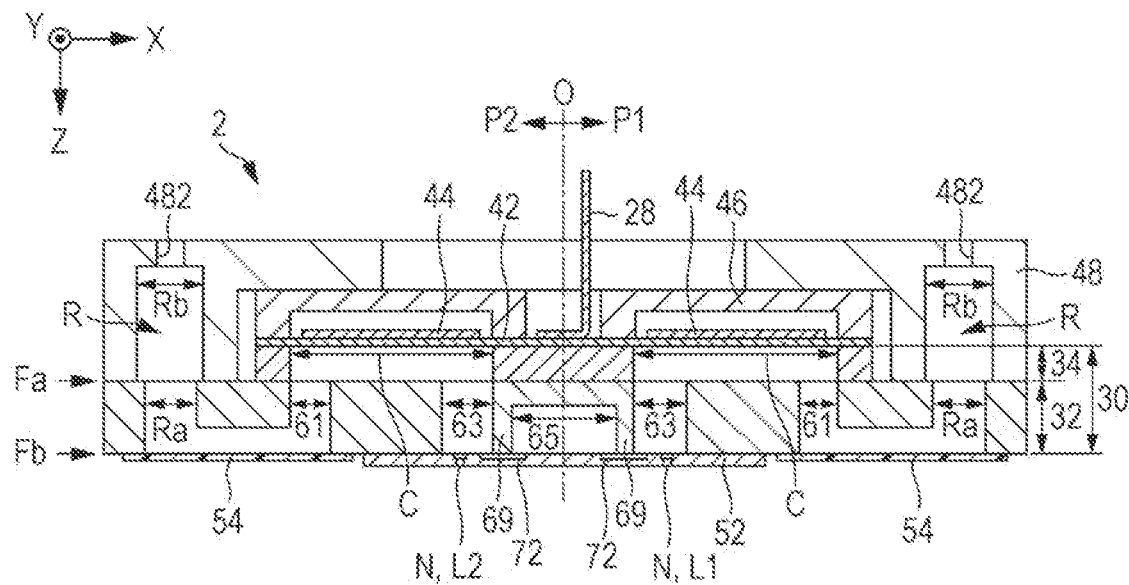
FIG. 8 is a schematic sectional view of an ink jet head of the ink jet recording apparatus.
Figure 9:
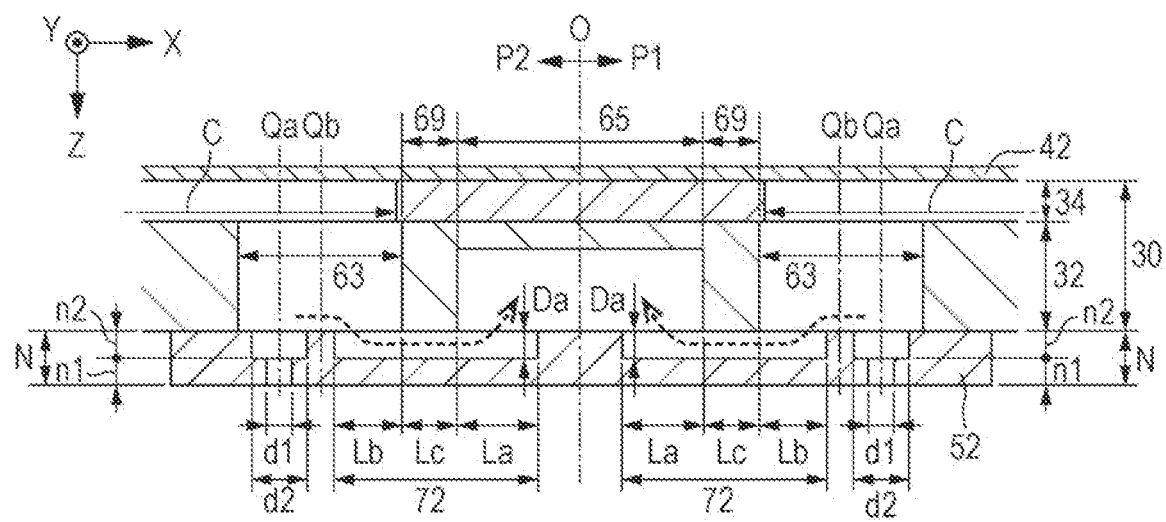
FIG. 9 is a schematic sectional view of the ink jet head in the vicinity of a circulating fluid chamber.
Figure 10:
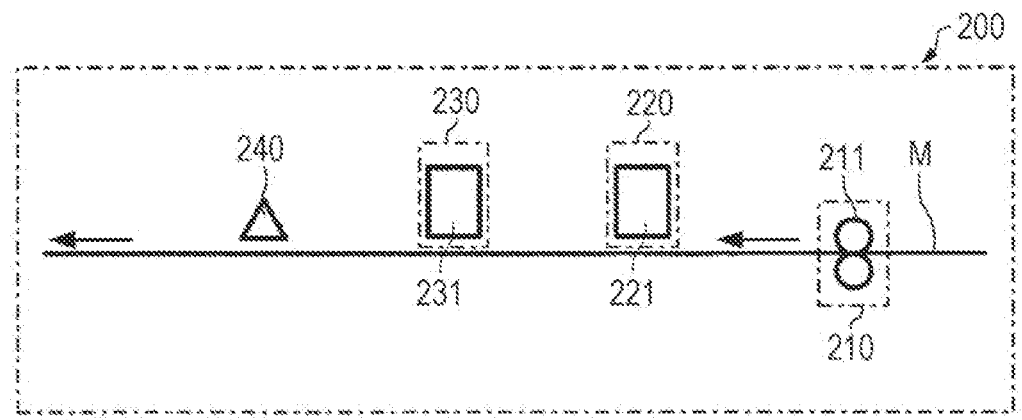
FIG. 10 is a schematic sectional view schematically showing a part of a line-type recording apparatus.

FIG. 6 is a schematic sectional view schematically showing a part of a line-type recording apparatus equipped with a line-type head (line-type recording head) and performing a line-type ink jet recording method. The recording apparatus portion 200 includes a first ink adhering section 220 including an ink jet head 221 of an aqueous ink composition, a second ink adhering section 230 including an ink jet head 231 of an aqueous ink composition, and a transport roller 211 that transports a recording medium M. The recording medium transport section 210 including the above, and the post-heating part 240 for performing a post-heating step on the recording medium are provided. The ink jet heads 231,221 are line-type recording heads in which a row of nozzles extends in the width direction of the recording medium M, which is the front-back direction of the drawing.

In the line-type recording apparatus, the recording medium M is transported in the transport direction which is the arrow direction of FIG. 6, so that the aqueous ink composition or the like is ejected from the ink jet head and adhered to the recording medium M while moving the relative positions of the recording heads 231, 221 and the recording medium M. This is called scanning. Scanning is also called main scanning or pass. The line-type recording method is a one-pass recording method in which an aqueous ink composition is adhered to a transported recording medium M in one pass using recording heads 231, 221 and recorded.

The line-type recording apparatus can have the same configuration as the serial-type ink jet recording apparatus 1 described above, except that the line-type recording head is provided and the line-type recording method is performed. The line-type recording apparatus may include a drying part for performing a drying step. For example, a drying part such as a ventilation fan 8 and an IR heater 3 above the ink jet head 2 of FIG. 1 may be provided above the ink jet heads 231,221 of FIG. 6, and a drying part such as an underheater corresponding to the platen heater 4 below the ink jet head 2 of FIG. 1 may be provided below the ink jet heads 231,221 of FIG. 6.

Regarding the first disclosure, hereinafter, the present disclosure will be specifically described with reference to Examples, but the present disclosure is not limited to these Examples. Hereinafter, "part" and "%" are with respect to mass unless otherwise specified. Unless otherwise specified, the evaluation was carried out in an environment of a temperature of 25.0° C. and a relative humidity of 40.0%.

3.1. Ink Preparation

Each component was put into a container so as to have the composition shown in Table 1, and after mixing and stirring with a magnetic stirrer for 2 hours, dispersion treatment was carried out with a bead mill filled with zirconia beads having a diameter of 0.3 mm, thereby sufficiently mixing. After stirring for 1 hour, the mixture was filtered using a 5.0 μm PTFE membrane filter to obtain non-white ink Bk1, non-white ink C1, white ink W1, and white ink W2. The numerical values in Table 1 indicate % by mass. As the water, ion-exchanged water was used and added so that the mass of each ink was 100% by mass.

TABLE 1

| Components | Non-white ink | | White ink | |
|---|---|---|---|---|
| | Bk1 % by weight | C1 % by weight | W1 % by weight | W2 % by weight |
| Coloring material: carbon black | 5.0 | — | — | — |
| Coloring material: P.B. 15:3 | — | 5.0 | — | — |
| Coloring material: titanium dioxide | — | — | 5.0 | 10.0 |
| Resin: JONCRYL 537J BASF Japan | 5.0 | 5.0 | 5.0 | 5.0 |
| Moisturizing agent: propylene glycol | 10.0 | 10.0 | 10.0 | 10.0 |
| Penetrant: 1,2-hexanediol | 4.0 | 4.0 | 4.0 | 4.0 |
| Surfactant: SAG503A | 1.0 | 1.0 | 1.0 | 1.0 |
| Water | remaining amount | remaining amount | remaining amount | remaining amount |
| Total | 100.0 | 100.0 | 100.0 | 100.0 |

Among the components shown in Table 1, carbon black is No. 33 (manufactured by Mitsubishi Chemical Corporation) was used. "P.B. 15:3" refers to C.I. Pigment Blue 15:3. As titanium dioxide, TIPAQUE CR-50-2 (manufactured by Ishihara Sangyo Co., Ltd.) was used. "JONCRYL (registered trademark) 537J" is a resin particle (acrylic resin) obtained from BASF Japan Ltd. "SAG503A" is a silicone surfactant obtained from Nissin Chemical Industry Co., Ltd.

The pigment was prepared in advance by mixing a pigment dispersant, which is a water-soluble styrene/acrylic resin not described in the table, and a pigment, in a mass ratio of pigment: pigment dispersant=2:1, with water, followed by stirring to prepare a pigment dispersion, which was used to prepare the ink.

3.2. Record Test

The ink jet recording apparatus used was a modified SC-S80650 manufactured by Seiko Epson Corporation. The recording head has a nozzle row arrangement as shown in FIG. 4. The nozzle density per nozzle row was 600 npi, and the number of nozzles was 600. It was configured as a recording apparatus as shown in FIGS. 1 and 2.

The number of passes per ink (number of scans) was set to the values in Tables 2 and 3. That is, the length of one sub-scan was set to about the length of the nozzle row/the number of passes. This is the number of passes required for recording to a certain part of the recording medium. For example, in the case of 2-pass recording, the length of one sub-scanning is about half the length of the nozzle row, and recording is performed in 2 passes on a part of the recording medium. In the ink adhering step, the drying mechanism was not used, and the surface temperature of the recording medium in the ink adhering step was set to 25° C.

As a recording medium, Lumirror S10 (PET sheet manufactured by Toray Industries, Inc.) was used.

The final adhesion amounts of the white ink and the non-white ink per unit area in the recording pattern were set to the values shown in the table, and the dots were uniformly thinned out so that the adhesion amounts for each pass were substantially uniform, thereby recording each pass. The recording resolution per ink was set to 600×600 dpi. Tables 2 and 3 show the ink mass per dot (ink droplet). After recording, it was discharged from an ink jet recording apparatus and left at room temperature for 1 day.

In the table, the types of white ink and non-white ink used in each example, the adhesion amounts of white ink and non-white ink, the adhesion amounts of white coloring material and non-white coloring material, and the mass ratio of the adhesion amounts of coloring material. (A/B) (white/non-white), the mass of ink droplets (dot mass), and the number of passes when recording per specific recording area are described.

As shown in FIG. 4, the five nozzle rows of the recording head are numbered N1 to N5. In the table, "simultaneous" in the column of "white ink adhesion method" indicates that white ink and non-white ink were adhered to the recording medium in one pass (scan).

Further, in the column of "white ink row arrangement" in the table, "left end" means that N1 is filled with white ink, N2 is filled with non-white (Bk) ink, and N3 is filled with non-white (C) ink. In this case, the recording head reciprocates in the main scanning direction for bidirectional printing, and the landing order of the white ink and the non-white ink is alternately switched for each pass (scanning).

In the table, in the column of "white ink row arrangement", "center" means that N3 is filled with white ink, N2 and N4 are filled with non-white (Bk) ink, and N1 and N5 are filled with non-white (C) ink. In this case, the recording head reciprocates in the main scanning direction to perform bidirectional printing, and N1 and N2, or N4 and N5 are alternately used for each pass as the non-white ink, and the landing order of the white ink and the non-white ink in each pass becomes the same between the passes.

In the table, in the column of "white ink row arrangement", "both ends" means that N2 is filled with non-white (Bk) ink, N3 is filled with non-white (C) ink, and N1 and N4 are filled with white ink. In this case, the recording head reciprocates in the main scanning direction to perform bidirectional printing, and N1 or N4 is alternately used for the white ink for each pass, and the landing order of the white ink and the non-white ink in each pass becomes the same between the passes.

Also, in the table, in the column of "white ink adhesion method", "white first" means that the nozzle row is filled with ink in the same way as in the "left end" example, but only white ink is used and white. After recording the pattern, the recording medium was rewound and overlaid on the white pattern to record the non-white pattern. That is, the case where the white ink and the non-white ink are not adhered in the same scan is shown.

3.3. Evaluation Method 3.3.1. Printing Speed

The table below shows the results of evaluation with respect to the following criteria with respect to the number of passes required for recording to a certain part of the recording medium.

S: Within 2 passes
A: Within 4 passes
B: Within 6 passes
C: More than 6 passes

3.3.2. Evaluation of Filling (Image Quality)

A pattern in which Bk1 and W1 or W2 were mixed was recorded on a recording medium. The degree of color loss of the color pattern of the printed matter (shielding property because it is a transparent recording medium) was visually confirmed. The color loss was noticed whether the image could be seen through or not. The results of evaluation with respect to the following criteria are shown in the table. It should be noted that in the case of the white first, it is noted whether the non-white image recorded with the non-white ink is transparent and the white image below the non-white image is visible when viewed from the non-white image side recorded with the non-white ink.

S: The ink spreads sufficiently, and color loss cannot be confirmed visually or with a magnifying glass.

A: The ink spreads moderately, and no color loss can be visually confirmed.

B: Ink spread is insufficient, and slight color loss can be visually confirmed.

C: Ink spread is insufficient, and color loss can be visually confirmed and stands out.

3.3.3. Evaluation of Color Development (Visibility)

A pattern in which the solid printed area of C1 and W1 or W2 and the solid printed area of Bk1 and W1 or W2 are brought into contact with each other at the boundary of the edge of the area is printed on the recording medium and adhered to black paper. After that, the ease of identifying the boundary was visually confirmed. The results of evaluation with respect to the following criteria are shown in the table. It is an evaluation of visibility.

S: No whitishness is seen, and the boundary can be easily identified.

A: No whitishness is seen and the boundary can be identified.

B: No whitishness is seen, and the boundary can be identified by careful observation.

C: It is difficult to identify the boundary, or the image can be identified but the image is whitish.

Z: The boundary can be easily identified when viewed from the non-white image side. However, if the printed recording is adhered to black paper with the back side (white image side) facing up, the boundary cannot be identified.

3.3.4. Evaluation of Density Unevenness (Image Quality)

A pattern in which Bk1 and W1 or W2 were adhered was recorded on the media. The density uniformity (density unevenness) of the printed matter was visually confirmed. The results of evaluation with respect to the following criteria are shown in the table.

S: A uniform image is obtained without uneven density.

A: Good image is obtained without uneven density.

B: An image with no uneven density is obtained.

C: Non-uniform density unevenness is visually confirmed

3.3.5. Evaluation of in-Place Image Quality Difference (Image Quality)

A pattern in which Bk1 and W1 or W2 were adhered was recorded on a recording medium. Visual evaluation was performed between the case of observing at a distance of 30 cm from the recording surface and the case of observing at a distance of 1 m. It was evaluated whether or not a part having a different color could be seen depending on the location in the pattern (in-place) on the recording surface side. The results of evaluation with respect to the following criteria are shown in the table.

S: The difference cannot be identified at a distance of 30 cm

A: There are some differences at a distance of 30 cm, but the differences cannot be identified at a distance of 1 m.

B: Different parts can be identified at a distance of 1 m

C: Different parts can be identified at a distance of 1 m, and the parts can be seen in a streak pattern.

3.3.6. Evaluation of Front and Back Image Quality Difference (Image Quality)

A pattern in which Bk1 and W1 or W2 were adhered was recorded on a recording medium. Visual evaluation was performed when the surface of the recorded portion was observed 30 cm away from the surface or the recording medium side and when the observation was performed 1 m away. I checked whether it looked different between the front and back when viewed from both the front and back. The results of evaluation with respect to the following criteria are shown in the table.

S: The difference between the front and back cannot be identified at a distance of 30 cm.

A: The difference between the front and back can be identified at a distance of 30 cm, but the difference cannot be identified at a distance of 1 m.

B: the difference between the front and back can be seen at a distance of 1 m

C: The difference between the front and back is clear at a distance of 1 m, and one side is white.

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| White ink type |  | W1 | W1 | W1 | W1 | W1 | W1 | W1 | W1 | W2 | W1 |
| Non-white ink type |  | Bk1, C1 | Bk1, C1 | Bk1, C1 | Bk1, C1 | Bk1, C1 | Bk1, C1 | Bk1, C1 | Bk1, C1 | Bk1, C1 | Bk1, C1 |
| White ink adhesion method |  | Simultaneous | Simultaneous | Simultaneous | Simultaneous | Simultaneous | Simultaneous | Simultaneous | Simultaneous | Simultaneous | Simultaneous |
| Ink adhesion [600 × 600 dpi] amount (mg/inch$^2$) | Non-white | 5.40 | 5.40 | 5.40 | 5.40 | 5.40 | 5.40 | 5.40 | 5.40 | 5.40 | 5.40 |
|  | White | 0.54 | 0.27 | 5.35 | 0.58 | 0.54 | 0.54 | 0.54 | 0.54 | 0.27 | 0.54 |
| Coloring material (mg/inch$^2$) adhesion amount | Non-white | 0.27 | 0.27 | 0.27 | 0.27 | 0.27 | 0.27 | 0.27 | 0.27 | 0.27 | 0.27 |
|  | White | 0.03 | 0.01 | 0.27 | 0.03 | 0.03 | 0.03 | 0.03 | 0.03 | 0.03 | 0.03 |
| Coloring material adhesion amount ratio (white/non-white) |  | 0.10 | 0.05 | 0.99 | 0.11 | 0.10 | 0.10 | 0.10 | 0.10 | 0.10 | 0.10 |

TABLE 2-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Dot mass [ng/dot] | Non-white | 15.0 | 15.0 | 15.0 | 15.0 | 15.0 | 15.0 | 15.0 | 15.0 | 15.0 | 15.0 |
|  | White | 15.0 | 15.0 | 15.0 | 23.0 | 7.5 | 15.0 | 15.0 | 15.0 | 15.0 | 15.0 |
| White ink row arrangement |  | Left end | Left end | Left end | Left end | Left end | Center | Both ends | Left end | Left end | Left end |
| Pass number | White/non-white simultaneous | 2 | 2 | 2 | 2 | 2 | 2 | 2 | 4 | 2 | 1 |
|  | Non-white only | 0 | 0 | 0 | 0 | 0 | 0 | 0 | 0 | 0 | 0 |
|  | White only | 0 | 0 | 0 | 0 | 0 | 0 | 0 | 0 | 0 | 0 |
| Filling |  | A | B | S | B | S | A | A | A | B | A |
| Color development (visibility) |  | S | B | A | S | S | S | S | S | S | S |
| Printing speed |  | S | S | S | S | S | S | S | A | S | S |
| Density unevenness |  | A | S | B | B | S | S | S | S | S | B |
| Image quality difference (in-place) |  | A | S | B | B | S | S | S | S | B | B |
| Image quality difference (front and back) |  | S | S | S | S | S | B | B | S | S | B |

TABLE 3

|  |  | Comparative Example 1 | Comparative Example 2 | Comparative Example 3 | Reference Example 1 | Reference Example 2 |
|---|---|---|---|---|---|---|
| White ink type |  | — | W1 | W1 | W1 | W1 |
| Non-white ink type |  | Bk1, C1 | Bk1, C1 | Bk1, C1 | Bk1, C1 | Bk1, C1 |
| White ink adhesion method |  |  | Simultaneous | Simultaneous | White first | White first |
| Ink adhesion amount (mg/inch$^2$) [600 × 600 dpi] | Non-white | 5.40 | 5.40 | 5.40 | 5.40 | 5.40 |
|  | White | — | 8.10 | 0.10 | 5.35 | 0.54 |
| Coloring material adhesion amount (mg/inch$^2$) | Non-white | 0.27 | 0.27 | 0.27 | 0.27 | 0.27 |
|  | White | — | 0.41 | 0.01 | 0.27 | 0.03 |
| Coloring material adhesion amount ratio (white/non-white) |  | 0.00 | 1.50 | 0.02 | 0.99 | 0.10 |
| Dot mass [ng/dot] | Non-white | 15.0 | 15.0 | 15.0 | 15.0 | 15.0 |
|  | White | — | 15.0 | 15.0 | 15.0 | 15.0 |
| White ink row arrangement |  | — | Left end | Left end | Left end | Left end |
| Pass number | White/non-white simultaneous | 2 | 2 | 2 | 0 | 0 |
|  | Non-white only | 0 | 0 | 0 | 2 | 4 |
|  | White only | 0 | 0 | 0 | 2 | 4 |
| Filling |  | C | S | C | C | C |
| Color development (visibility) |  | C | C | C | Z | Z |
| Printing speed |  | S | S | S | A | C |
| Density unevenness |  | S | C | S | S | S |
| Image quality difference (in-place) |  | S | C | S | C | C |
| Image quality difference (front and back) |  | S | S | S | C | C |

3.4. Evaluation Results

A white ink adhering step and a non-white ink adhering step are performed, and these steps are performed on the same region of the non-white recording medium by the same scanning, and the white ink and the non-white ink adhering area are performed. In the example in which the mass ratio (A/B) of the adhesion amount A of the white coloring material and the adhesion amount B of the non-white coloring material B per unit area is 0.03 or more and 0.99 or less, all of them are filled, the color development was excellent.

On the other hand, in the comparative examples that were not so, either the filling or the color development was inferior.

From Examples 1 to 3, the smaller the white/non-white coloring material adhesion amount ratio, the better the density unevenness and the image quality difference, and the larger the ratio, the better the filling.

From Examples 1, 4, and 5, the smaller the mass of the white ink droplets, the more excellent the reduction of filling, density unevenness, and image quality difference.

From Examples 1, 6 and 7, it is better not to switch the landing order of the white ink and the non-white ink in the pass between the passes, because it is better to reduce the difference in in-place image quality and to switch between the passes. The reduction of the image quality difference between the front and back was better.

From Examples 1, 8 and 10, the larger the number of passes, the better the reduction of density unevenness and the reduction of image quality difference, and the smaller the number of passes, the better the printing speed.

From Examples 1 and 9, the smaller the content of the coloring material in the white ink, the better the filling and the reduction of the image quality difference, and the larger the content, the better the reduction of the density unevenness.

In Comparative Example 1, the same ink row arrangement as the left end was used, and recording was performed using only non-white ink without using white ink. From Comparative Examples 1 and 3, when the white ink was not used or the adhesion amount ratio of the white coloring material was too small, the filling and visibility were inferior.

From Comparative Example 2, when the adhesion amount ratio of the white coloring material was too large, the visibility was inferior.

In Reference Examples 1 and 2, when the non-white image was viewed, the white image under the non-white image was visible, and the filling in the non-white image was poor. The visibility when viewed from the non-white image side was not inferior. In addition, when compared with the simultaneous striking in which the number of scans per ink is the same, the number of scans is doubled.

Although not described in the table, in Example 1, when the platen heater was operated in the ink adhering step and the surface temperature of the recording medium was set to 40° C. in the same manner, the filling and the difference in image quality were slightly inferior. It was. From this, it was found that it is preferable that the surface temperature of the recording medium in the ink adhering step is low.

Further, when recording was performed in the same manner as in Example 1 using the above-mentioned PET sheet which was previously colored brown to make it opaque, excellent filling and visibility were obtained as well.

The above-described embodiments and modifications are merely examples, and the present disclosure is not limited thereto. For example, it is also possible to appropriately combine each embodiment and each modification.

The present disclosure includes a configuration substantially the same as the configuration described in the embodiment, for example, a configuration having the same function, method and result, or a configuration having the same purpose and effect. The present disclosure also includes a configuration in which a non-essential part of the configuration described in the embodiment is replaced. In addition, the present disclosure includes a configuration that exhibits the same effects as the configuration described in the embodiment or a configuration that can achieve the same object. The present disclosure also includes a configuration in which a known technique is added to the configuration described in the embodiment.

The following contents are derived from the embodiments and modified examples described above.

In an aspect, the recording method is
a recording method for recording on a recording medium,
the recording medium being a non-white recording medium, the method including:
a white ink adhering step of adhering a white ink containing a white coloring material to the recording medium, and
a non-white ink adhering step of adhering a non-white ink containing a non-white coloring material to the recording medium, in which
the white ink adhering step and the non-white ink adhering step are performed by causing a recording head to scan the recording medium,
the white ink adhering step and the non-white ink adhering step are performed on a region of the recording medium by a scan, and
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or less.

According to the recording method, an image can be recorded on a recording medium while mixing white ink and non-white ink. As a result, it is possible to obtain an image with good visibility and good image quality. The filling is also excellent. Further, the image quality of the obtained image is good both on the front surface and the rear surface, and when, for example, recording is performed on the front surface of the transparent recording medium, the visibility from the rear surface side of the recording medium can also be good. Furthermore, since the white ink and the non-white ink can be adhered by the same scanning, the recording speed can be improved.

In the aspect of the recording method,
the recording head may be an ink jet head, and the white ink adhering step and the non-white ink adhering step may be performed by ejecting the white ink and the non-white ink from the ink jet head.

According to the recording method, it is possible to efficiently perform printing of a small amount of various kinds by a small apparatus.

In the aspect of the recording method,
a maximum ink droplet mass of the white ink ejected from the ink jet head may be smaller than a maximum ink droplet mass of the non-white ink ejected.

According to the recording method, the efficiency of mixing the white ink and the non-white ink is further improved, so that the in-place image quality difference in the obtained image can be further improved.

In the aspect of the recording method,
the recording may be performed by repeatedly performing the scanning and sub-scanning in which a relative position between the recording head and the recording medium is changed in a direction intersecting a direction of the scanning.

According to the recording method, the white ink and the non-white ink can be mixed more efficiently.

In the aspect of the recording method,
wherein in the region where the white ink and the non-white ink are adhered, in a region where the adhesion amount B of the non-white coloring material per unit area is largest, the mass ratio (A/B) may be 0.03 or more and 0.99 or less.

According to the recording method, the white ink and the non-white ink can be mixed more efficiently, and it is possible to form an image with better visibility.

In the aspect of the recording method,
each of the white ink and the non-white ink may be adhered to a scanning region of the recording medium, which is scanned by one scan of the recording head, by two or more scans.

According to the recording method, the landing order of the white ink and the non-white ink can be made different, and the mixture of the white ink and the non-white ink in the image may be further improved, so that the difference in visibility between the front and back of the image can be reduced.

In the aspect of the recording method,
a content of the white coloring material in the white ink may be 1.0% by mass or more and 20.0% by mass or less.

According to the recording method, the content of the white coloring material of the white ink can be suppressed, so that the settling recovery property of the white ink can be improved. Further, since the density of the white coloring material of the white ink is small, mixing with the non-white ink proceeds more efficiently.

In the aspect of the recording method,
each of the white ink and the non-white ink may be an aqueous ink.

According to the recording method, it is possible to perform recording with less environmental load and less odor.

In the aspect of the recording method,
each of the white ink and the non-white ink may contain an organic solvent having a normal boiling point of 150.0° C. or higher and 280.0° C. or lower.

According to the recording method, it is possible to perform recording in which the image is fixed faster.

In the aspect of the recording method,
each of the white ink and the non-white ink may not contain more than 1.0% by mass of an organic solvent having a normal boiling point of higher than 280.0° C.

According to the recording method, it is possible to perform recording in which the image dries faster.

In the aspect of the recording method,
the non-white recording medium may be a low-absorptive or non-absorptive recording medium.

According to the recording method, an image with good filling can be formed more easily.

In the aspect of the recording method,
the non-white recording medium may be either a transparent recording medium or a non-white colored recording medium.

According to the recording method, an image with good filling can be formed more easily.

In an aspect, the ink jet recording apparatus is
an ink jet recording apparatus including:
a transport section that transports a recording medium;
a recording head that ejects a white ink containing a white coloring material and a non-white ink containing a non-white coloring material to adhere the white ink and the non-white ink to the recording medium;
a scanning section that causes the recording head to scan the recording medium, and
a controller that controls the transport section, the recording head, and the scanning section, in which
the controller causes
the white ink and the non-white ink to adhere to
a region of the recording medium by a scan by the scanning section such that
in the region, a mass ratio (A/B) of an adhesion amount A of the white coloring material to an adhesion amount B of the non-white coloring material per unit area is 0.03 or more and 0.99 or less.

According to the ink jet recording apparatus, an image can be recorded on a recording medium while mixing the white ink and the non-white ink. As a result, it is possible to obtain an image with good visibility. Further, the visibility of the obtained image is good both on the front surface and the rear surface, and when, for example, recording is performed on the front surface of the transparent recording medium, the visibility from the rear surface side of the recording medium can also be good. Furthermore, since the white ink and the non-white ink can be adhered by the same scanning, the recording speed can be improved.

Regarding the second disclosure, hereinafter, the present disclosure will be further specifically described with reference to Examples, but the present disclosure is not limited to these Examples. Hereinafter, "%" is with respect to mass unless otherwise specified. In the description of Examples of the second disclosure, Tables 4 to 9 are referred to as Tables 1 to 6, respectively.

3.1. Preparation of Aqueous Ink Composition

Inks 1 to 23 having different material compositions were prepared according to the material compositions shown in Tables 1 to 3. For each ink, the materials shown in Tables 1 to 3 are placed in a container, stirred and mixed with a magnetic stirrer for 2 hours, and then filtered with a membrane filter having a pore size of 5 μm to remove impurities such as dust and coarse particles. Prepared by The numerical values of each component in Tables 1 to 3 all showed % by mass, and water was added so that the total mass of the composition was 100% by mass.

The pigment (carbon black) used for preparing the aqueous ink composition was 2:1 (pigment: pigment) with a pigment dispersant (not shown in the table) which is a water-soluble styrene-acrylic resin in advance. A pigment dispersion was prepared by mixing with water in a mass ratio of (dispersant) and stirring sufficiently, and this was used for ink preparation. In the column of the pigment dispersion in Tables 1 to 3, the content (% by mass) of the pigment dispersion having a pigment solid content concentration of 15% by mass is described. In addition, in the column of the resin dispersion liquid in Tables 1 to 3, the content (% by mass) of the acrylic resin emulsion (manufactured by BASF Japan, trade name "JONCRYL 537J") having a solid content concentration of 30% by mass is entered. Described.

TABLE 4

|  |  | Normal boiling point (° C.) | (mN/m) Surface tension | Ink 1 | Ink 2 | Ink 3 | Ink 4 | Ink 5 | Ink 6 | Ink 7 | Ink 8 |
|---|---|---|---|---|---|---|---|---|---|---|---|
| Pigment dispersion (solid content: 15% by mass) | Carbon black |  |  | 30 | 30 | 30 | 30 | 30 | 30 | 30 | 30 |
| Resin dispersion (solid content: 30% by mass) | Acrylic resin emulsion |  |  | 15 | 30 | 15 | 30 | 15 | 15 | 15 | 15 |
| Surfactant | Silicon surfactant |  |  | 0.5 | 0.5 | 0.5 | 0.5 | 0.5 | 0.5 |  | 0.5 |
|  | Fluorosurfactant |  |  |  |  |  |  |  |  | 0.5 |  |
| Organic solvent A | 1,2-pentanediol | 210 | 27.7 |  |  |  |  |  |  |  | 3 |
|  | 1,2-hexanediol | 223 | 26.4 | 3 | 3 | 3 | 3 | 3 | 7 | 3 |  |
| Organic solvent B | 1,5-pentanediol | 239 |  | 14 | 14 | 10 | 7 |  | 10 | 14 | 14 |
|  | 1,6-hexanediol | 250 |  |  |  |  |  |  |  |  |  |
|  | 1,3-propanediol | 214 |  |  |  |  |  | 14 |  |  |  |

TABLE 4-continued

|  |  | Normal boiling point (° C.) | (mN/m) Surface tension | Ink 1 | Ink 2 | Ink 3 | Ink 4 | Ink 5 | Ink 6 | Ink 7 | Ink 8 |
|---|---|---|---|---|---|---|---|---|---|---|---|
| Other organic solvents | 1,2-butanediol | 194 | 31.6 |  |  |  | 4 |  |  |  |  |
|  | Diethylene glycol monoethyl ether | 196 |  |  |  |  |  |  |  |  |  |
|  | Glycerin | 290 |  |  |  |  |  |  |  |  |  |
|  | 1,2-propanediol | 188 |  |  |  |  |  |  |  |  |  |
| Water |  | 100 |  | 73.5 | 69.0 | 73.5 | 76.0 | 73.5 | 73.5 | 73.5 | 73.5 |
| Total |  |  |  | 100.0 | 100.0 | 100.0 | 100.0 | 100.0 | 100.0 | 100.0 | 100.0 |
| Viscosity (25° C.) |  |  |  | 4.7 | 5.8 | 4.7 | 4.6 | 4.7 | 4.7 | 4.7 | 4.7 |
| Solvent composition boiling point |  |  |  | 114 | 109 | 112 | 99 | 110 | 113 | 114 | 113 |
| Mass ratio (organic solvent B/organic solvent A) |  |  |  | 4.7 | 4.7 | 3.3 | 2.3 | 4.7 | 1.4 | 4.7 | 4.7 |
| Total content (organic solvent A + organic solvent B) |  |  |  | 17 | 17 | 13 | 10 | 17 | 17 | 17 | 17 |
| Solid content (pigment + resin) |  |  |  | 9 | 14 | 9 | 14 | 9 | 9 | 9 | 9 |

TABLE 5

|  |  | Normal boiling point (° C.) | Surface tension (mN/m) | Ink 9 | Ink 10 | Ink 11 | Ink 12 | Ink 13 | Ink 14 | Ink 15 | Ink 16 |
|---|---|---|---|---|---|---|---|---|---|---|---|
| Pigment dispersion (solid content: 15% by mass) | Carbon black |  |  | 30 | 30 | 30 | 30 | 30 | 30 | 30 | 30 |
| Resin dispersion (solid content: 30% by mass) | emulsion Acrylic resin |  |  | 15 | 15 | 10 | 15 | 15 | 10 | 15 | 15 |
| Surfactant | Silicon surfactant Fluorosurfactant |  |  | 0.5 | 0.5 | 0.5 | 0.5 | 0.5 | 0.5 | 0.5 | 0.5 |
| Organic solvent A | 1,2-pentanediol | 210 | 27.7 |  |  |  |  |  |  |  |  |
|  | 1,2-hexanediol | 223 | 26.4 | 3 | 3 | 3 | 14 | 1 | 5 | 3 | 3 |
| Organic solvent B | 1,5-pentanediol | 239 |  |  |  | 14 | 3 | 16 | 20 |  |  |
|  | 1,6-hexanediol | 250 |  | 7 |  |  |  |  |  |  |  |
|  | 1,3-propanediol | 214 |  | 7 | 6 |  |  |  |  |  |  |
| Other organic solvents | 1,2-butanediol | 194 | 31.6 |  |  |  |  |  |  | 14 |  |
|  | Diethylene glycol monoethyl ether | 196 |  |  | 4 |  |  |  |  |  | 14 |
|  | Glycerin | 290 |  |  | 4 |  |  |  |  |  |  |
|  | 1,2-propanediol | 188 |  |  |  |  |  |  |  |  |  |
| Water |  | 100 |  | 73.5 | 73.5 | 75.0 | 73.5 | 73.5 | 67.0 | 73.5 | 73.5 |
| Total |  |  |  | 100.0 | 100.0 | 100.0 | 100.0 | 100.0 | 100.0 | 100.0 | 100.0 |
| Viscosity (25° C.) |  |  |  | 4.7 | 4.7 | 4.3 | 4.7 | 4.7 | 5.7 | 4.7 | 4.7 |
| Solvent composition boiling point |  |  |  | 113 | 112 | 115 | 112 | 114 | 126 | 107 | 108 |
| Mass ratio (organic solvent B/organic solvent A) |  |  |  | 4.7 | 2.0 | 4.7 | 0.2 | 16.0 | 4.0 | 0.0 | 0.0 |
| Total content (organic solvent A + organic solvent B) |  |  |  | 17 | 9 | 17 | 17 | 17 | 25 | 3 | 3 |
| Solid content (pigment + resin) |  |  |  | 9 | 9 | 8 | 9 | 9 | 8 | 9 | 9 |

TABLE 6

|  |  | Normal boiling point (° C.) | (mN/m) Surface tension | Ink 17 | Ink 18 | Ink 19 | Ink 20 | Ink 21 | Ink 22 | Ink 23 |
|---|---|---|---|---|---|---|---|---|---|---|
| Pigment dispersion (solid content: 15% by mass) | Carbon black |  |  | 30 | 30 | 30 | 30 | 30 | 30 | 30 |
| Resin dispersion (solid content: 30% by mass) | Acrylic resin emulsion |  |  | 15 | 15 | 15 | 15 | 15 | 15 | 15 |
| Surfactant | Silicon surfactant Fluorosurfactant |  |  | 0.5 | 0.5 | 0.5 | 0.5 | 0.5 | 0.5 | 0.5 |

TABLE 6-continued

|  |  | Normal boiling point (° C.) | (mN/m) Surface tension | Ink 17 | Ink 18 | Ink 19 | Ink 20 | Ink 21 | Ink 22 | Ink 23 |
|---|---|---|---|---|---|---|---|---|---|---|
| Organic solvent A | 1,2-pentanediol | 210 | 27.7 |  |  |  |  |  |  |  |
|  | 1,2-hexanediol | 223 | 26.4 | 3 | 3 |  |  |  |  |  |
| Organic solvent B | 1,5-pentanediol | 239 |  |  |  | 14 | 14 | 14 | 14 |  |
|  | 1,6-hexanediol | 250 |  |  |  |  |  |  |  |  |
|  | 1,3-propanediol | 214 |  |  |  |  |  |  |  |  |
| Other organic solvents | 1,2-butanediol | 194 | 31.6 |  |  | 14 |  |  |  |  |
|  | Diethylene glycol monoethyl ether | 196 |  |  |  |  | 14 |  |  |  |
|  | Glycerin | 290 |  | 14 |  |  |  | 14 |  |  |
|  | 1,2-propanediol | 188 |  |  | 14 |  |  |  | 14 | 14 |
| Water |  | 100 |  | 73.5 | 73.5 | 62.5 | 62.5 | 62.5 | 62.5 | 76.5 |
| Total |  |  |  | 100.0 | 100.0 | 100.0 | 100.0 | 100.0 | 100.0 | 100.0 |
| Viscosity (25° C.) |  |  |  | 4.7 | 4.7 | 6.5 | 6.5 | 6.5 | 6.5 | 4.2 |
| Solvent composition boiling point |  |  |  | 121 | 107 | 123 | 123 | 137 | 122 | 103 |
| Mass ratio (organic solvent B/organic solvent A) |  |  |  | 0.0 | 0.0 | — | — | — | — | — |
| Total content (organic solvent A + organic solvent B) |  |  |  | 3 | 3 | 14 | 14 | 14 | 14 | 0 |
| Solid content (pigment + resin) |  |  |  | 9 | 9 | 9 | 9 | 9 | 9 | 9 |

The components used in Tables 1 to 3 are as follows.
Pigment Dispersion
    Carbon black: Pigment (carbon black) dispersion prepared above, solid content concentration 15% by mass
Resin Dispersion
    Acrylic resin emulsion: manufactured by BASF Japan, trade name "JONCRYL 537J", solid content concentration 30% by mass
Surfactant
    Silicon surfactant: manufactured by BYK, trade name "BYK-348"
    Fluorosurfactant: DIC Corporation, trade name "MEGAFACK F-444"
Organic Solvent A
    1,2-Pentanediol: normal boiling point=210° C., surface tension (25° C.)=27.7 mN/m
    1,2-Hexanediol: normal boiling point=223° C., surface tension (25° C.)=26.4 mN/m
Organic Solvent B
    1,5-Pentanediol: normal boiling point=239° C.
    1,6-Hexanediol: normal boiling point=250° C.
    1,3-Propanediol: normal boiling point=214° C.
Other Organic Solvents
    1,2-Butanediol: normal boiling point=194° C., surface tension (25° C.)=31.6 mN/m
    Diethylene glycol monoethyl ether: normal boiling point=196° C.
    Glycerin: normal boiling point=290° C.
    1,2-Propanediol: normal boiling point=188° C.

The viscosity of each ink was measured using a viscoelasticity tester MCR-300 (trade name, manufactured by Pysica) in an environment of 25° C.

3.2. Evaluation Method 3.2.1. Record Test

As an ink jet recording apparatus, a modified SC-S80650 manufactured by Seiko Epson Corporation (hereinafter, also referred to as a "modified machine") was used. Two types of heads, a circulation head having a circulation mechanism and a normal head not having a circulation mechanism, were prepared, and one of the heads was adhered to the ink jet recording apparatus. The head was filled with the ink prepared above. During recording on the recording medium, the platen heater was adjusted to set the surface temperature of the recording medium to 40° C. The nozzle density per nozzle row was 600 npi, and the number of nozzles was 600. The recording resolution was 1200×1200 dpi. After the ink was adhered, the ink was dried at 70° C. for 1 minute with an afterheater. The adhesion amount of ink was 7 mg/inch². The adhesion amount of ink was defined as a printing rate of 100%. In the recording test, recording was performed on either a low or non-absorptive recording medium or an absorptive recording medium. Topcoat+(manufactured by Oji Paper Company) was used as the low or non-absorptive recording medium, and wood-free paper 55PW (manufactured by LINTEC Corporation) was used as the absorptive recording medium.

3.2.2. Ejection Reliability Evaluation

Intermittent Ejection Property

The ink was circulated and left in an environment of 25° C. with the nozzle open. After leaving, the nozzle check pattern was recorded to confirm the presence or absence of non-ejection nozzles and evaluated. The evaluation criteria are as follows. The evaluation results are also shown in Tables 4 to 6. The circulation amount of the head was 1.0 times the ejection amount (maximum ejection amount) when all recording was performed in the recordable area of the recording medium at a printing rate of 100%.

Evaluation Criteria

S: No non-ejection nozzle even when recording after leaving for 6 hours.
    A: No non-ejection nozzle even when recording after leaving for 4 hours.
    B: No non-ejection nozzle even when recording after leaving for 2 hours.
    C: A non-ejection nozzle can be seen when recording after leaving for 1 hour.

Continuous Ejection Stability

Printing was performed while circulating the ink. The ink was ejected at a drive frequency of 30 to 40 kHz. Printing was performed continuously for 30 minutes. After printing, a nozzle inspection was performed. The evaluation criteria are as follows. The evaluation results are also shown in Tables 4 to 6. ejection turbulence was defined as a case where the landing position on the recording medium deviated from the original position by a distance of more than half the distance between adjacent nozzles.

Evaluation Criteria

S: No ejection disturbance or non-ejection.
    A: Ejection disturbances or non-ejection in 5 nozzles or less.
    B: Ejection disturbances or non-ejection in 10 nozzles or less.
    C: Ejection disturbances or non-ejection in 11 nozzles or more.

3.2.3. Image Quality Evaluation

White Spots

Solid printing with a printing rate of 100% was performed on the recording medium, and the degree of white spot of the printed matter was visually confirmed. The evaluation criteria are as follows. The evaluation results are also shown in Tables 4 to 6. White spots mean that the base of the recording medium is not filled with ink in the image, and the base of the recording medium can be seen. This is an evaluation of the filling of the recording medium with ink.

Evaluation Criteria

S: Ink is sufficiently spread, there is no white spot visually, and a uniform image is obtained without uneven density. Even if the printing rate is 90%, there is no white spot visually.

A: The ink spreads moderately, there is no white spot visually, and a good image is obtained without uneven density. Even if the printing rate is 95%, there is no white spot visually. However, when the printing rate is 90%, white spots occur visually.

B: Ink spreads moderately and there is no visual white spot. However, when the printing rate is 95%, white spots occur visually.

C: Ink spreads insufficiently, and slight white spots occur visually.

Beading

A square solid print with a print rate of 100% was performed on the recording medium, and the beading degree of the printed matter was visually confirmed. The evaluation criteria are as follows. The evaluation results are also shown in Tables 4 to 6.

Evaluation Criteria

S: Very clear image with no color unevenness.

A: Some color unevenness felt, but sufficiently clear image.

B: Some color unevenness seen with slightly inferior sharpness of the image. The outline of the solid part is a straight line.

C: Significant color unevenness observed with unclear image. The outline of the solid part was not straight and the outline was disturbed.

Color Density

Solid printing with a printing rate of 100% was performed on a recording medium, and the OD value of the printed matter was measured using a spectroscopic measuring instrument (manufactured by X-rite, product name "i1Pro2"). The evaluation criteria are as follows. The evaluation results are also shown in Tables 4 to 6. The color density is an evaluation of the color development of ink in an image when it is recorded on a recording medium with ink.

Evaluation Criteria

S: OD value is 1.4 or more.

A: The OD value is 1.2 or more and less than 1.4.

B: The OD value is 1.0 or more and less than 1.2.

C: The OD value is 0.8 or more and less than 1.0.

D: The OD value is less than 0.8.

Dryness

Solid printing with a printing rate of 100% was performed on a recording medium, and the mixture was dried in an air oven at 70° C. for each hour. After that, the surface of the coating film of the printed matter was lightly rubbed with the fingertips, and it was visually confirmed whether or not the ink adhered to the fingertips. The evaluation criteria are as follows. The evaluation results are also shown in Tables 4 to 6.

Evaluation Criteria

S: After drying for 1 minute, no ink adheres to the fingertips.

A: After drying for 2 minutes, no ink adheres to the fingertips. However, after drying for 1 minute, ink adhesion is observed.

B: No ink adheres to the fingertips after drying for 3 minutes. However, after drying for 2 minutes, ink adhesion is observed.

C: After drying for 3 minutes, ink adheres to the fingertips.

3.3. Evaluation Results

Tables 4 to 6 show the recording test conditions and the evaluation results of each Example and each Comparative Example.

TABLE 7

| | | Example 1 | Example 2 | Example 3 | Example 4 | Example 5 | Example 6 | Example 7 |
|---|---|---|---|---|---|---|---|---|
| Ink type | | Ink 1 | Ink 2 | Ink 3 | Ink 4 | Ink 5 | Ink 6 | Ink 7 |
| Presence or absence of ink circulation mechanism | | Present | Present | Present | Present | Present | Present | Present |
| Ejection reliability evaluation | Intermittent ejection property | S | B | A | B | A | A | S |
| | Continuous printing stability | S | S | S | S | S | B | S |
| Image quality evaluation (low or non-absorptive recording medium) | White spot(filling) | A | A | A | A | A | S | A |
| | Beading | B | S | A | S | A | A | B |
| | Color density | A | A | A | A | A | A | A |
| | Drying property | B | S | B | S | A | B | B |
| Image quality evaluation (absorptive recording medium) | White spot(filling) | S | S | S | S | S | S | S |
| | Beading | S | S | S | S | S | S | S |
| | Color density | A | S | A | A | A | B | A |
| | Drying property | S | S | S | S | S | S | S |

TABLE 8

|  |  | Example 8 | Example 9 | Example 10 | Example 11 | Example 12 | Example 13 | Example 14 |
|---|---|---|---|---|---|---|---|---|
| Ink type | | Ink 8 | Ink 9 | Ink 10 | Ink 11 11 | Ink 12 | Ink 13 | Ink 14 |
| Presence or absence of ink circulation mechanism | | Present | Present | Present | Present | Present | Present | Present |
| Ejection reliability evaluation | Intermittent ejection property | S | A | S | S | B | S | S |
| | Continuous printing stability | S | S | S | S | C | S | S |
| Image quality evaluation (low or non-absorptive recording medium) | White spot(filling) | B | A | B | A | S | B | B |
| | Beading | B | B | C | C | A | B | B |
| | Color density | A | A | A | A | A | A | A |
| | Drying property | B | B | C | C | B | B | C |
| Image quality evaluation (absorptive recording medium) | White spot(filling) | S | A | S | S | S | A | A |
| | Beading | S | S | S | S | S | S | S |
| | Color density | A | A | A | B | C | A | A |
| | Drying property | S | S | S | A | S | S | B |

TABLE 9

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| Ink type | | Ink 15 | Ink 16 | Ink 17 | Ink 18 | Ink 19 | Ink 20 | Ink 21 | Ink 22 | Ink 23 | Ink 17 | Ink 1 |
| Presence or absence of ink circulation mechanism | | Present | Present | Present | Present | Present | Present | Present | Present | Present | Absent | Absent |
| Ejection reliability evaluation | Intermittent ejection property | A | A | A | A | S | S | S | S | S | B | C |
| | Continuous printing stability | A | A | A | A | S | S | S | S | S | B | C |
| Image quality evaluation (low or non-absorptive recording medium) | White spot(filling) | A | A | A | A | C | C | C | C | C | A | A |
| | Beading | B | B | B | B | C | C | C | C | C | B | B |
| | Color density | A | A | A | A | B | B | B | B | B | A | A |
| | Drying property | S | S | C | S | C | C | C | C | S | C | B |
| Image quality evaluation (absorptive recording medium) | White spot(filling) | S | S | S | S | A | A | A | A | A | S | S |
| | Beading | S | S | S | S | A | A | A | A | A | S | S |
| | Color density | D | D | D | D | A | A | A | A | A | D | A |
| | Drying property | S | S | A | S | A | A | C | A | S | A | S |

All of the ink jet recording methods of Example 1 to 14 according to the present disclosure were excellent in white spot evaluation in recording on a low or non-absorptive recording medium, excellent in color density evaluation in recording on an absorptive recording medium, and excellent in ejection reliability. On the other hand, any of Comparative Examples, which are not the present disclosure, is inferior in white spot evaluation in a low or non-absorptive recording medium, evaluation of color density in an absorptive recording medium, and ejection reliability. Details are given below.

From Example 11, the higher the viscosity of the ink, the better the beading evaluation and the dryness.

From Examples 12 and 13, the higher the mass ratio of the ink (organic solvent B/organic solvent A), the better the ejection reliability and the color density in the absorptive recording medium, and the lower the ink mass ratio, the better the white spot evaluation and the beading evaluation in the low or non-absorptive recording medium.

From Example 14, the smaller the total content of the ink (organic solvent B+organic solvent A), the better the drying property on the low or non-absorptive recording medium.

From Example 10, when the content of the organic solvent having a normal boiling point of higher than 280° C. of the ink was small, the beading evaluation and the drying property on the low or non-absorptive recording medium were more excellent.

From Examples 2 and 4, the higher the content of the organic solvent B, the better the color density in the absorptive recording medium.

From Examples 3 and 6, the higher the content of the organic solvent A, the better the evaluation of white spots on the low or non-absorptive recording medium.

From Examples 1 and 8, when 1,2-hexanediol was contained as the organic solvent A, the better white spot evaluation on the low or non-absorptive recording medium.

From Examples 1, 5 and 9, when 1,5-pentanediol was contained as the organic solvent B, the better color density and ejection reliability in the absorptive recording medium.

In Comparative Examples 1 to 4 using ink not containing organic solvent B, the ink easily penetrated into the absorptive recording medium, and the coloring material could not be fixed on the surface of the absorptive recording medium, so that the image quality was poor in color density and low in density (have a low OD value).

In Comparative Examples 5 to 8 in which the ink containing no organic solvent A was used, the white spot evaluation on the low or non-absorptive recording medium was inferior, and the beading was inferior. Since the ink does not contain the organic solvent A is used, the penetrability of the ink into the absorptive recording medium is low, and the image quality with a relatively high color density is obtained when recording with the absorptive recording medium.

In Comparative Example 9 in which the ink containing neither the organic solvent A nor the organic solvent B was used, the ink filling and beading were inferior in the recording on the low or non-absorptive recording medium. Since the ink does not contain the organic solvent A, the penetrability of the ink to the inside of the absorptive recording medium is low even though the ink does not contain the organic solvent B, and an image quality with a relatively high color density was obtained in recording on the absorptive recording medium.

In Comparative Example 10 17 using ink containing no organic solvent B and using a head having no ink circulation mechanism, the ink easily penetrated into the absorptive recording medium and the coloring material could not be stuck on the surface of the absorptive recording medium, resulting in a light color density (have a low OD value) image quality. On the other hand, since the ink 17 contains glycerin, its drying property is low. Therefore, even if a head without an ink circulation mechanism is used, it is difficult for the ink to dry around the nozzle, and the ejection reliability is relatively good. Although not described in the table, when the ejection reliability was evaluated in the same manner as in Comparative Example 10 using inks 15, 18, 19, 21 to 23, the ejection reliability was the same as in Comparative Example 10. However, when the ejection reliability was evaluated using the inks 16 and 20 in the same manner as in Comparative Example 10, the ejection reliability was inferior.

In Comparative Example 11 in which the ink 1 containing the organic solvent A and the organic solvent B was used and the head without the ink circulation mechanism was used, there was no white spot in the recording on the low or non-absorptive recording medium, and the absorbability was recorded. When recording on a medium, the image quality was high in color density. On the other hand, since a head without an ink circulation mechanism is used, the ink tends to dry around the nozzle, resulting in impaired ejection reliability. Although not described in the table, when the ejection reliability was evaluated in the same manner as in Comparative Example 11 using inks 2, 4 to 9, and 11 to 14, the ejection reliability was the same as in Comparative Example 11. However, when the ejection reliability was evaluated using the inks 3 and 10 in the same manner as in Comparative Example 11, the ejection reliability was good.

Although not shown in the table, when recording was performed in the same manner as in Example 6 except that the platen heater was adjusted and the surface temperature of the recording medium was set to 35° C. during recording on the recording medium, the ejection reliability was further improved and the beading of the low or non-absorptive recording medium was slightly as compared with Example 6. From this, the lower the surface temperature of the recording medium, the better the ejection reliability, and the higher the surface temperature, the better the image quality.

The following features are derived from the embodiments described above.

In an aspect, the ink jet recording method is an ink jet recording method performed on a recording medium using an aqueous ink composition, the method including an ink adhering step of ejecting the aqueous ink composition from an ink jet head and adhering the aqueous ink composition to the recording medium, in which the aqueous ink composition contains an organic solvent A which is a 1,2-alkanediol having a surface tension of 30 mN/m or less at 25° C. and an organic solvent B which is a both-end-type alkanediol having a normal boiling point of 250° C. or lower and having 3 or more carbon atoms, and the ink jet head includes a circulation mechanism for circulating the aqueous ink composition.

According to the ink jet recording method, it is possible to improve the image quality on both the low or non-absorptive recording medium and the absorptive recording medium, and to secure the ink ejection stability at the same time.

In the aspect of the ink jet recording method, the total content of the organic solvent A and the organic solvent B may be 25% by mass or less with respect to the total mass of the aqueous ink composition.

Since both the organic solvent A and the organic solvent B are hydrophilic organic solvents, they are highly soluble in water, but when the total content of the organic solvent A and the organic solvent B is within the above range, deterioration of image quality can be reduced even when ink is adhered to a low or non-absorptive recording medium.

In any aspect of the ink jet recording method, in the aqueous ink composition, a content of the organic solvent B ($M_B$) to a content of the organic solvent A ($M_A$) mass ratio ($M_B/M_A$) may be 1 to 6.

When the mass ratio ($M_B/M_A$) is within the range, the balance between the content of the organic solvent A and the organic solvent B is good, so that it is possible to improve the image quality on both the low or non-absorptive recording medium and the absorptive recording medium, and to secure the ink ejection stability at the same time.

In any aspect of the ink jet recording method, a viscosity of the aqueous ink composition at 25° C. may be 4.5 mPa·s or more.

When the viscosity of the aqueous ink composition at 25° C. is within the above range, penetration of the ink into the absorptive recording medium is easily suppressed, so that the coloring material remains on the surface, and an image quality having a high OD value and excellent color development can be obtained particularly in the absorptive recording medium.

In any aspect of the ink jet recording method, the aqueous ink composition may further contain a coloring material and a resin, the total content of the coloring material and the resin may be 3% by mass or more with respect to a total mass of the aqueous ink composition.

When the total content of the coloring material and the resin particles is within the above range, the solid content concentration is appropriate, so that the characteristic that the viscosity of the ink rapidly increases when the solvent component in the ink volatilizes can be obtained. As a result, the penetration of the ink into the absorptive recording medium is suppressed, so that the coloring material remains on the surface, and an image quality having a high OD value and excellent color development can be obtained particularly in the absorptive recording medium.

In any aspect of the ink jet recording method,
a content of the organic solvent A may be 1 to 10% by mass with respect to the total mass of the aqueous ink composition.

When the content of the organic solvent A is within the above range, the wet spreadability to the low or non-absorptive recording medium can be sufficiently enhanced, so that the low or non-absorptive recording medium can easily obtain an image quality having a high OD value and excellent color development. Further, the organic solvent A has a function of lowering the dynamic surface tension of the ink and may generate mist of the ink, but when the content of the organic solvent A is within the above range, such an adverse effect can be prevented.

In any aspect of the ink jet recording method,
the content of the organic solvent B may be 4 to 30% by mass with respect to the total mass of the aqueous ink composition.

When the content of the organic solvent B is within the above range, the penetration of the ink into the absorptive recording medium promoted by the organic solvent A can be sufficiently suppressed, so that the low or non-absorptive recording medium can easily obtain an image quality having a high OD value and excellent color development.

In any aspect of the ink jet recording method,
a weighted average value of a normal boiling point of water and each organic solvent contained in the aqueous ink composition and each content in the aqueous ink composition may be 130° C. or lower.

When the value is within the above range, especially when the ink is adhered to the low or non-absorptive recording medium, the solvent contained in the ink can be quickly volatilized, so that a viscous image is hardly formed and an image having a high OD value and excellent color development can easily be obtained.

In any aspect of the ink jet recording method,
the organic solvent A may be either 1,2-hexanediol or 1,2-pentanediol.

In any aspect of the ink jet recording method,
the organic solvent B may be any of 1,3-propanediol, 1,5-pentanediol, and 1,6-hexanediol.

In any aspect of the ink jet recording method,
the ink jet recording method is performed using an ink jet recording apparatus including the ink jet head,
the ink jet recording apparatus performs recording on a low or non-absorptive recording medium and recording on an absorptive recording medium using the aqueous ink composition to perform, and
the ink jet recording method is performed on either a low or non-absorptive recording medium or an absorptive recording medium.

In an aspect, the aqueous ink composition is
an aqueous ink composition used for the ink jet recording method of any of the aspects.

The aqueous ink composition of the aspect
may be used for recording on a low or non-absorptive recording medium and recording on an absorptive recording medium.

According to the aqueous ink composition, since the ink has excellent wet spreadability to a low or non-absorptive recording medium by containing the organic solvent A, it is possible to obtain an image quality having a high OD value and excellent color development. Further, by containing the organic solvent B, the penetration of the ink into the absorptive recording medium is suppressed, so that the coloring material remains on the surface, and an image quality having a high OD value and excellent color development can be obtained particularly in the absorptive recording medium.

In an aspect, the ink jet recording apparatus is
an ink jet recording apparatus including an ink adhering section that ejects an aqueous ink composition from an ink jet head and adhering the aqueous ink composition to a recording medium, in which
the aqueous ink composition contains an organic solvent A which is a 1,2-alkanediol having a surface tension of 30 mN/m or less at 25° C. and an organic solvent B which is a both-end-type alkanediol having a normal boiling point of 250° C. or lower and having 3 or more carbon atoms, and
the ink jet head includes a circulation mechanism for circulating the aqueous ink composition.

According to the ink jet recording apparatus, it is possible to improve the image quality on both the low or non-absorptive recording medium and the absorptive recording medium, and to secure the ink ejection stability at the same time.

The present disclosure is not limited to the embodiment, and various modifications can be made. For example, the present disclosure includes configurations that are substantially the same as the configurations described in the embodiments (for example, configurations having the same function, method, and result, or configurations having the same purpose and effect). Further, the present disclosure includes configurations in which non-essential parts of the configurations described in the embodiments are replaced. Further, the present disclosure includes a configuration that achieves the same effect as the configuration described in the embodiment or a configuration that can achieve the same object. Further, the present disclosure includes configurations in which known techniques are added to the configurations described in the embodiments.

What is claimed is:

1. A recording method for recording on a recording medium,
the recording medium being a non-white recording medium, the method comprising:
a white ink adhering step of adhering a white ink containing a white coloring material to the recording medium; and
a non-white ink adhering step of adhering a non-white ink containing a non-white coloring material to the recording medium,
wherein the white ink adhering step and the non-white ink adhering step are performed by causing a recording head to scan the recording medium,
the white ink adhering step and the non-white ink adhering step are performed on a region of the recording medium by a scan,
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or less, and a content of the white coloring material in the white ink is 1.0% by mass or more and 20.0% by mass or less.

2. The recording method according to claim 1, wherein the recording head is an ink jet head, and the white ink adhering step and the non-white ink adhering step are performed by ejecting the white ink and the non-white ink from the ink jet head.

3. The recording method according to claim 2, wherein a maximum ink droplet mass of the white ink ejected from the ink jet head is smaller than a maximum ink droplet mass of the non-white ink ejected.

4. The recording method according to claim 1, wherein the recording is performed by repeatedly performing the scanning and sub-scanning in which a relative position between the recording head and the recording medium is changed in a direction intersecting a direction of the scanning.

5. The recording method according to claim 1, wherein in the region where the white ink and the non-white ink are adhered, in a region where the adhesion amount B of the non-white coloring material per unit area is largest, the mass ratio (A/B) is 0.03 or more and 0.99 or less.

6. The recording method according to claim 1, wherein each of the white ink and the non-white ink is adhered to a scanning region of the recording medium, which is scanned by one scan of the recording head, by two or more scans.

7. The recording method according to claim 1, wherein each of the white ink and the non-white ink is an aqueous ink.

8. A recording method for recording on a recording medium,
the recording medium being a non-white recording medium, the method comprising:
a white ink adhering step of adhering a white ink containing a white coloring material to the recording medium; and
a non-white ink adhering step of adhering a non-white ink containing a non-white coloring material to the recording medium,
wherein the white ink adhering step and the non-white ink adhering step are performed by causing a recording head to scan the recording medium,
the white ink adhering step and the non-white ink adhering step are performed on a region of the recording medium by a scan,
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or loss; and
each of the white ink and the non-white ink contains an organic solvent having a normal boiling point of 150.0° C. or higher and 280.0° C. or lower.

9. A recording method for recording on a recording medium,
the recording medium being a non-white recording medium, the method comprising:
a white ink adhering step of adhering a white ink containing a white coloring material to the recording medium; and
a non-white ink adhering step of adhering a non-white ink containing a non-white coloring material to the recording medium,
wherein the white ink adhering step and the non-white ink adhering step are performed by causing a recording head to scan the recording medium,
the white ink adhering step and the non-white ink adhering step are performed on a region of the recording medium by a scan,
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or loss, and
each of the white ink and the non-white ink does not contain more than 1.0% by mass of an organic solvent having a normal boiling point of higher than 28.00° C.

10. A recording method for recording on a recording medium,
the recording medium being a non-white recording medium, the method comprising:
a white ink adhering step of adhering a white ink containing a white coloring material to the recording medium; and
a non-white ink adhering step of adhering a non-white ink containing a non-white coloring material to the recording medium,
wherein the white ink adhering step and the non-white ink adhering step are performed by causing a recording head to scan the recording medium,
the white ink adhering step and the non-white ink adhering step are performed on a region of the recording medium by a scan,
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or loss, and
the non-white recording medium is a low-absorptive or non-absorptive recording medium.

11. A recording method for recording on a recording medium,
the recording medium being a non-white recording medium, the method comprising:
a white ink adhering step of adhering a white ink containing a white coloring material to the recording medium; and
a non-white ink adhering step of adhering a non-white ink containing a non-white coloring material to the recording medium,
wherein the white ink adhering step and the non-white ink adhering step are performed by causing a recording head to scan the recording medium,
the white ink adhering step and the non-white ink adhering step are performed on a region of the recording medium by a scan,
the white ink adhering step and the non-white ink adhering step are performed such that, in the region where the white ink and the non-white ink are adhered, a mass ratio (A/B) of an adhesion amount A of the white coloring material to an adhesion amount B of the non-white coloring material per unit area is 0.03 or more and 0.99 or loss, and the non-white recording medium is either a transparent recording medium or a non-white colored recording medium.

12. An ink jet recording apparatus comprising:

a transport section that transports a recording medium;

a recording head that ejects a white ink containing a white coloring material and a non-white ink containing a non-white coloring material to adhere the white ink and the non-white ink to the recording medium, wherein a content of the white coloring material in the white ink is 1.0% by mass or more and 20.0% by mass or less;

a scanning section that causes the recording head to scan the recording medium; and a controller that controls the transport section, the recording head, and the scanning section, wherein the controller causes the white ink and the non-white ink to adhere to a region of the recording medium by a scan by the scanning section such that in the region, a mass ratio (A/B) of an adhesion amount A of the white coloring material to an adhesion amount B of the non-white coloring material per unit area is 0.03 or more and 0.99 or less.

* * * * *